(12) United States Patent
Inoue et al.

(10) Patent No.: US 10,520,907 B2
(45) Date of Patent: Dec. 31, 2019

(54) REMOTE CONTROL DEVICE

(71) Applicant: DAIKIN INDUSTRIES, LTD., Osaka-shi, Osaka (JP)

(72) Inventors: Ryouji Inoue, Osaka (JP); Ryousuke Yamamoto, Osaka (JP); Yukio Inoue, Osaka (JP); Yasuaki Kobayashi, Osaka (JP); Youta Katou, Osaka (JP); Asuka Yagi, Osaka (JP); Tatsuya Higuchi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/071,872

(22) PCT Filed: Jan. 11, 2017

(86) PCT No.: PCT/JP2017/000678
§ 371 (c)(1),
(2) Date: Jul. 20, 2018

(87) PCT Pub. No.: WO2017/126392
PCT Pub. Date: Jul. 27, 2017

(65) Prior Publication Data
US 2019/0033807 A1    Jan. 31, 2019

(30) Foreign Application Priority Data

Jan. 21, 2016    (JP) ................................. 2016-009753

(51) Int. Cl.
*G05B 19/042*    (2006.01)
*F24F 11/89*    (2018.01)
(Continued)

(52) U.S. Cl.
CPC ............ *G05B 19/042* (2013.01); *F24F 11/52* (2018.01); *F24F 11/58* (2018.01); *F24F 11/89* (2018.01);
(Continued)

(58) Field of Classification Search
CPC ......... G08C 17/02; G08C 19/00; G06F 3/048; F24F 11/52; F24F 11/58
See application file for complete search history.

(56) References Cited

U.S. PATENT DOCUMENTS

2007/0050732 A1*   3/2007   Chapman, Jr. ..... G05D 23/1902
                                                                      715/810
2007/0228182 A1*   10/2007   Wagner .............. G05D 23/1902
                                                                         236/94
(Continued)

FOREIGN PATENT DOCUMENTS

EP        2 045 541 A1      4/2009
JP        10-148381 A      6/1998
(Continued)

OTHER PUBLICATIONS

International Search Report of corresponding PCT Application No. PCT/JP2017/000678 dated Apr. 4, 2017.
(Continued)

*Primary Examiner* — Vincent H Tran
(74) *Attorney, Agent, or Firm* — Global IP Counselors, LLP

(57) ABSTRACT

A remote control device includes a display unit, physical keys, and a control unit to control operations of the display unit and execute various processes in accordance with commands input via the physical keys. The display unit includes a setting item display area to display setting item information pertaining to configurable setting items, and a set state display area to display information pertaining to set state of the setting items. The physical keys include at least one function key and a separate set state change key. The control unit successively selects the setting items, causes the display unit to display the setting item information, and performs an increase or decrease of a numerical value, a stage change, or a mode change relating to the setting item. The number of function keys is smaller than the number of the setting item information displayed.

23 Claims, 43 Drawing Sheets

(51) Int. Cl.
  *G08C 19/00* (2006.01)
  *G08C 17/02* (2006.01)
  *F24F 11/52* (2018.01)
  *F24F 11/58* (2018.01)
  *G06F 3/023* (2006.01)
  *G06F 3/0482* (2013.01)
(52) U.S. Cl.
  CPC .......... *G06F 3/0236* (2013.01); *G06F 3/0482* (2013.01); *G08C 17/02* (2013.01); *G08C 19/00* (2013.01); *G05B 2219/2614* (2013.01); *G08C 2201/30* (2013.01)

(56) References Cited

U.S. PATENT DOCUMENTS

| | | | |
|---|---|---|---|
| 2010/0070087 A1 | 3/2010 | Shima et al. | |
| 2010/0070089 A1* | 3/2010 | Harrod | G05B 19/042 700/277 |
| 2011/0077780 A1* | 3/2011 | Hoglund | G06F 3/0482 700/277 |
| 2012/0012662 A1* | 1/2012 | Leen | G05B 15/02 236/51 |
| 2013/0087628 A1* | 4/2013 | Nelson | G05D 23/1934 236/51 |
| 2013/0158720 A1* | 6/2013 | Zywicki | G05D 23/1934 700/276 |
| 2015/0204565 A1* | 7/2015 | Amundson | G05B 13/02 700/276 |
| 2016/0138820 A1 | 5/2016 | Saiki et al. | |
| 2017/0074537 A1* | 3/2017 | Bentz | H04W 4/80 |

FOREIGN PATENT DOCUMENTS

| | | |
|---|---|---|
| JP | 2002-115905 A | 4/2002 |
| JP | 2006-333317 A | 12/2006 |
| JP | 2008-133997 A | 6/2008 |
| JP | 2009-229009 A | 10/2009 |
| JP | 2009-250570 A | 10/2009 |
| JP | 2012-42186 A | 3/2012 |
| JP | 2012-112596 A | 6/2012 |
| WO | 2015/052786 A1 | 4/2015 |

OTHER PUBLICATIONS

European Search Report of corresponding EP Application No. 17 74 1272.3 dated Dec. 12, 2018.
International Preliminary Report of corresponding PCT Application No. PCT/JP2017/000678 dated Aug. 2, 2018.

\* cited by examiner

| DISPLAY AREA | DISPLAY CONTENT |
|---|---|
| 61 | INSTALLATION LOCATION INFORMATION |
| 62 | FILTER CLEAN INFORMATION |
| 63a | NULL |
| 63b | SET TEMPERATURE TAB |
| 63c | OPERATION MODE TAB |
| 63d | SET FAN SPEED TAB |
| 63e | SET AIR DIRECTION TAB |
| 63f | RIGHT ICON |
| 64a | SET FAN SPEED INFORMATION |
| 64b | SET AIR DIRECTION INFORMATION |
| 64c | OPERATION MODE INFORMATION |
| 64d | SET TEMPERATURE INFORMATION |
| 64e | OUTSIDE TEMPERATURE INFORMATION |
| 64f | INDOOR TEMPERATURE INFORMATION |

| DISPLAY AREA | DISPLAY CONTENT | HIGHLIGHTING |
| --- | --- | --- |
| 61 | INSTALLATION LOCATION INFORMATION | NULL |
| 62 | NULL | NULL |
| 63a | NULL | NULL |
| 63b | SET TEMPERATURE TAB | HIGHLIGHTING |
| 63c | OPERATION MODE TAB | NULL |
| 63d | SET FAN SPEED TAB | NULL |
| 63e | SET AIR DIRECTION INFORMATION | NULL |
| 63f | RIGHT ICON | NULL |
| 64a | NULL | NULL |
| 64b | NULL | NULL |
| 64c | NULL | NULL |
| 64d | SET TEMPERATURE INFORMATION | NULL |
| 64e | NULL | NULL |
| 64f | NULL | NULL |

| DISPLAY AREA | DISPLAY CONTENT | HIGHLIGHTING |
|---|---|---|
| 61 | INSTALLATION LOCATION INFORMATION | NULL |
| 62 | NULL | NULL |
| 63a | NULL | NULL |
| 63b | SET TEMPERATURE TAB | NULL |
| 63c | OPERATION MODE TAB | HIGHLIGHTING |
| 63d | SET FAN SPEED TAB | NULL |
| 63e | SET AIR DIRECTION TAB | NULL |
| 63f | RIGHT ICON | NULL |
| 64a | NULL | NULL |
| 64b | NULL | NULL |
| 64c | NULL | NULL |
| 64d | OPERATION MODE INFORMATION | NULL |
| 64e | NULL | NULL |
| 64f | NULL | NULL |

FIG. 12

| SET ORDER | OPERATION MODE |
|---|---|
| 1 | COOLING MODE |
| 2 | HEATING MODE |
| 3 | DEHUMIDIFICATION MODE |
| 4 | AIR BLOWING MODE |
| 5 | VENTILATION MODE |

TB4

TB5

| DISPLAY AREA | DISPLAY CONTENT | HIGHLIGHTING |
|---|---|---|
| 61 | INSTALLATION LOCATION INFORMATION | NULL |
| 62 | NULL | NULL |
| 63a | NULL | NULL |
| 63b | SET TEMPERATURE TAB | NULL |
| 63c | OPERATION MODE TAB | NULL |
| 63d | SET FAN SPEED TAB | HIGHLIGHTING |
| 63e | SET AIR DIRECTION TAB | NULL |
| 63f | RIGHT ICON | NULL |
| 64a | NULL | NULL |
| 64b | NULL | NULL |
| 64c | NULL | NULL |
| 64d | SET FAN SPEED INFORMATION | NULL |
| 64e | NULL | NULL |
| 64f | NULL | NULL |

| SET ORDER | STAGE OF SETTING FAN SPEED |
|---|---|
| 1 | LOWEST |
| 2 | LOW |
| 3 | MEDIUM |
| 4 | HIGH |
| 5 | HIGHEST |

TB7

| DISPLAY AREA | DISPLAY CONTENT | HIGHLIGHTING |
|---|---|---|
| 61 | INSTALLATION LOCATION INFORMATION | NULL |
| 62 | NULL | NULL |
| 63a | NULL | NULL |
| 63b | SET TEMPERATURE TAB | NULL |
| 63c | OPERATION MODE TAB | NULL |
| 63d | SET FAN SPEED TAB | NULL |
| 63e | SET AIR DIRECTION TAB | HIGHLIGHTING |
| 63f | RIGHT ICON | NULL |
| 64a | NULL | NULL |
| 64b | NULL | NULL |
| 64c | NULL | NULL |
| 64d | SET AIR DIRECTION INFORMATION | NULL |
| 64e | NULL | NULL |
| 64f | NULL | NULL |

FIG. 18

| SET ORDER | STAGE OF SETTING AIR DIRECTION |
|---|---|
| 1 | LOWEST |
| 2 | LOW |
| 3 | MIDDLE |
| 4 | HIGH |
| 5 | HIGHEST |

| DISPLAY AREA | DISPLAY CONTENT | HIGHLIGHTING |
|---|---|---|
| 61 | INSTALLATION LOCATION INFORMATION | NULL |
| 62 | NULL | NULL |
| 63a | LEFT ICON | NULL |
| 63b | OPERATION MODE TAB | NULL |
| 63c | SET FAN SPEED TAB | NULL |
| 63d | SET AIR DIRECTION SPEED TAB | NULL |
| 63e | MENU SETTING TAB | HIGHLIGHTING |
| 63f | NULL | NULL |
| 64a | NULL | NULL |
| 64b | NULL | NULL |
| 64c | NULL | NULL |
| 64d | MENU SETTING INFORMATION | NULL |
| 64e | NULL | NULL |
| 64f | NULL | NULL |

| SET ORDER | MENU SETTING ITEM |
|---|---|
| 1 | ECO FULL-AUTOMATIC SETTING |
| 2 | LANGUAGE SETTING |
| 3 | TIMER SETTING |

| DISPLAY AREA | DISPLAY CONTENT |
|---|---|
| 61 | INSTALLATION LOCATION INFORMATION |
| 62 | NULL |
| 63a | NULL |
| 63b | CANCELLATION TAB |
| 63c | NULL |
| 63d | NULL |
| 63e | DETERMINATION TAB |
| 63f | NULL |
| 64a | NULL |
| 64b | NULL |
| 64c | NULL |
| 64d | ECO FULL-AUTOMATIC HIGHLIGHT INFORMATION |
| 64e | NULL |
| 64f | NULL |

| DISPLAY AREA | DISPLAY CONTENT |
|---|---|
| 61 | INSTALLATION LOCATION INFORMATION |
| 62 | NULL |
| 63a | NULL |
| 63b | NON-SET TAB |
| 63c | NULL |
| 63d | NULL |
| 63e | SET TAB |
| 63f | NULL |
| 64a | NULL |
| 64b | NULL |
| 64c | NULL |
| 64d | ECO FULL-AUTOMATIC SETTING SWITCH INFORMATION |
| 64e | NULL |
| 64f | NULL |

| DISPLAY AREA | DISPLAY CONTENT |
|---|---|
| 61 | INSTALLATION LOCATION INFORMATION |
| 62 | NULL |
| 63a | NULL |
| 63b | CANCELLATION TAB |
| 63c | NULL |
| 63d | NULL |
| 63e | DETERMINATION TAB |
| 63f | NULL |
| 64a | NULL |
| 64b | NULL |
| 64c | NULL |
| 64d | LANGUAGE SETTING HIGHLIGHT INFORMATION |
| 64e | NULL |
| 64f | NULL |

| DISPLAY AREA | DISPLAY CONTENT | |
|---|---|---|
| 61 | INSTALLATION LOCATION INFORMATION | |
| 62 | | NULL |
| 63a | | NULL |
| 63b | | NULL |
| 63c | | NULL |
| 63d | | NULL |
| 63e | | NULL |
| 63f | | NULL |
| 64a | | NULL |
| 64b | | NULL |
| 64c | | NULL |
| 64d | LANGUAGE SETTING LIST INFORMATION | |
| 64e | | NULL |
| 64f | | NULL |

| DISPLAY AREA | DISPLAY CONTENT | |
|---|---|---|
| 61 | INSTALLATION LOCATION INFORMATION | |
| 62 | NULL | |
| 63a | NULL | |
| 63b | NON-SET TAB | |
| 63c | NULL | |
| 63d | NULL | |
| 63e | SET TAB | |
| 63f | NULL | |
| 64a | NULL | |
| 64b | NULL | |
| 64c | NULL | |
| 64d | JAPANESE SELECTION INFORMATION | |
| 64e | NULL | |
| 64f | NULL | |

FIG. 33

REMOTE CONTROL DEVICE

CROSS-REFERENCE TO RELATED APPLICATIONS

This U.S. National stage application claims priority under 35 U.S.C. § 119(a) to Japanese Patent Application No. 2016-009753; filed in Japan on Jan. 21, 2016, the entire contents of which are hereby incorporated herein by reference.

TECHNICAL FIELD

The present invention relates to a remote control device of an air-conditioning apparatus or a heat-pump apparatus.

BACKGROUND ART

Remote control devices that switch operational states of an air-conditioning apparatus, heat-pump apparatus or the like have until now come into widespread use. Among such remote control devices are those having, as physical keys serving as input means, fixed keys having functions assigned in a fixed manner, and function keys having assigned functions varying depending on the circumstances. For example, JP A No. 2009-229009 discloses a remote control device of an air-conditioning apparatus having a plurality of fixed keys and function keys.

Here, since functions assigned to function keys vary depending on the circumstances, it is difficult to provide the operator with information for determining the assigned functions in a fixed manner such as by means of printing or adhesion on keytops or casing surface. On this point, in the remote control device of JP-A No. 2009-229009, to enable the user to easily determine the function that is assigned to each function key, a setting item display area that displays information pertaining to a plurality of configurable setting items is disposed in a display, directly above the function keys, with information on the function assigned to each function key being displayed in the setting item display area.

SUMMARY

Technical Problem

In remote control devices of air-conditioning apparatuses, heat-pump apparatuses or the like which are widely used regardless of age or nationality, it is desired to make the method of operation as concise as possible so as to improve usability. However, in the remote control device of JP-A No. 2009-229009, the number of physical keys including function keys is not a few (specifically, eight), and the possibility of operations being complex for the operator is not small either.

In a remote control device of an air-conditioning apparatus or heat-pump apparatus, it is preferable that the number of physical keys including function keys is fewer from the standpoint of improving designability and compactness. On this point, as the number of the physical keys including function keys becomes larger, the degree of freedom in design narrows and the size of the remote control device increases as in JP-A No. 2009-229009.

Therefore, the object to be solved by the present invention is to provide a remote control device that excels in usability, designability, and compactness.

Solution to Problem

A remote control device according to a first aspect of the present invention is a remote control device of an air-conditioning apparatus or a heat-pump apparatus, and is provided with a display unit, a plurality of physical keys, and a control unit. The display unit displays various information. Commands pertaining to various settings are input via the physical key. The control unit controls operations of the display unit. The control unit executes various processes in accordance with commands input via the physical key. The display unit includes a setting item display area and a set state display area. The setting item display area is an area that displays setting item information. The setting item information is information pertaining to configurable setting items. The set state display area is an area that displays information pertaining to the set state of the setting item. The physical keys include at least one function key. The function assigned to the function key is switched depending on the circumstances. The control unit successively selects the setting items to be set in accordance with inputs via the function key. The control unit causes the display unit to display the setting item information pertaining to the selected setting item. The number of function keys is smaller than the number of setting item information displayed in the setting item display area.

In the remote control device according to the first aspect of the present invention, the control unit successively selects the setting items to be set in accordance with inputs via function key, and the number of function keys is smaller than the number of setting item information displayed in the setting item display area. Thereby, on the basis of inputs via the function key the number of which is fewer than that of setting item information (setting items) that are displayed, the setting items pertaining to settings are successively selected and are displayed in the display unit as setting item information. Because of this, the operator can perform various settings only with the function key the number of which is fewer than that of setting item information (setting items) that are displayed. That is, the operator can perform the same settings as those in a conventional device with fewer function keys than those in a conventional device. For this reason, the number of physical keys constituting the remote control device can be reduced as compared to that in a conventional device. As a result, the remote control device is able to provide a method easy to operate for the operator. Also, narrowing of the degree of freedom in design of the remote control device and an increase in size of the remote control device are restrained. Accordingly, the usability, designability, and compactness may be improved.

It should be noted that "air-conditioning apparatuses" or "heat-pump apparatuses" includes an apparatus having a refrigerant circuit such as an air conditioner, a dehumidifier, a water heater or a water cooler, and a ventilator, air cleaner, or the like.

Also, "setting item" herein is an item pertaining to a setting for switching the operational state of the "air-conditioning apparatus" or "heat-pump apparatus." For example, the "setting items" include an operation mode, a setting temperature, a setting fan speed, a setting air direction, a timing setting or the like.

A remote control device according to a second aspect of the present invention is the remote control device according to the first aspect of the present invention, in which the control unit switches the selection of the setting items each time an input is made via the function key.

Thereby, the setting item under selection is switched at each input via the function key. That is, the setting items pertaining to the settings and the setting item information displayed successively switch each time an input is made via the function key by the operator. For this reason, the same settings can be performed as in a conventional device with the minimum required physical keys. Therefore, the number of physical keys constituting the remote control device can be particularly reduced as compared to that of a conventional device. Accordingly, the usability, designability, and compactness may be further improved.

A remote control device according to a third aspect of the present invention is the remote control device according to the first aspect or the second aspect of the present invention, in which in the setting item display area, the setting item information pertaining to the setting item under selection is highlighted by an inversion or change in color, enlarged display, and/or flashing display.

Thereby, the setting item information pertaining to the setting item under selection is highlighted in the setting item display area. As a result, the operator can easily discern the setting item under selection. In particular, even when a plurality of setting item information are displayed in the setting item display area, the operator can easily discern the setting item (setting item information) under selection. Therefore, the usability is further improved.

A remote control device according to a fourth aspect of the present invention is the remote control device according to any of the first aspect to the third aspect of the present invention, in which the function key is positioned in the vicinity of the setting item display area.

Thereby, the operator can easily visually recognize the setting item display area while operating the function key. From this, the operator can easily discern the setting item (setting item information) under selection while performing operations of the function key. Therefore, the usability is further improved.

Note that "vicinity of the setting item display area" designates a part closer to the setting item display area than the set state display area, and for example is a peripheral part including immediately above or immediately below the setting item display area. In the case of the setting item display area being provided for example off to the right or left of the display unit, "vicinity of the setting item display area" is a peripheral part including the immediate left or immediate right of the setting item display area.

A remote control device according to a fifth aspect of the present invention is the remote control device according to any of the first aspect to the fourth aspect of the present invention, in which the physical keys further include a set state change key. The set state change key is configured and arranged separately from the function key. The control unit performs an increase or decrease of a numerical value, a stage change, or a mode change relating to the setting item under selection in accordance with an input via the set state change key.

Thereby, the set state of the setting item can be easily changed with the minimum required fixed keys. That is, the same settings can be performed as in a conventional device with the minimum required physical keys. As a result, the number of physical keys constituting the remote control device can be particularly reduced as compared to that in a conventional device. Therefore, the usability, designability, and compactness may be further improved.

A remote control device according to a sixth aspect of the present invention is the remote control device according to any of the first aspect to the fifth aspect of the present invention, in which the control unit changes the information pertaining to the set state of the setting item displayed in the set state display area on the basis of input via the function key.

Thereby, the set state of setting item can be easily changed with the minimum required physical keys. That is, the same settings can be performed as in a conventional device with the minimum required physical keys. As a result, the number of physical keys constituting the remote control device can be particularly reduced as compared to that in a conventional device. Therefore, the usability, designability, and compactness may be further improved.

A remote control device according to a seventh aspect of the present invention is the remote control device according to any of the first aspect to the sixth aspect of the present invention, in which the setting item information of which the number is smaller than the number of configurable setting items are displayed in the setting item display area. Non-displayed setting item identifying information is displayed in the display unit. The non-displayed setting item identifying information is information indicating existence of non-displayed setting item information. The non-displayed setting item information is the setting item information that is not displayed in the setting item display area.

Thereby, even when the number of displayed setting item information is smaller than the number of configurable setting items, it is easy for the operator to recognize the existence of the non-displayed setting item information. As a result, the operability is further improved, and the usability is further improved.

A remote control device according to an eighth aspect of the present invention is the remote control device according to the seventh aspect of the present invention, in which a plurality of the setting item information is displayed in the setting item display area. The non-displayed setting item identifying information is displayed in the vicinity of the setting item information displayed near one end of the setting item display area in the lengthwise direction. When the non-displayed setting item information is displayed in the setting item display area, the setting item information that was displayed near the other end of the setting item display area in the lengthwise direction is no longer displayed.

Thereby, even when the number of setting item information that are displayed is smaller than the number of configurable setting items, it is easy for the operator to identify the non-displayed setting item information. As a result, the operability is further improved, and the usability is further improved.

A remote control device according to a ninth aspect of the present invention is the remote control device according to any of the first aspect to the eighth aspect of the present invention, in which the control unit switches display modes of the various information displayed in the display unit by receiving a predetermined signal transmitted from an administrative device. The control unit is connected with the administrative device by a communication network.

Thereby, it is possible to display information in the display unit in a display mode corresponding to the characteristics of the operator. As a result, the display can be achieved in a real time and arbitrary manner in consideration of visibility and operability for the operator, and so the usability and versatility may be further improved. For example, when installed in a space where the user stays temporarily such as lodging facilities like a hotel, or a rental room (that is, a space where the user and administrator are not identical), the display mode is changeable in accordance with the attributes of the user. In addition, in terms of the applications in a number of countries, the display language can be easily and flexibly switched.

A remote control device according to a tenth aspect of the present invention is the remote control device according to any of the first aspect to the eighth aspect of the present invention, in which the control unit limits the setting item that can be selected via the function key by receiving a predetermined signal transmitted from an administrative device. The control unit is connected with the administrative device by a communication network.

Thereby, the administrator is able to limit the configurable setting item in accordance with the operator to prevent the operator from setting the setting item that is not desired to be set. That is, the administrator can limit the operation contents with respect to the operator. As a result, the manageability and security may be improved. For example, when installed in a space where the user stays temporarily such as lodging facilities like a hotel, or a rental room (that is, a space where the user and administrator are not identical), the operations of the user can be arbitrarily restricted.

Advantageous Effects of Invention

With the remote control device according to the first aspect of the present invention, the operator can perform various settings with a fewer number of function keys than the number of setting item information (setting items) that are displayed. That is, the operator can perform the same settings as in a conventional device with fewer function keys than those in a conventional device. For this reason, the number of physical keys constituting the remote control device can be reduced as compared to a conventional device. As a result, the remote control device is able to provide a method easy to operate by the operator. Also, a narrowing of the degree of freedom in design of the remote control device and an increase in size of the remote control device are restrained. Accordingly, the usability, designability, and compactness may be improved.

In the remote control device according to the second aspect of the present invention, the usability, designability, and the compactness may be further improved.

In the remote control device according to the third aspect and fourth aspect of the present invention, the usability is further improved.

In the remote control device according to the fifth aspect and sixth aspect of the present invention, the usability, designability, and compactness may be further improved.

In the remote control device according to the seventh aspect and eighth aspect of the present invention, the usability is further improved.

In the remote control device according to the ninth aspect of the present invention, the usability and versatility may be further improved.

In the remote control device according to the tenth aspect of the present invention, the manageability and security may be further improved.

BRIEF DESCRIPTION OF THE DRAWINGS

FIG. 6 is a schematic diagram that shows an example of a standby table.

FIG. 7 is a schematic diagram that shows an example of a set temperature switch table.

FIG. 10 is a schematic diagram that shows an example of an operation mode switch table.

FIG. 12 is a schematic diagram that shows an example of the operation mode table.

FIG. 14 is a schematic diagram that shows an example of a fan speed switch table.

FIG. 16 is a schematic diagram that shows an example of a fan speed table.

FIG. 18 is a schematic diagram that shows an example of an air direction switch table.

FIG. 20 is a schematic diagram that shows an example of an air direction table.

FIG. 22 is a schematic diagram that shows an example of a menu setting display table.

FIG. 24 is a schematic diagram that shows an example of a menu table.

FIG. 25 is a schematic diagram that shows an example of an eco full-automatic setting selection table.

FIG. 27 is a schematic diagram that shows an example of the eco full-automatic setting table.

FIG. 29 is a schematic diagram that shows an example of a language setting selection table.

FIG. 31 is a schematic diagram that shows an example of the language setting table.

FIG. 33 is a schematic diagram that shows an example of a Japanese setting table.

DESCRIPTION OF EMBODIMENTS

Hereinbelow, a remote control device (hereinbelow referred to as a remote controller) 30 according to one embodiment of the present invention will be described while referring to the appended drawings. The following embodiment is a concrete example of the present invention and not intended to limit the technical scope of the present invention, with suitable modifications being possible within a scope that does not deviate from the gist of the present invention. Also, in the following embodiment, up, down, left, and right refer to the directions shown in FIG. 3.

(1) Air Conditioner 100

Figure 1:
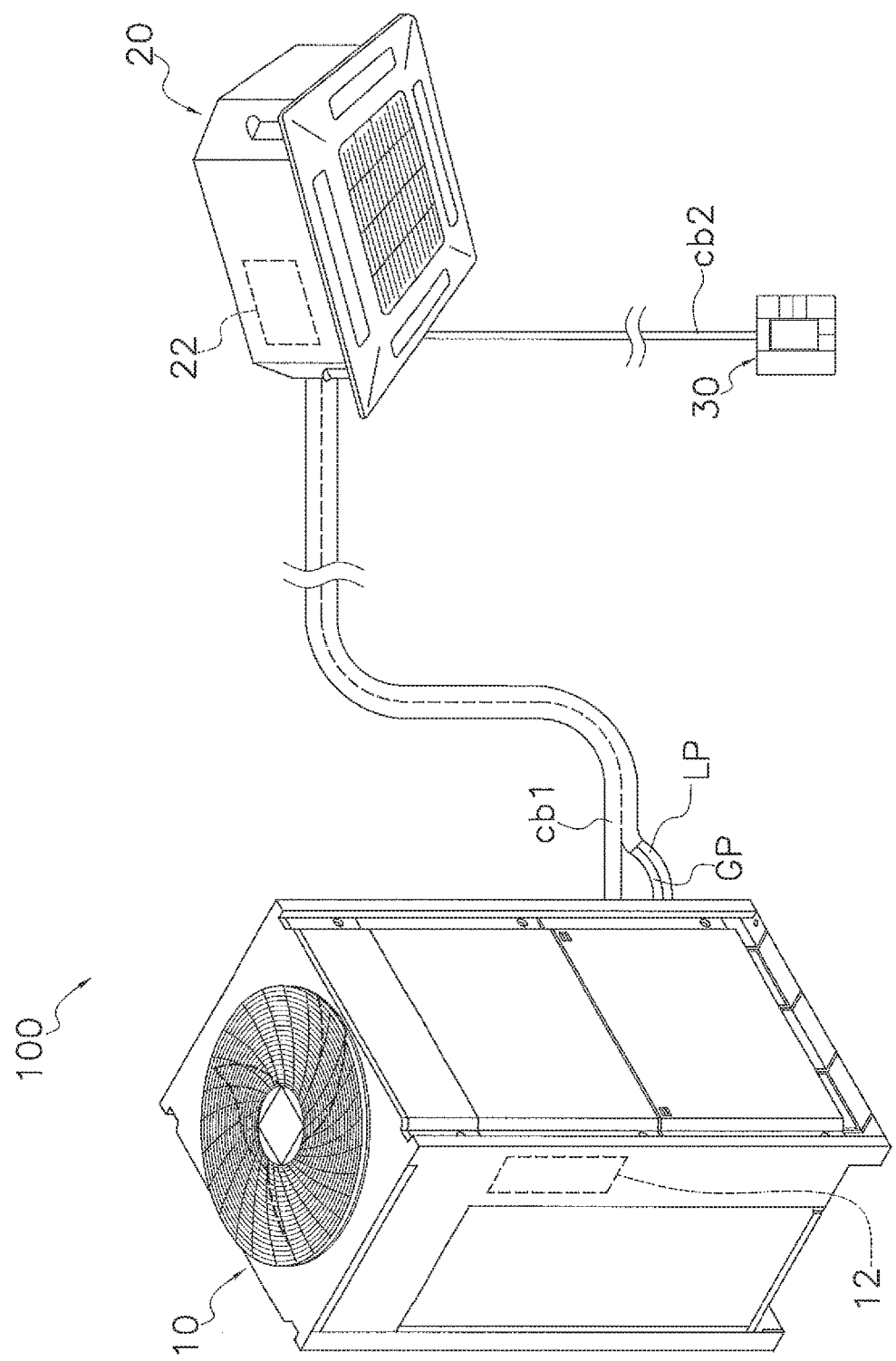
FIG. 1 is a schematic configuration view of an air conditioner to which a remote controller according to one embodiment of the present invention is applied.
Figure 2:
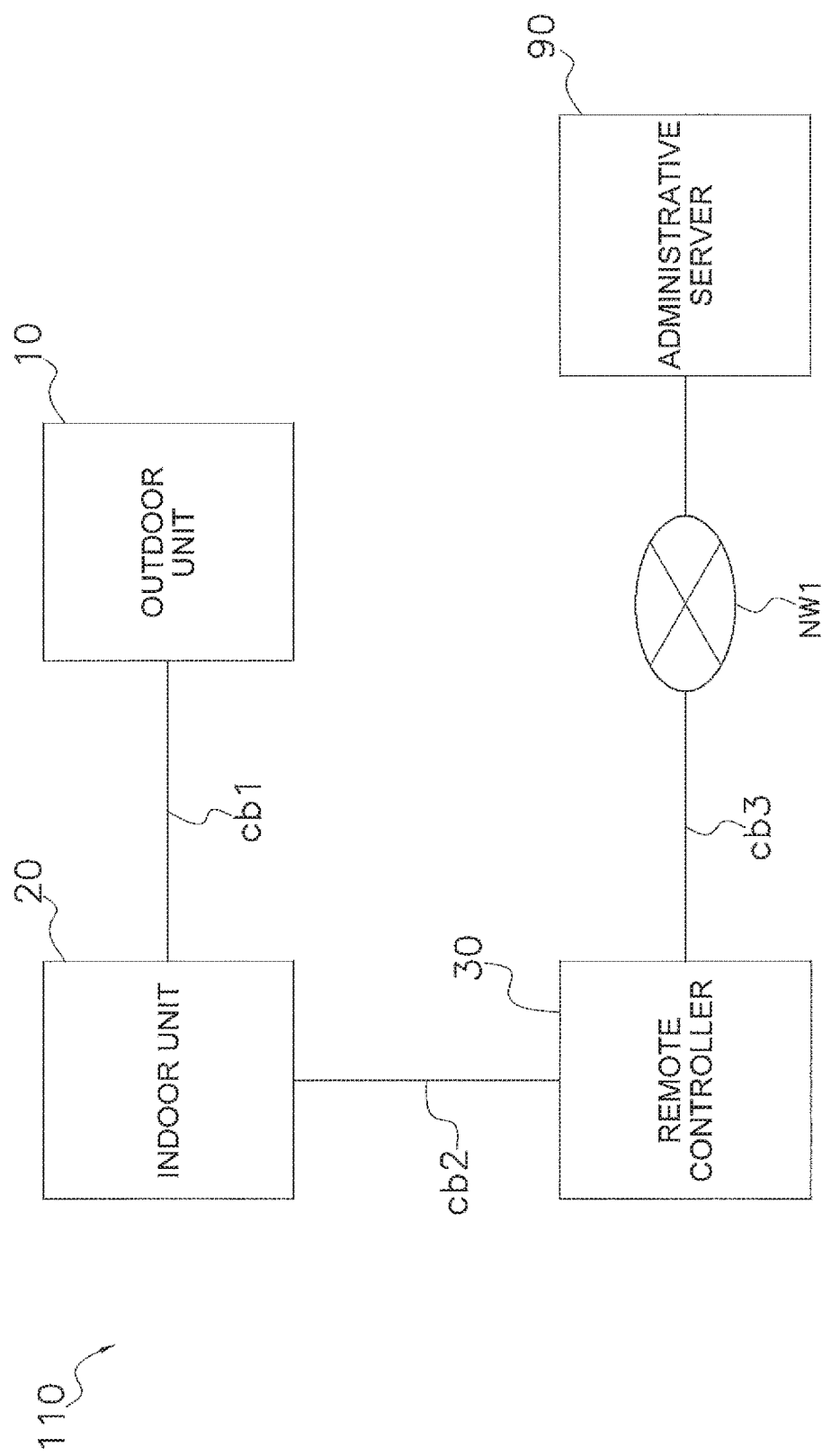
FIG. 2 is a block diagram that schematically shows a network that is constituted in the air conditioner.

FIG. 1 is a schematic configuration view of an air conditioner 100 (air-conditioning apparatus, heat-pump apparatus) to which the remote controller 30 is applied. FIG. 2 is a block diagram that schematically shows a network 110 that is constituted in the air conditioner 100.

The air conditioner 100 has a refrigerant circuit, and thereby realizes air conditioning of a target space by operating a vapor-compression refrigeration cycle. The air conditioner 100 has, as operation modes, a cooling mode, a heating mode, a dehumidification mode, and the like, and performs a cooling operation, a heating operation, a dehumidifying operation, or the like in accordance with the operation mode that has been selected.

The air conditioner 100 is mainly provided with an outdoor unit 10, an indoor unit 20, and a remote controller 30. In the air conditioner 100, the refrigerant circuit is constituted by the outdoor unit 10 and the indoor unit 20 being connected to each other by a gas connection pipe GP and a liquid connection pipe LP.

In the air conditioner 100, the network 110 is constituted by the outdoor unit 10 and the indoor unit 20 being connected to each other by a cable cb1, and the indoor unit 20 and the remote controller 30 being connected to each other by a cable cb2 (refer to FIG. 2). In the air conditioner 100, the remote controller 30 is configured to be capable of communicating with an administrative server 90 by being connected to a communication network NW1 via a cable cb3. The communication network NW1 is a LAN (Local Area Network) and/or a WAN (Wide Area Network).

The administrative server 90 is a computer that functions as a central management device for integrally managing the operation of the air conditioner 100. The administrative server 90 is installed in a centralized control room or control center separated from the target space in which the air conditioner 100 is installed. The operations of the outdoor unit 10, the indoor unit 20, and the remote controller 30 can be controlled by transmitting various commands via the communication network NW1 from the administrative server 90.

The state of each setting item of the air conditioner 100 is switched by the input of a command to the remote controller 30 or the administrative server 90. Examples of the setting items of the air conditioner 100 include an operation mode, a setting temperature, a setting fan speed, a setting air direction, and menu setting items (eco full-automatic setting, timer setting, and language setting).

(2) Remote Controller 30

Figure 3:
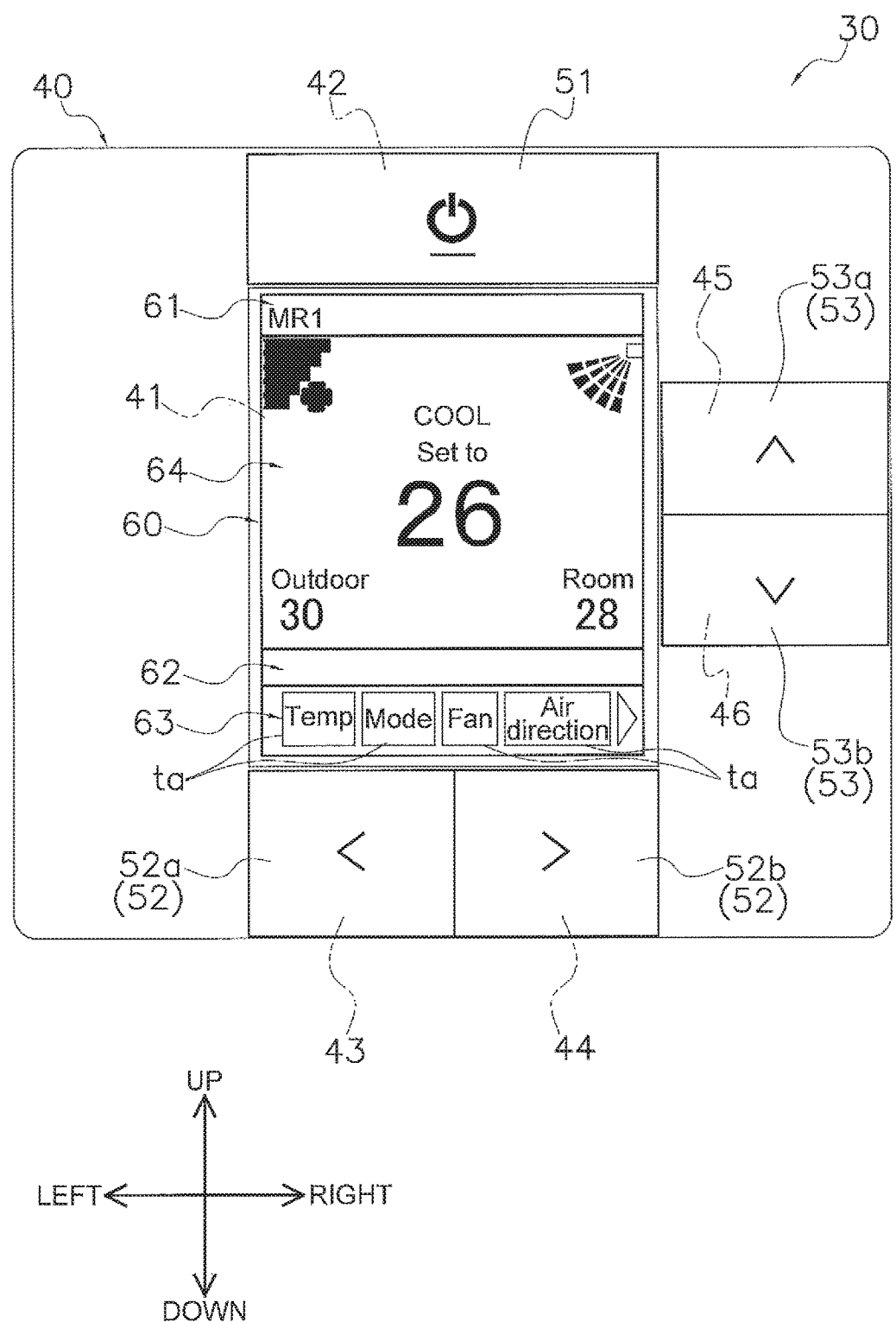
FIG. 3 is an external view of the remote controller from the front view (during use)
Figure 4:
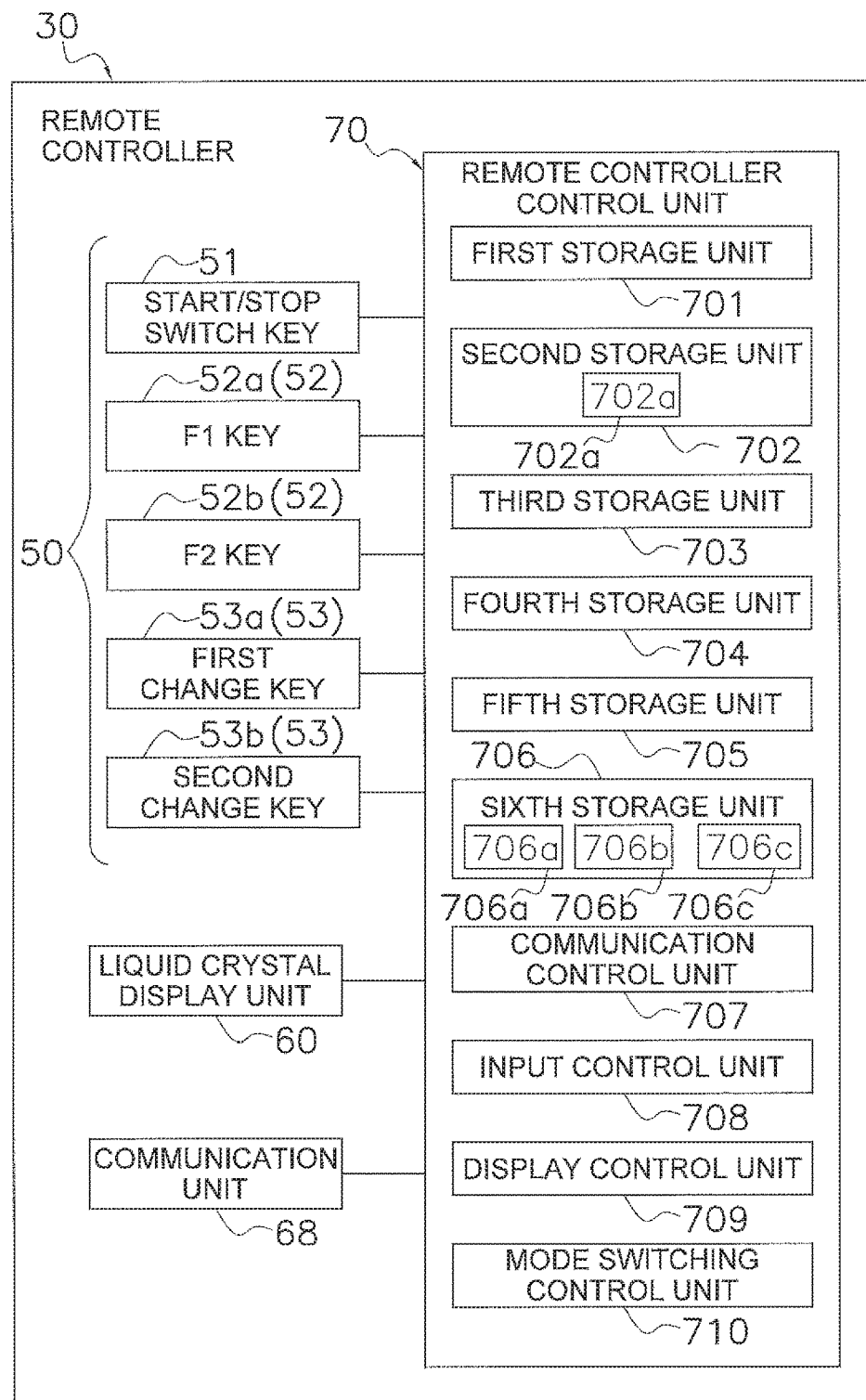
FIG. 4 is a block diagram that schematically shows a schematic configuration of the remote controller.

FIG. 3 is an external view of the remote controller 30 viewed from the front (during use). FIG. 4 is a block diagram that schematically shows the schematic configuration of the remote controller 30.

The remote controller 30 is fixed to a side wall of the target (indoor) space for example. The remote controller 30 functions as an input device for the user to input various instructions to switch the operational state of the air conditioner 100. More precisely, the remote controller 30 functions as an interface for the user to input commands to the air conditioner 100 for switching each setting item of the air conditioner 100 (for example, an operation mode, a setting temperature, a setting fan speed, a setting air direction, menu setting items, or the like). The remote controller 30 functions also as a display device for displaying the operational state of the air conditioner 100.

In the present embodiment, the remote controller 30 is a so-called wired remote control device that is connected with an indoor unit control unit 22 via the cable cb2. The remote controller 30 is also connected with the communication network NW1 via the cable cb3 and is communicatively connected with the administrative server 90 via the communication network NW1. The indoor unit control unit 22 (refer to FIG. 1) is a microcomputer that is constituted by a CPU, memory, and the like, and controls the operation of each actuator of the indoor unit 20.

The remote controller 30 has a casing 40 that constitutes the outer contour thereof. In the inside of the casing 40, the remote controller 30 has physical keys 50 as input means, a liquid crystal display unit 60 (display unit) as display means, a communication unit 68, and a remote controller control unit 70.

(2-1) Casing 40

The casing 40 is a thin housing made of for example a synthetic resin and has a generally rectangular shape viewed from the front (during use). A central opening part 41 that exposes the liquid crystal display unit 60 is formed in a central part of the principal surface on one side of the casing 40. An upper opening part 42 that exposes the keytop of a start/stop switch key 51 (described below) is formed at the upper part of the central opening part 41 of the casing 40. A first opening part 43 and a second opening part 44 that respectively expose the keytops of function keys 52 (described below) are formed directly under the central opening part 41 of the casing 40. A third opening part 45 and a fourth opening part 46 that respectively expose the keytops of a change keys 53 (described below) are formed near the right side of the central opening part 41 of the casing 40.

(2-2) Physical Keys 50

Each of the physical keys 50 is a push-type button that is used to input a command by being pushed by the user. Each of the physical keys 50 has a keytop made of for example a synthetic resin, with the keytop being exposed from one of the opening parts (42 to 46) in the casing 40. The physical keys 50 mainly include the start/stop switch key 51, a plurality of the function keys 52 (here, two), and a plurality of the change keys 53 (here, two).

The start/stop switch key 51 is a button that is used mainly for inputting a command for starting operation of the air conditioner 100 and a command for stopping operation of the air conditioner 100. The start/stop switch key 51 is a physical key 50 exposed from the upper opening part 42 and is arranged on the upper side of the liquid crystal display unit 60.

The remote controller 30 has, as the function keys 52, a first function key 52a (hereinbelow referred to as "F1 key 52a") and a second function key 52b (hereinbelow referred to as "F2 key 52b"). Here, the F1 key 52a and the F2 key 52b are arranged side by side in the left-right direction. The F1 key 52a is a physical key 50 exposed from the first opening part 43 and is arranged on the left side of the F2 key 52b. The F2 key 52b is a physical key 50 exposed from the second opening part 44 and is arranged on the right side of the F1 key 52a.

Each of the function keys 52 is generally used when performing settings of the air conditioner 100, with a function assigned to the function key 52 varying depending on the circumstances. For example, the function keys 52 each function as a setting item selection key (setting item switch key) used for selecting a setting item to be set. In relation to this, each of the function keys 52 has an object (a sign equivalent to a left arrow or a right arrow) printed on the keytop. The object has a direction that agrees with the direction of the movement pertaining to the selection on the basis of input via the function key 52 at the time of selection (switching) of a setting item. More precisely, during selection of a setting item, since a selection is performed moving leftward on the basis of input via the F1 key 52a, a sign equivalent to a left arrow is printed on the keytop of the F1 key 52a. Likewise, during selection of a setting item, since a selection is performed moving rightward on the basis of input via the F2 key 52b, a sign equivalent to a right arrow is printed on the keytop of the F2 key 52b.

The function keys 52 each function, depending on the circumstances, as a determination key for determining the content of a setting during the setting of a setting item, a cancellation key for cancellation, a non-setting key for switching a setting item to a non-set state, or a setting key for switching a setting item to a set state.

The change keys 53 (set state change keys) are each used for switching the set state of each of the setting items. The remote controller 30 has, as the change keys 53, a first change key 53a and a second change key 53b. Here, the first change key 53a and the second change key 53b are arranged side by side in the up-down direction. The first change key 53a is a physical key 50 exposed from the third opening part 45 and is arranged on the upper side of the second change key 53b. The second change key 53b is a physical key 50 exposed from the fourth opening part 46 and is arranged on the lower side of the first change key 53a.

In the present embodiment, the change keys 53 are each assigned a fixed function (a state change function to change a numerical value, type, stage, level of each setting item). In relation to this, each of the change keys 53 has an object (a sign equivalent to an up arrow or a down arrow) printed on the keytop. The object has a direction that agrees with the direction of the movement based on the input at the time of change of the state of a setting item. In the present embodiment, the change keys 53 each correspond to a fixed key having an assigned function that does not vary depending on the circumstances.

When any of the physical keys 50 is pushed, a predetermined input signal is output to the remote controller control unit 70. Specifically, depressing the start/stop switch key 51 outputs a start/stop switching signal to the remote controller control unit 70. Depressing the F1 key 52a outputs an F1 input signal to the remote controller control unit 70 and depressing the F2 key 52b outputs an F2 input signal to the remote controller control unit 70. Depressing the first change key 53a outputs a first change input signal to the remote controller control unit 70 and depressing the second change key 53b outputs a second change input signal to the remote controller control unit 70.

(2-3) Liquid Crystal Display Unit 60

In the present embodiment, the liquid crystal display unit 60 has a full dot-matrix liquid crystal display panel and a three-primary-color LED backlight (not illustrated in the drawings). By changing the output of the liquid crystal display unit 60, the liquid crystal display unit 60 is able to switch the brightness of the backlight between two stages of strong and weak.

Supplying a predetermined drive voltage from the remote controller control unit 70 causes the liquid crystal display unit 60 to turn on or flash its backlight at a designated brightness and display a predetermined image in a designated area. The liquid crystal display unit 60 stops the display when the supply of the drive voltage output from the remote controller control unit 70 is stopped.

Figure 5:
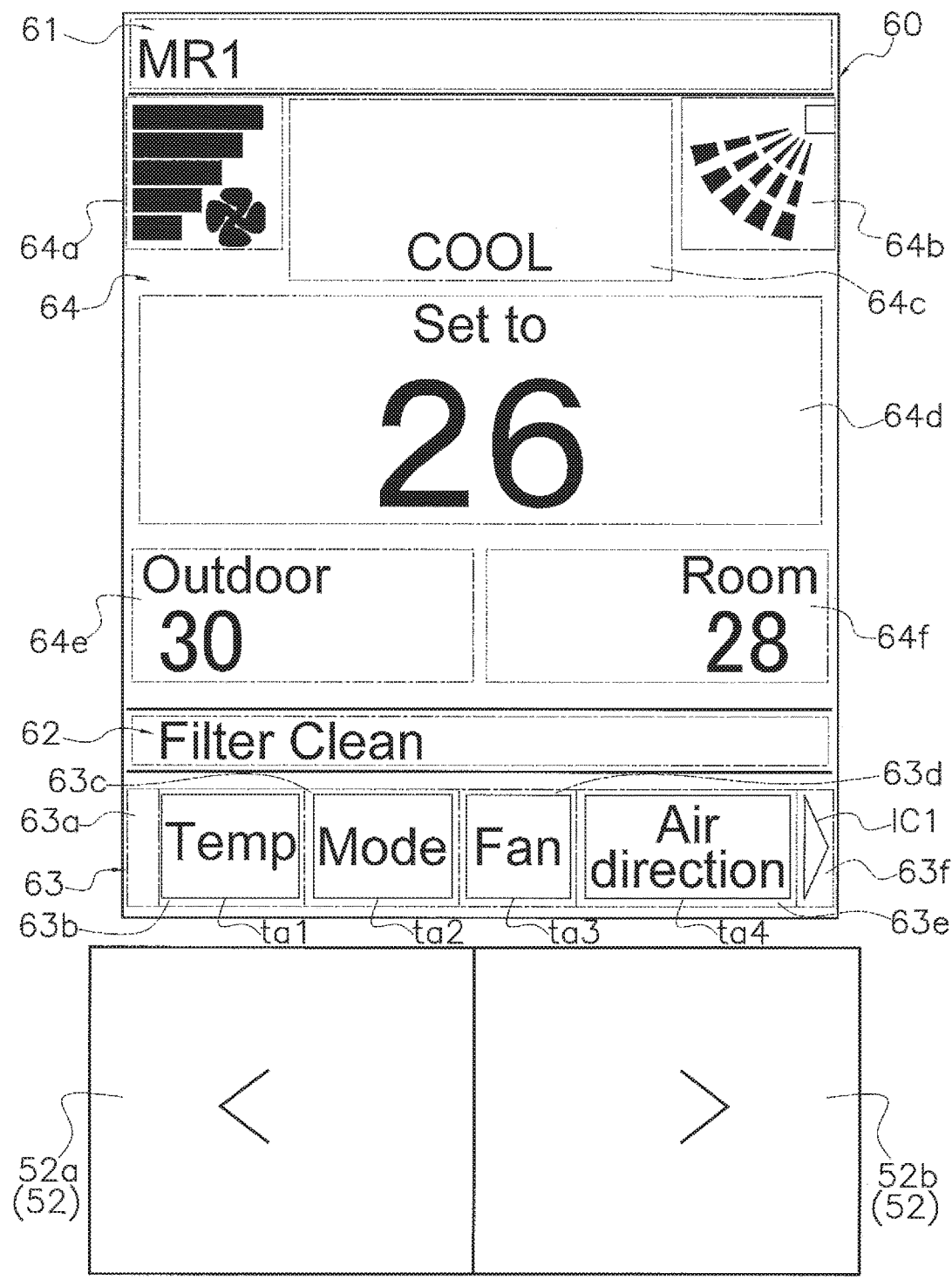
FIG. 5 is a schematic diagram that shows an example of a screen displayed in a liquid crystal display unit.

FIG. 5 is a schematic diagram that shows an example of a screen displayed in the liquid crystal display unit 60 (FIG. 5 shows an example of the display during a standby mode described below). The liquid crystal display unit 60 includes a plurality of display areas (here mainly four). Specifically, the liquid crystal display unit 60 includes a first display area 61, a second display area 62, a third display area 63, and a fourth display area 64. The display areas, viewed from the front, are arranged downward in order of the first display area 61, the fourth display area 64, the second display area 62, and the third display area 63. More precisely, the third display area 63 is located directly above near the function keys 52. The fourth display area 64 is arranged close to the left side of the change keys 53.

The first display area 61 and the second display area 62 are areas for displaying guidance information convenient for a viewer such as an operator or user, and notification information that needs to be reported relating to maintenance or abnormalities of the air conditioner 100. In FIG. 5, installation location information including the text information "MR1" identifying the target space in which the air conditioner 100 (indoor unit 20) is installed is shown in the first display area 61. In FIG. 5, filter clean information including the text information "Filter Clean" urging the replacement of the filter of the indoor unit 20 is shown in the second display area 62.

The third display area 63 (setting item display area) is an area that for example includes setting item tabs ta (setting item information) to display information pertaining to configurable setting items by the user and information pertaining to functions assigned to the function keys 52 (function tabs). In FIG. 5, the third display area 63 which extends in the left-right direction (that is, the lengthwise direction is the left-right direction) displays multiple (four) setting item tabs ta that are arranged side by side in the left-right direction (specifically, a set temperature tab ta1 including the text information "Temp" indicating a set temperature, an operation mode tab ta2 including the text information "Mode" indicating an operation mode, a set fan speed tab ta3 including the text information "Fan" indicating a setting fan speed, and a set air direction tab ta4 including the text information "Air direction" indicating a setting air direction).

Here, the third display area 63 is more precisely further divided into multiple (here, six) areas specified beforehand in a control program, with a predetermined information being displayed in each area. Specifically, the third display area 63 is divided into a first area 63a, a second area 63b, a third area 63c, a fourth area 63d, a fifth area 63e, and a sixth area 63f, which are arranged side by side from the left to the right in that order. In FIG. 5, information is not displayed in the first area 63a, but the set temperature tab ta1 is displayed in the second area 63b, the operation mode tab ta2 is displayed in the third area 63c, the set fan speed tab ta3 is displayed in the fourth area 63d, the set air direction tab ta4 is displayed in the fifth area 63e, and an icon with a generally triangular shape (a triangle having its apices on the top, bottom and right) (right icon IC1) is displayed in the sixth area 63f, indicating that additional setting item tabs ta are in turn concealed.

The fourth display area 64 (set state display area) is an area that displays information pertaining to for example the set state of each setting item, the state pertaining to the outdoor temperature and room temperatures, and switchable content during switching of a set state. FIG. 5 shows multiple (six) information being displayed in the fourth display area 64. Specifically, in FIG. 5, the fourth display area 64 displays: information (a set fan speed information) including an illustration indicating the level of the set fan speed that has been set; information (a set air direction information) including an illustration indicating the state of the set air direction that has been set; operation mode information including the text information "COOL" indicating the setting operation mode that has been set, set temperature information including the text information "Set to 26" indicating the value of the temperature that has been set; outdoor temperature information including the text information "Outdoor 30" indicating the state of the outdoor temperature; and room temperature information including the text information "Room 28" indicating the state of the room temperature.

Here, the fourth display area 64 is more precisely divided into multiple (here, six) areas specified beforehand in the control program, and displays predetermined information in each area. Specifically, the fourth display area 64 is divided into an 11th area 64a, a 12th area 64b, a 13th area 64c, a 14th area 64d, a 15th area 64e, and a 16th area 64f.

The 11th area 64a is located in the left topmost part of the fourth display area 64, and in FIG. 5 an illustration (icon) indicating the level of the set fan speed that has been set is displayed in the 11th area 64a as the set fan speed information. The 12th area 64b is located in the right topmost part of the fourth display area 64, and in FIG. 5 an illustration (icon) indicating the state of the setting air direction that has been set is displayed in the 12th area 64b as the set air direction information. The 13th area 64c is located between the 11th area 64a and the 12th area 64b in the fourth display area 64, and in FIG. 5 the text information "COOL" is displayed in the 13th area 64c as the operation mode information.

The 14th area 64d is located below the 13th area 64c in the fourth display area 64, and in FIG. 5 the text information "Set to 26" indicating the state of the set temperature that has been set is displayed in the 14th area 64d as the set temperature information. The 15th area 64e is located in the left bottommost part of the fourth display area 64, and in FIG. 5 the text information "Outdoor 30" indicating the state of the outdoor temperature is displayed in the 15th area 64e as the outdoor temperature information. The 16th area 64f is located in the right bottommost part of the fourth display area 64, and in FIG. 5 the text information "Room 28" indicating the state of the room temperature is displayed in the 15th area 64e as the room temperature information.

(2-4) Communication Unit 68

The communication unit 68 is a communication module including a signal receiving circuit that receives a signal from the indoor unit control unit 22 and the administrative server 90, and a signal transmitting circuit that transmits a signal to the indoor unit control unit 22 and the administrative server 90.

(2-5) Remote Controller Control Unit 70

The remote controller control unit 70 is a microcomputer that is constituted by a CPU, memory, and the like. The remote controller control unit 70 is connected with the indoor unit control unit 22 via the cable cb2. The remote controller control unit 70 receives a supply of electric power from a power supply unit (not illustrated) via power supply wiring not illustrated. The remote controller control unit 70 is electrically connected with the start/stop switch key 51, the F1 key 52a, the F2 key 52b, the first change key 53a, and the second change key 53b via a wiring pattern.

The remote controller control unit 70 has a plurality of control modes. As the control modes, the remote controller control unit 70 specifically has, for example, a standby mode, a set temperature switch mode, an operation switch mode, a fan speed switch mode, an air direction switch mode, and a menu setting switch mode. The remote controller control unit 70 enters a predetermined control mode depending on the circumstances and executes the corresponding process.

The remote controller control unit 70 mainly includes a first storage unit 701, a second storage unit 702, a third storage unit 703, a fourth storage unit 704, a fifth storage unit 705, a sixth storage unit 706, a communication control unit 707, an input control unit 708, a display control unit 709, and a mode switching control unit 710 (refer to FIG. 4).

(2-5-1) First Storage Unit 701

The first storage unit 701 stores a control program that defines the process of each component in the remote controller control unit 70. In the control program, the coordinate range is defined in relation to each display area in the liquid crystal display unit 60 (the first display area 61 to the fourth display area 64). The control program stored in the first storage unit 701 can be changed via an external device such as the administrative server 90. That is, the control program stored in the first storage unit 701 is updated by an administrator inputting a predetermined update command to the administrative server 90 as needed, and the relevant update command (update signal) being transmitted to the remote controller 30 via the communication network NW1.

(2-5-2) Second Storage Unit 702

The second storage unit 702 includes a control mode discrimination flag 702a that specifies whether the remote controller 30 has entered any control mode. The control mode discrimination flag 702a includes a predetermined bit number and specifies the control mode that has been entered. The state of the control mode discrimination flag 702a is switched by the mode switching control unit 710.

(2-5-3) Third Storage Unit 703

The third storage unit 703 individually stores: the information (e.g., set temperature information, operation mode information, set fan speed information, set air direction information) pertaining to the set state of each setting item (operation mode, set temperature, setting fan speed, and setting air direction) of the air conditioner 100; the information pertaining to menu setting items of the air conditioner 100; the additional information pertaining to the air conditioner 100 (e.g., the installation location information pertaining to the installation location; and the filter clean information for notifying filter replacement); the information pertaining to the outdoor temperature (outdoor temperature information) transmitted from the indoor unit control unit 22; and information pertaining to the room temperature (room temperature information). The information stored in the third storage unit 703 are suitably updated by the input control unit 708.

(2-5-4) Fourth Storage Unit 704

An information transmitted to the outdoor unit control unit 12, the indoor unit control unit 22, or the administrative server 90 is stored in a predetermined storage area in the fourth storage unit 704. Note that the outdoor unit control unit 12 (refer to FIG. 1) is a microcomputer that configured by a CPU, memory, and the like, and controls the operation of each actuator of the outdoor unit 10.

(2-5-5) Fifth Storage Unit 705

A plurality of tables used in the process of each unit are stored in the fifth storage unit 705. Each table stored in the fifth storage unit 705 can be changed via an external device such as the administrative server 90. That is, each table stored in the fifth storage unit 705 is updated by an administrator inputting a predetermined update command to the administrative server 90 as needed, and the relevant update command (update signal) being transmitted to the remote controller 30 via the communication network NW1.

(2-5-6) Sixth Storage Unit 706

The sixth storage unit 706 individually stores the start/stop switching signal, the F1 input signal, the F2 input signal, the first change input signal, and the second change input signal output from the physical keys 50 in predetermined areas. More precisely, a signal discrimination flag corresponding to each signal is provided in the sixth storage unit 706. Each signal discrimination flag is suitably updated by the input control unit 708.

Specifically, a start/stop switch flag 706a whose state changes in accordance with a start/stop switching signal being input is provided in the sixth storage unit 706. The start/stop switch flag 706a is set on when a stop/start switch signal is input in the non-operation state (when an input is made via the start/stop switch key 51). The start/stop switch flag 706a is cleared when a start/stop switching signal has been input in the operating state.

An F key flag 706b whose state changes in accordance with the input of the F input signal and the F2 input signal is provided in the sixth storage unit 706. The F key flag 706b has a predetermined bit number and stores a variable A that can discriminate the input state of the F1 input signal and the F2 input signal. The variable A is incremented by 1 when the F1 input signal is input and incremented by −1 when the F2 input signal is input.

A change key flag 706c whose state changes in accordance with input of the first change input signal and second change input signal is provided in the sixth storage unit 706. The change key flag 706c has a predetermined bit number and stores a variable B that can discriminate the input state of the first change input signal and second change input signal. The variable B is incremented by one when the first change input signal is input and incremented by −1 when the second change input signal is input.

(2-5-7) Communication Control Unit 707

The communication control unit 707 performs communication with the outdoor unit control unit 12, the indoor unit control unit 22 and the administrative server 90 via the communication unit 68 using a predetermined protocol. The communication control unit 707 stores the signals transmitted from the indoor unit control unit 22 and the administrative server 90 (for example, the information pertaining to the outdoor temperature and information pertaining to the room temperature) in a predetermined storage area of the third storage unit 703.

The communication control unit 707 transmits the information pertaining to the set state of each setting item stored in the third storage unit 703 to the indoor unit control unit 22 at a predetermined timing. Here, the communication control unit 707 transmits the information pertaining to each set state to the indoor unit control unit 22 at the timing at which the information pertaining to the set state of any setting item stored in the third storage unit 703 is updated. Thereby, the indoor unit control unit 22 can recognize the information pertaining to the set state of each setting item that has been set in the remote controller 30. Note that the communication control unit 707 may be configured to periodically (for example, every three seconds) transmit the information pertaining to the set state of each setting item stored in the third storage unit 703 to the indoor unit control unit 22.

(2-5-8) Input Control Unit 708

The input control unit 708 updates each flag (the start/stop switch flag 706a, F key flag 706b, and change key flag 706c) of the sixth storage unit 706 on the basis of the received start/stop switching signal, F1 input signal, F2 input signal, first change input signal, and second change input signal.

The input control unit 708 updates the variable A of the F key flag 706b and the variable B of the change key flag 706c to 0 when, with respect to the received start/stop switching signal, F1 input signal, F2 input signal, first change input signal, and second change input signal, a further signal is not received even after a predetermined time has elapsed from the reception of the last signal. The input control unit 708 is configured to be capable of measuring time.

When the latest information pertaining to outdoor temperature or the latest information pertaining to the room temperature is updated in the third storage unit 703, the input control unit 708, based on the updated content, updates a standby table TB1 (described below) that is stored in the fifth storage unit 705.

(2-5-9) Display Control Unit 709

The display control unit 709 is a function part that controls the operation of the liquid crystal display unit 60.

The display control unit 709 controls the operation of the liquid crystal display unit 60 in accordance with the control mode that has been entered. The display control unit 709 controls the display state of the liquid crystal display unit 60 by supplying or blocking a predetermined drive voltage to the liquid crystal display unit 60.

(2-5-10) Mode Switching Control Unit 710

The mode switching control unit 710 is a function part that integrally controls the switching of control modes. The mode switching control unit 710 controls the switching of the control mode by switching the state of the control mode discrimination flag 702a in the second storage unit 702 in accordance with the state of each flag (the start/stop switch flag 706a, the F key flag 706b, and the change key flag 706c) stored in the sixth storage unit 706.

(3) Control Mode of Remote Controller Control Unit 70

The remote controller control unit 70 has a plurality of control modes (specifically, for example, a standby mode, a set temperature switch mode, an operation switch mode, a fan speed switch mode, an air direction switch mode, and a menu setting switch mode). The remote controller control unit 70 enters a predetermined control mode depending on the circumstances and executes a corresponding process.

Hereinbelow, each control mode is explained.

(3-1) Standby Mode

The standby mode is a control mode that is entered in a standing by state (that is, when an operation pertaining to a setting change is not being performed in the case of the air conditioner 100 being in the operational state). Specifically, the remote controller control unit 70 enters the standby mode when the start/stop switch flag 706a is set on (that is, when in the operating state) and the variable A of the F key flag 706b is 0 (that is, no input via the F1 key 52a is performed). In the standby mode, the remote controller control unit 70 controls the operation of the liquid crystal display unit 60 so that each information stored in the third storage unit 703 is displayed in accordance with a standby table TB1 stored in the fifth storage unit 705.

FIG. 6 is a schematic diagram that shows an example of the standby table TB1. The content to be displayed in each display area (61 to 64) of the liquid crystal display unit 60 during the standby mode is registered in the standby table TB1. In the standby table TB1 shown in FIG. 6, the display content is individually defined in the rows corresponding to the display areas so that the display content shown in FIG. 5 is displayed in the liquid crystal display unit 60. Although not illustrated in FIG. 6, the information designating the display mode (size, coordinate range, and the like) is registered in the standby table TB1 in addition to the display content in each display area. The content of the standby table TB1 can be updated via an external device such as the administrative server 90.

(3-2) Set Temperature Switch Mode

A set temperature switch mode is a control mode that is entered during switching of a set temperature. Specifically, the remote controller control unit 70 enters the set temperature switch mode when, while during the standby mode, the value of variable A of the F key flag 706b has increased by 1 or decreased by 1 (that is, when one input is made via the F1 key 52a or the F2 key 52b), or when, while in the operation switch mode, the value of the variable A has increased by 1 (that is, when one input is made via the F2 key 52b).

In the remote controller 30, since an input made via the F1 key 52a or the F2 key 52b during the standby mode leads to a transition to the set temperature switch mode, the F1 key 52a and the F2 key 52b can be said to be assigned a function causing the transition to the set temperature switch mode during the standby mode (that is, a setting item selection function or a setting item switch function for selecting a set temperature as a setting item pertaining to a setting).

In the remote controller 30, since an input made via the F1 key 52a during the operation switch mode leads to transition to the set temperature switch mode, the F1 key 52a can be said to be assigned a function causing a transition to the set temperature switch mode during the operation switch mode.

During the set temperature switch mode, the remote controller control unit 70 controls operation of the liquid crystal display unit 60 so that each information stored in the third storage unit 703 is displayed in accordance with a set temperature switch table TB2 stored in the fifth storage unit 705.

FIG. 7 is a schematic diagram that shows an example of the set temperature switch table TB2. The content displayed in each display area (61 to 64) of the liquid crystal display unit 60 during the set temperature switch mode is registered in the set temperature switch table TB2. In the set temperature switch table TB2 shown in FIG. 7, the display content is individually defined in the rows corresponding to the display areas so that the display content shown in FIG. 8 is displayed in the liquid crystal display unit 60.

In the set temperature switch table TB2, in addition to display the content in each display area, the information for discriminating whether or not highlighting display is performed (highlighting display information) with respect to each display information is defined. For example, in the set temperature switch table TB2 shown in FIG. 7, in the row corresponding to the second area 63b, the highlighting display information is defined so that the set temperature tab ta1 in the second area 63b is to be highlighted.

Also, although not illustrated in FIG. 7, in addition to display content of each display area, the information designating the display mode (size, coordinate range, and the like) is registered in the set temperature switch table TB2. The content of the set temperature switch table TB2 can be updated via an external device such as the administrative server 90.

Figure 8:
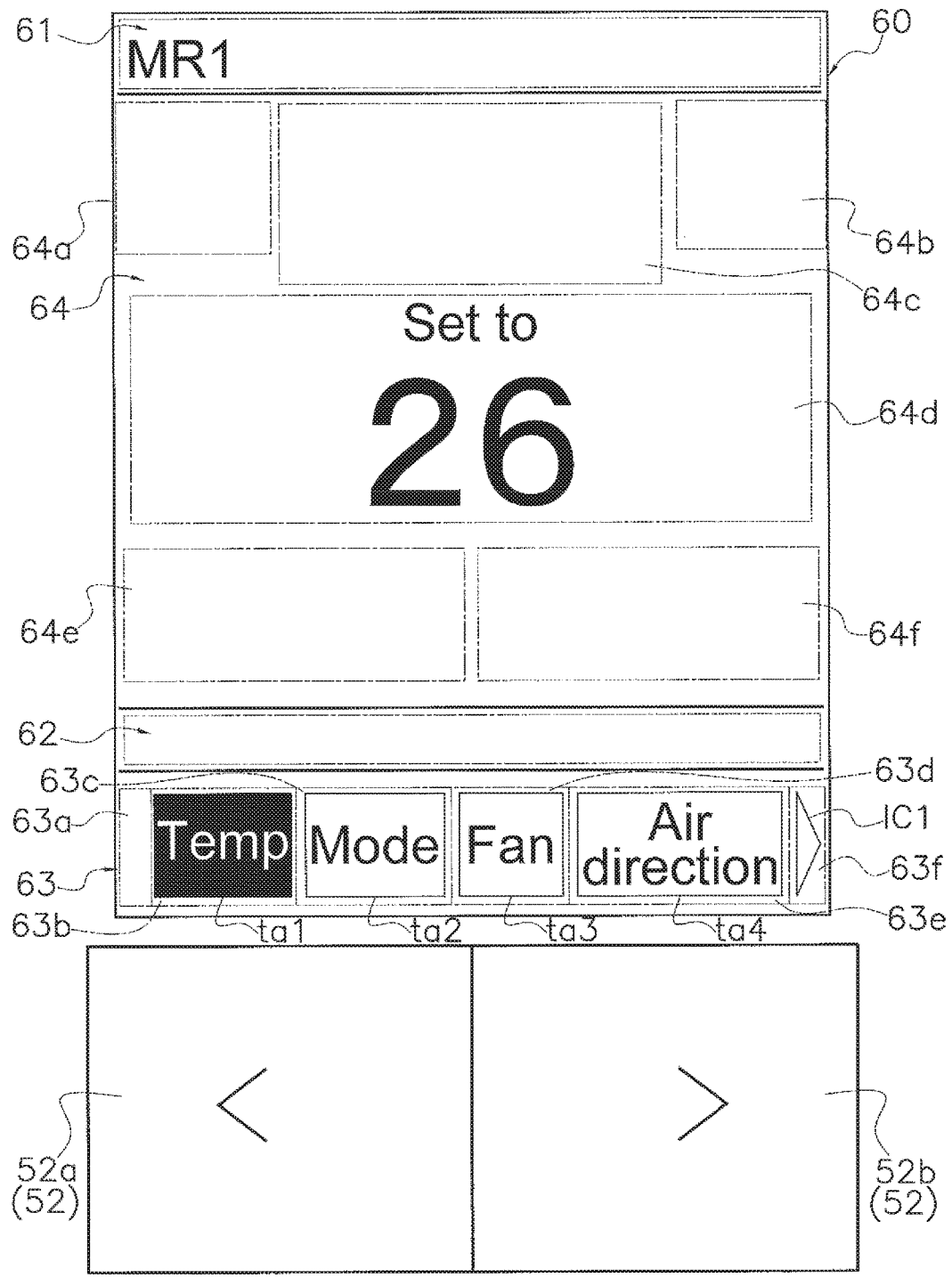
FIG. 8 is a schematic diagram that shows an example of an image displayed in the liquid crystal display unit during a set temperature switch mode.

FIG. 8 is a schematic diagram that shows an example of the image displayed in the liquid crystal display unit 60 during the set temperature switch mode. In accordance with the content of the set temperature switch table TB2 shown in FIG. 7, FIG. 8 shows the text information "MR1" displayed as the installation location information in the first display area 61, the set temperature tab ta1 displayed in the second area 63b, the operation mode tab ta2 displayed in the third area 63c, the set fan speed tab ta3 displayed in the fourth area 63d, the set air direction tab ta4 displayed in the fifth area 63e, and the right icon IC1 displayed in the sixth area 63f, with the text information "Set to 26" being displayed in the 14th area 64d as the set temperature information.

It should be noted that, in FIG. 8, the set temperature tab ta1 displayed in the second area 63b, in connection with the highlighting information defined in the set temperature switch table TB2 shown in FIG. 7, is highlighted by an inverted display (that is, display with the white and black inverted), in contrast to the display thereof during the standby mode. In FIG. 8, only the set temperature information is displayed in the fourth display area 64. In this way, since the setting item tab ta pertaining to the setting item being set (set temperature) is highlighted in the third display area 63, and only the information pertaining to the setting item being set (set temperature information) is displayed in the fourth display area 64, the operator is able to easily discern the fact that the set temperature is being set in the set temperature switch mode (that is, that the set temperature has been selected as the setting item to be set).

In the set temperature switch mode, the set temperature is switched on the basis of the value of the variable B of the set change key flag 706c (that is, on the basis of the input via the change key 53). Specifically, when the value of variable B increases by 1 (that is, when there has been one input via the first change key 53a) during the set temperature switch mode, the remote controller control unit 70 adds 1 to the value of the set temperature stored in the third storage unit 703 and updates the value.

Figure 9:
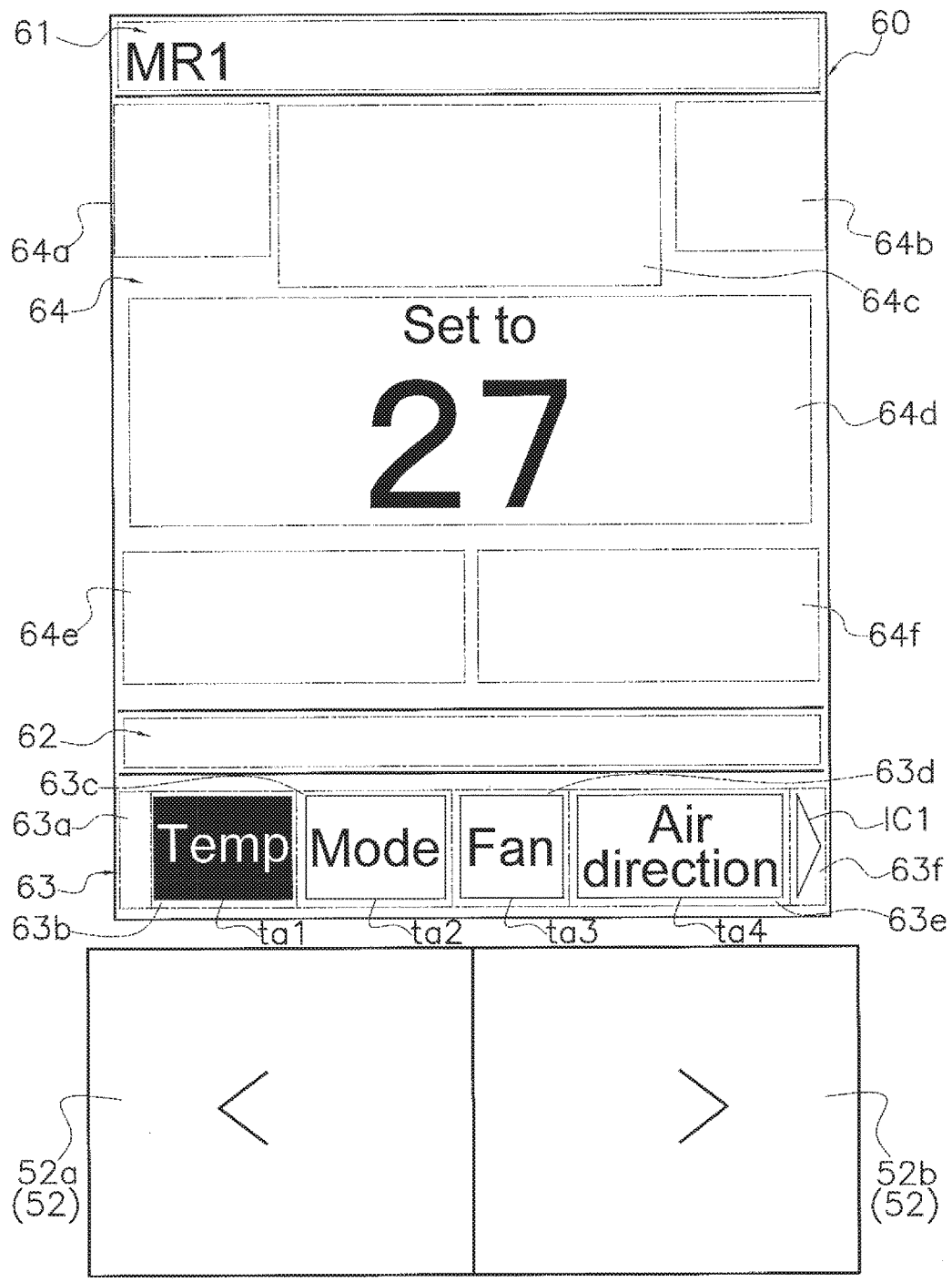
FIG. 9 is a schematic diagram that shows another example of the image displayed in the liquid crystal display unit during the set temperature switch mode.

For example, in the state of the set temperature being set to 26° C. (that is, in the state of the value of the set temperature stored in the third storage unit 703 being 26° C.), when the transition to the set temperature switch mode is made, and the value of the variable B increases by 1, the value of the set temperature stored in the third storage unit 703 is updated to 27° C. As a result, in relation to the set temperature information displayed in the 14th area 64d, the text information that was "26" in FIG. 8 is updated to "27". Thereby, the image as shown in FIG. 8 of the liquid crystal display unit 60 is switched to the image as shown in FIG. 9 and displayed.

When the value of the variable B decreases by 1 (that is, the second change key 53b has been input once) during the set temperature switch mode, the remote controller control unit 70 subtracts 1 from the value of the set temperature stored in the third storage unit 703 and updates the value. For example, in the state of the set temperature being set to 28° C. (that is, in the state of the value of the set temperature stored in the third storage unit 703 being 28° C.), when the transition to the set temperature switch mode is made, and the value of the variable B decreases by 1, the value of the set temperature stored in the third storage unit 703 is updated to 27° C. As a result, in relation to the set temperature information displayed in the 14th area 64d, the text information is updated to "27". Thereby, the image as shown in FIG. 9 is displayed in the liquid crystal display unit 60.

In the air conditioner 100, the settable numerical range in relation to the set temperature is 18 to 30° C., and the remote controller control unit 70 does not perform addition and subtraction on the value of the set temperature exceeding the lower limit value and upper limit value of this numerical range.

In this way, the remote controller control unit 70 enters the set temperature switch mode on the basis of input via the F1 key 52a or F2 key 52b and changes the set temperature based on the input via the first change key 53a or the second change key 53b. Thus, the operator can select the set temperature as a setting item pertaining to the setting by performing an input via the F1 key 52a or F2 key 52 to select the set temperature tab ta1, with the set temperature being changeable via the first change key 53a and the second change key 53b.

(3-3) Operation Switch Mode

The operation switch mode is a control mode that is entered during switching of the operation mode. Specifically, when the remote controller control unit 70 has entered the set temperature switch mode and the value of variable A of the F key flag 706b has decreased by 1 (that is, when there has been one input via the F2 key 52b), or when the remote controller control unit 70 has entered the fan speed switch mode and the value of variable A has increased by 1 (that is, when there has been one input via the F1 key 52a), the remote controller control unit 70 enters the operation switch mode.

It should be noted that since the remote controller control unit 70 enters the operation switch mode by an input made via the F2 key 52b while in the set temperature switch mode, the F2 key 52b can be said to be assigned a function causing a transition to the operation switch mode during the set temperature switch mode (that is, a setting item selection function or a setting item switch function for selecting the operation mode as the setting item pertaining to the setting).

Since the remote controller control unit 70 enters the operation switch mode by an input made via the F1 key 52a while in the fan speed switch mode, the F1 key 52a can be said to be assigned a function causing a transition to the operation switch mode during the fan speed switch mode.

During the operation switch mode, the remote controller control unit 70 controls the operation of the liquid crystal display unit 60 so that each information stored in the third storage unit 703 is displayed in accordance with an operation mode switch table TB3 stored in the fifth storage unit 705.

FIG. 10 is a schematic diagram that shows an example of the operation mode switch table TB3. The content to be displayed in each display area (61 to 64) of the liquid crystal display unit 60 during the operation switch mode is registered in the operation mode switch table TB3. In the operation mode switch table TB3 shown in FIG. 10, the display content is individually defined in the rows corresponding to the display areas so that the display content shown in FIG. 11 is displayed in the liquid crystal display unit 60.

Also, in the operation mode switch table TB3, in addition to the display content of each display area, highlighting information is defined in relation to each display information. For example, in the operation mode switch table TB3 shown in FIG. 10, in the row corresponding to the third area 63c, the highlighting information is defined so that the operation mode tab ta2 in the third area 63c is to be highlighted.

Also, although not illustrated in FIG. 10, in addition to display content of each display area, the information designating the display mode (size, coordinate range, and the like) is registered in the operation mode switch table TB3. The content of the operation mode switch table TB3 can be updated via an external device such as the administrative server 90.

Figure 11:
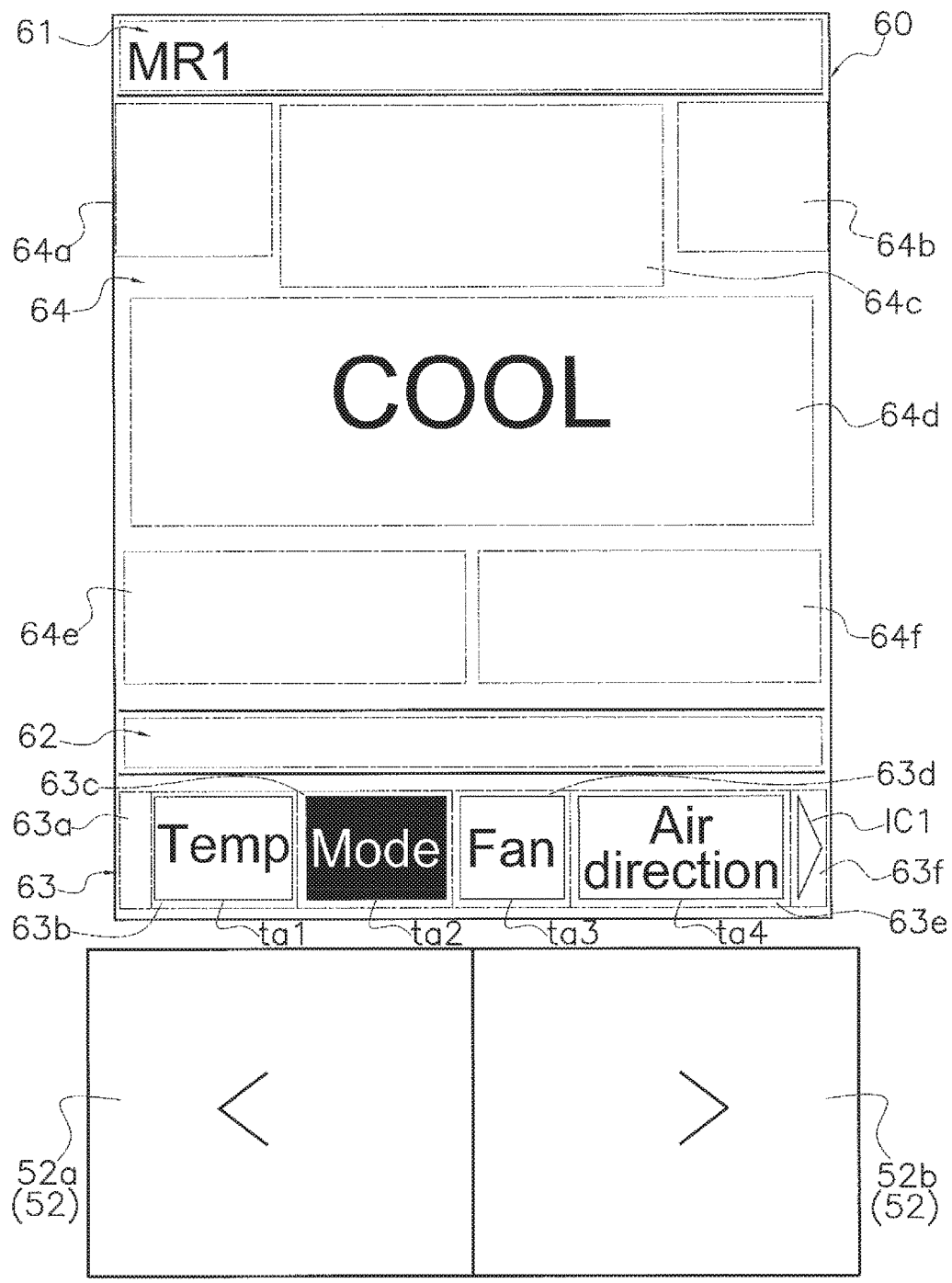
FIG. 11 is a schematic diagram that shows an example of the image displayed in the liquid crystal display unit during an operation switch mode.

FIG. 11 is a schematic diagram that shows an example of the image displayed in the liquid crystal display unit 60 during the operation switch mode. In accordance with the content of the operation mode switch table TB3 shown in FIG. 10, FIG. 11 shows the text information "MR1" displayed as the installation location information in the first display area 61, the set temperature tab ta1 displayed in the second area 63b, the operation mode tab ta2 displayed in the third area 63c, the set fan speed tab ta3 displayed in the fourth area 63d, the set air direction tab ta4 displayed in the fifth area 63e, and the right icon IC1 displayed in the sixth area 63f, along with the text information "COOL" being displayed in the 14th area 64d as the operation mode information.

It should be noted that in FIG. 11, the operation mode tab ta2 displayed in the third area 63c, in connection with the highlighting information defined in the operation mode switch table TB3 shown in FIG. 10, is highlighted by an inverted display (that is, display with the white and black inverted), in contrast to the display thereof during the standby mode. Only the operation mode information is displayed in the fourth display area 64. In this way, since the information pertaining to the setting item being set (operation mode) is highlighted in the third display area 63, and only the information pertaining to the setting item being set (operation mode) is displayed in the fourth display area 64, the operator is able to easily discern the fact that the operation mode is being set in the operation switch mode (that is, that the operation mode has been selected as the setting item to be set).

In the operation switch mode, the operation mode is switched on the basis of the value of the variable B of the change key flag 706c (that is, on the basis of the input via the change key 53) and in accordance with the definition content of an operation mode table TB4.

FIG. 12 is a schematic diagram that shows an example of the operation mode table TB4. In the operation mode table TB4, the relation between the types of operation mode and the set orders is defined. In the operation mode table TB4 shown in FIG. 12, as the set order the cooling mode is assigned first, the heating mode second, the dehumidification mode third, the air blowing mode fourth, and the ventilation mode fifth.

Figure 13:
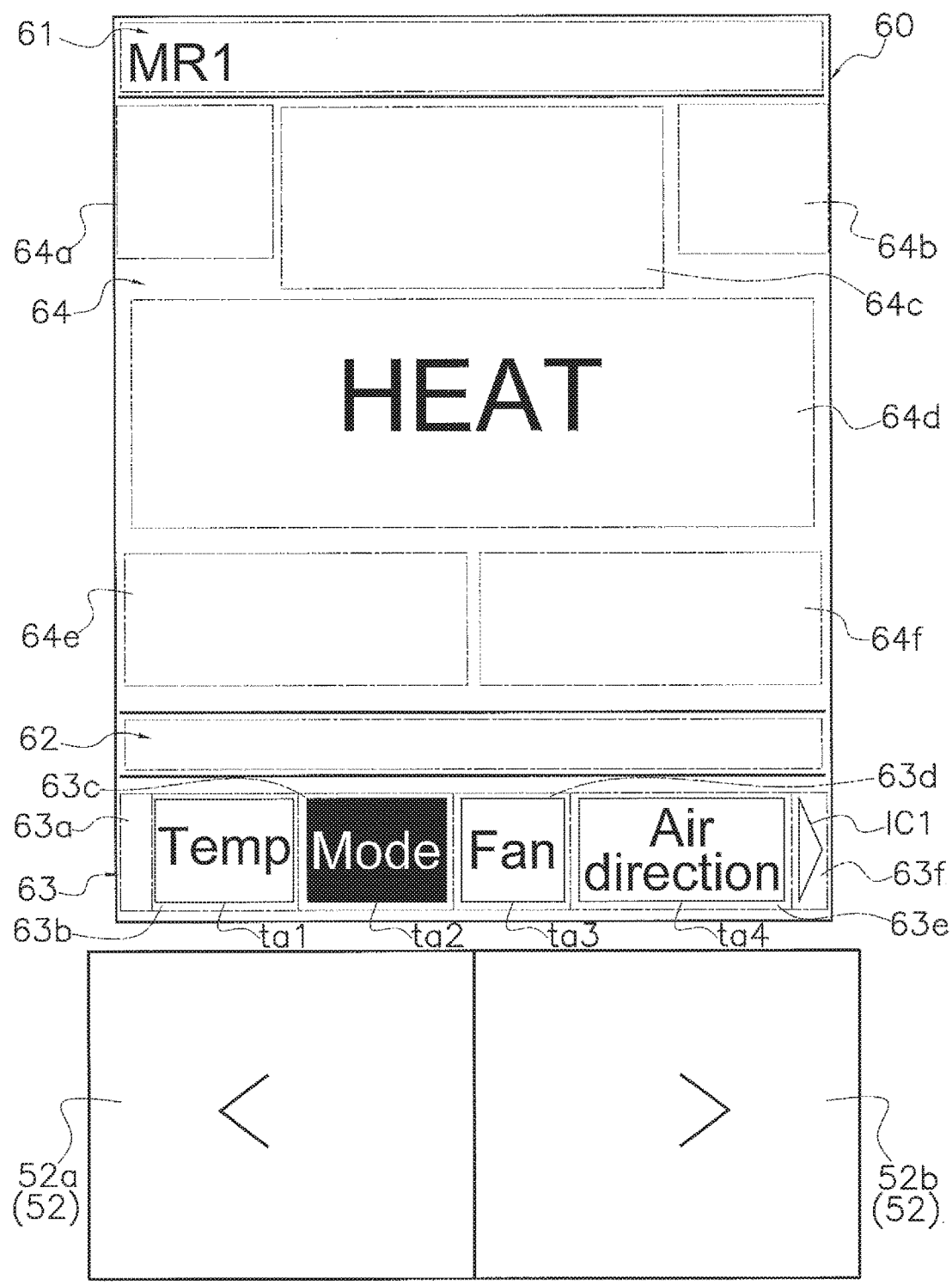
FIG. 13 is a schematic diagram that shows another example of the image displayed in the liquid crystal display unit during the operation switch mode.

Specifically, when the value of the variable B increases by 1 in the operation switch mode (that is, an input is made via the first change key 53a), the remote controller control unit 70 switches and updates to the type of operation mode assigned the set order obtained by adding 1 to the set order of the type of operation mode stored in the third storage unit 703. For example, in the state of the operation mode being the cooling mode (that is, the state in which the type of operation mode stored in the third storage unit 703 is the cooling mode, which is assigned the set order 1), when the operation switch mode has been entered and the value of variable B increases by 1, the type of operation mode stored in the third storage unit 703 is updated to the heating mode, which is assigned the set order 2. As a result, the text information included in the operation mode information displayed in the 14th area 64d is updated from "COOL" to "HEAT". Thereby, the image as shown in FIG. 13 is displayed in the liquid crystal display unit 60.

When the value of the variable B decreases by 1 in the operation switch mode (that is, an input is made via the second change key 53b), the remote controller control unit 70 switches and updates to the type of operation mode assigned the set order obtained by subtracting 1 from the set order of the type of operation mode stored in the third storage unit 703. For example, in the state of the operation mode being the dehumidification mode (that is, the state in which the type of operation mode stored in the third storage unit 703 is the dehumidification mode, which is assigned the set order 3), when the operation switch mode has been entered and the value of variable B decreases by 1, the type of the operation mode stored in the third storage unit 703 is updated to the heating mode, which is assigned the set order 2. As a result, the text information included in the operation mode information displayed in the 14th area 64d is updated from "Dry" to "HEAT". Thereby, the image as shown in FIG. 13 is displayed in the liquid crystal display unit 60.

In this way, the remote controller control unit 70 enters the operation switch mode on the basis of input via the F1 key 52a or F2 key 52b and switches the type of operation mode based on input via the first change key 53a or the second change key 53b. Thus, the operator can select the operation mode as a setting item pertaining to the setting by selecting the operation mode tab ta2 by input via the F1 key 52a or F2 key 52b, with switching of the operation mode being possible via the first change key 53a and the second change key 53b.

(3-4) Fan Speed Switch Mode

The fan speed switch mode is a control mode that is entered when switching the set fan speed. Specifically, the remote controller control unit 70 enters the fan speed switch mode when, while in the operation switch mode, the value of variable A of the F key flag 706b has decreased by 1 (that is, when there has been one input via the F2 key 52b), or when, while in the air direction switch mode, the value of variable A has increased by 1 (that is, when there has been one input via the F1 key 52a).

It should be noted that since the remote controller control unit 70 enters the fan speed switch mode by an input made via the F2 key 52b while in the operation switch mode, the F2 key 52b can be said to be assigned a function causing a transition to the fan speed switch mode during the operation switch mode (that is, a setting item selection function or a setting item switch function for selecting the set fan speed as the setting item pertaining to the setting).

Since the remote controller control unit 70 enters the fan speed switch mode by an input made via the F1 key 52a while in the air direction switch mode, the F1 key 52a can be said to be assigned a function causing a transition to the fan speed switch mode during the air direction switch mode.

During the fan speed switch mode, the remote controller control unit 70 controls the operation of the liquid crystal display unit 60 so that each information stored in the third storage unit 703 is displayed in accordance with a fan speed switch table TB5 stored in the fifth storage unit 705.

FIG. 14 is a schematic diagram that shows an example of the fan speed switch table TB5. The content to be displayed in each display area (61 to 64) of the liquid crystal display unit 60 during the fan speed switch mode is registered in the fan speed switch table TB5. In the fan speed switch table TB5 shown in FIG. 14, the display content is individually defined in the rows corresponding to the display areas so that the display content shown in FIG. 15 is displayed in the liquid crystal display unit 60.

Also, in the fan speed switch table TB5, in addition to the display content of each display area, a highlighting information is defined in relation to each display information. For example, in the fan speed switch table TB5 shown in FIG. 14, in the row corresponding to the fourth area 63d, a highlighting information is defined so that the set fan speed tab ta3 in the fourth area 63d is to be highlighted.

Also, although not illustrated in FIG. 14, in addition to display content of each display area, the information designating the display mode (size, coordinate range, and the like) is registered in the fan speed switch table TB5. The content of the fan speed switch table TB5 can be updated via an external device such as the administrative server 90.

Figure 15:
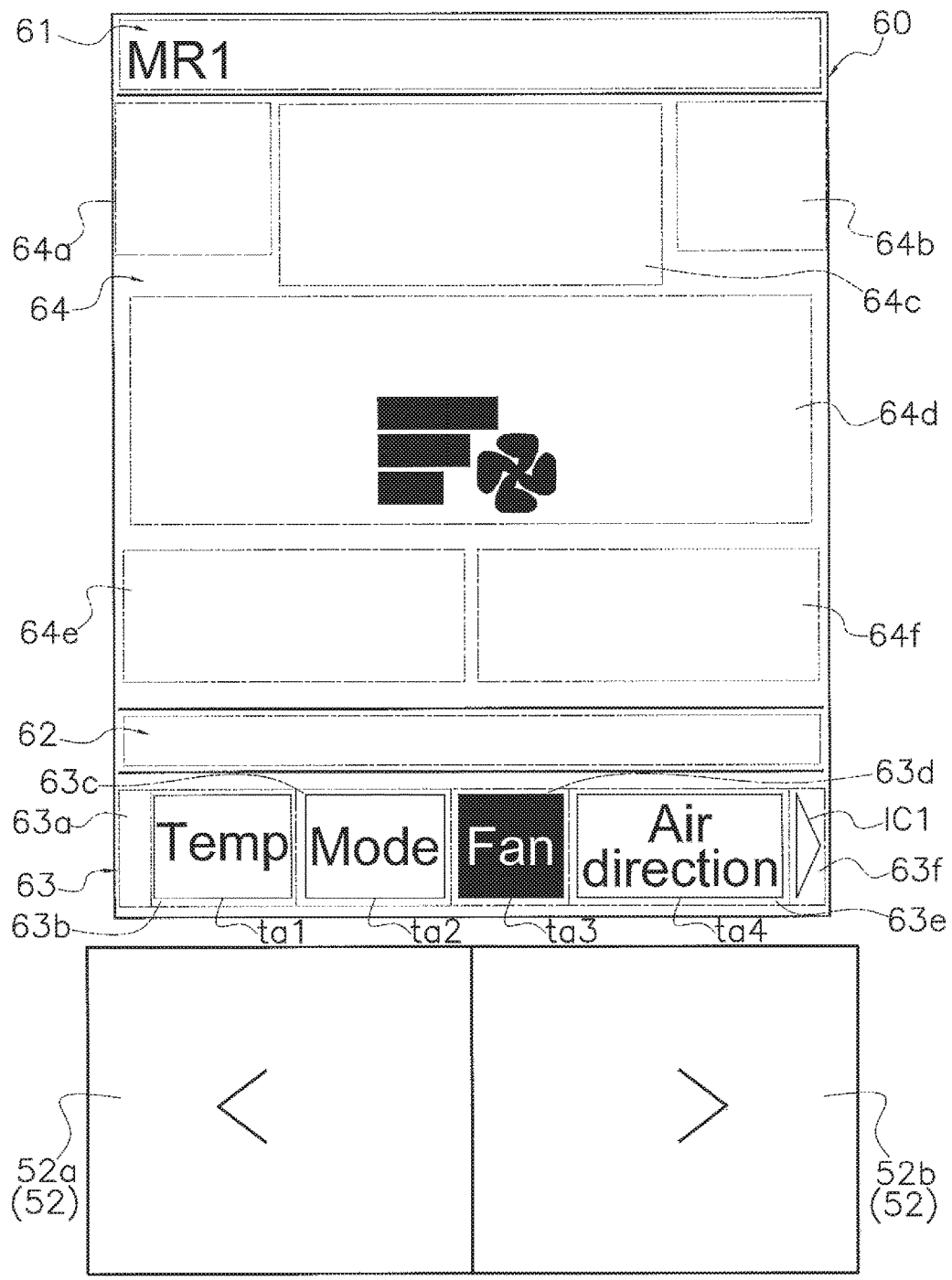
FIG. 15 is a schematic diagram that shows an example of the image displayed in the liquid crystal display unit during the fan speed switch mode.

FIG. 15 is a schematic diagram that shows an example of the image displayed in the liquid crystal display unit 60 during the fan speed switch mode. In accordance with the content of the fan speed switch table TB5 shown in FIG. 14, FIG. 15 shows the text information "MR1" displayed as the installation location information in the first display area 61, the set temperature tab ta1 displayed in the second area 63b, the operation mode tab ta2 displayed in the third area 63c, the set fan speed tab ta3 displayed in the fourth area 63d, the set air direction tab ta4 displayed in the fifth area 63e, and the right icon IC1 displayed in the sixth area 63f, along with the set fan speed information including a graph indicating the set state of the set fan speed (fan speed: medium) being displayed in the 14th area 64d.

It should be noted that, in FIG. 15, the set fan speed tab ta3 displayed in the fourth area 63d, in connection with the highlighting information defined in the fan speed switch table TB5 shown in FIG. 14, is highlighted by an inverted display (that is, display with the white and black inverted), in contrast to the display thereof during the standby mode. Only the set fan speed information is displayed in the fourth display area 64. In this way, since the information pertaining to the setting item being set (setting fan speed) is highlighted in the third display area 63 (set fan speed tab ta3), and only the information (set fan speed information) pertaining to the setting item (setting fan speed) being set is displayed in the fourth display area 64, the operator is able to easily discern the fact that the set fan speed is being set in the fan speed switch mode (that is, that the set fan speed has been selected as the setting item to be set).

In the fan speed switch mode, the set fan speed is switched in accordance with the definition content of a fan speed table TB6, on the basis of the value of the variable B of the change key flag 706c (that is, on the basis of the input via the change key 53).

FIG. 16 is a schematic diagram that shows an example of the fan speed table TB6. In the fan speed table TB6, the relation between the fan speed stage (level) and the set order is defined. In the fan speed table TB6 shown in FIG. 16, as the set order "LOWEST" is assigned first, "LOW" second, "MEDIUM" third, "HIGH" fourth, and "HIGHEST" fifth.

Figure 17:
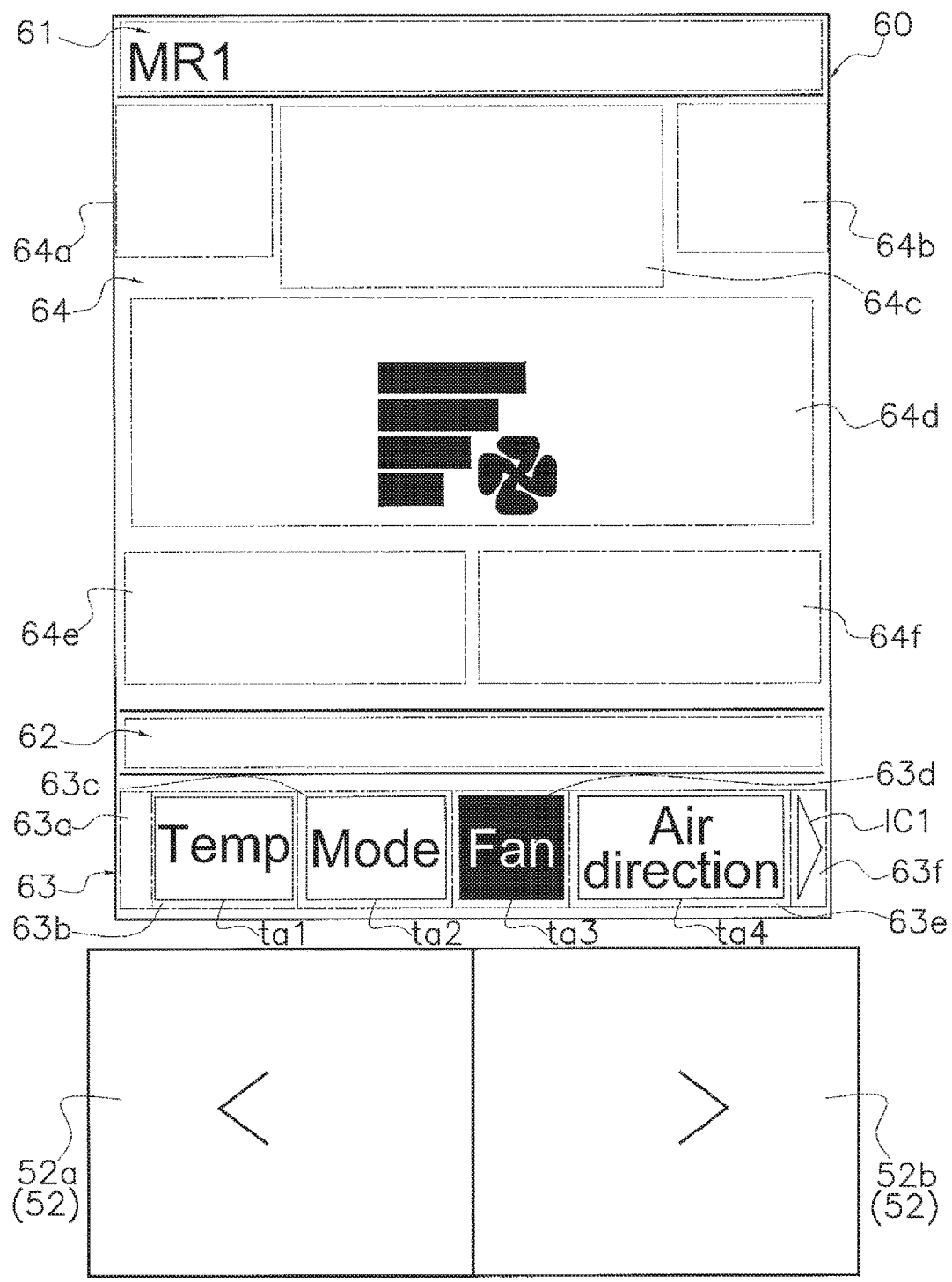
FIG. 17 is a schematic diagram that shows another example of the image displayed in the liquid crystal display unit during the fan speed switch mode.

Specifically, when the value of the variable B increases by 1 in the fan speed switch mode (that is, an input is made via the first change key 53a), the remote controller control unit 70 switches and updates to the fan speed stage assigned the set order obtained by adding 1 to the set order of the stage of setting fan speed stored in the third storage unit 703. For example, in the state of the set fan speed being "MEDIUM" (that is, the state in which the stage of setting fan speed stored in the third storage unit 703 is the fan speed "MEDIUM", which is assigned the set order 3), when the fan speed switch mode has been entered and the value of variable B increases by 1, the stage of the set fan speed stored in the third storage unit 703 is updated to the fan speed "HIGH", which is assigned the set order 4. As a result, the stage of the set fan speed indicated in a graph included in the set fan speed information displayed in the 14th area 64d is updated from "MEDIUM" to "HIGH". Thereby, the image as shown in FIG. 17 is displayed in the liquid crystal display unit 60.

When the value of the variable B decreases by 1 in the fan speed switch mode (that is, an input is made via the second change key 53b), the remote controller control unit 70 switches and updates to the stage of setting fan speed assigned the set order obtained by subtracting 1 from the set order of the stage of setting fan speed stored in the third storage unit 703. For example, in the state of the stage of the set fan speed being "HIGHEST" (that is, the state in which the stage of setting fan speed stored in the third storage unit 703 is "HIGHEST", which is assigned the set order 5), when the fan speed switch mode has been entered and the value of variable B decreases by 1, the stage of the set fan speed stored in the third storage unit 703 is updated to the set fan speed "HIGH", which is assigned the set order 4. As a result, the stage of the set fan speed indicated in the graph included in the set fan speed information displayed in the 14th area 64d is updated from "MEDIUM" to "HIGH". Thereby, the image as shown in FIG. 17 is displayed in the liquid crystal display unit 60.

In this way, the remote controller control unit 70 enters the fan speed switch mode on the basis of input via the F1 key 52a or F2 key 52b and switches the stage of setting fan speed based on input via the first change key 53a or the second change key 53b. Thus, the operator can select the set fan speed as a setting item pertaining to the setting by selecting the set fan speed tab ta3 by input via the F1 key 52a or F2 key 52, with switching of the set fan speed being possible via the first change key 53a and the second change key 53b.

(3-5) Air Direction Switch Mode

The air direction switch mode is a control mode that is entered when switching the setting air direction. Specifically, the remote controller control unit 70 enters the air direction switch mode when, while in the fan speed switch mode, the value of variable A of the F key flag 706b has decreased by 1 (that is, when there has been one input via the F2 key 52b), or when, while in the menu setting switch mode, the value of variable A has increased by 1 (that is, when there has been one input via the F key 52a).

It should be noted that since the remote controller control unit 70 enters the air direction switch mode by an input made via the F2 key 52b while in the fan speed switch mode, the F2 key 52b can be said to be assigned a function causing a transition to the air direction switch mode during the fan speed switch mode (that is, a setting item selection function or a setting item switch function for selecting the setting air direction as the setting item pertaining to the setting).

Since the remote controller control unit 70 enters the air direction switch mode by an input made via the F1 key 52a while in the menu setting switch mode, the F1 key 52a can be said to be assigned a function causing a transition to the air direction switch mode during the menu setting switch mode.

During the air direction switch mode, the remote controller control unit 70 controls the operation of the liquid crystal display unit 60 so that each information stored in the third storage unit 703 is displayed in accordance with an air direction switch table TB7 stored in the fifth storage unit 705.

FIG. 18 is a schematic diagram that shows an example of the air direction switch table TB7. The content to be displayed in each display area (61 to 64) of the liquid crystal display unit 60 during the air direction switch mode is registered in the air direction switch table TB7. In the air direction switch table TB7 shown in FIG. 18, the display content is individually defined in the rows corresponding to the display areas so that the display content shown in FIG. 19 is displayed in the liquid crystal display unit 60.

Also, in the air direction switch table TB7, in addition to the display content of each display area, a highlighting information is defined in relation to each display information. For example, in the air direction switch table TB7 shown in FIG. 18, in the row corresponding to the fifth area 63e, a highlighting information is defined so that highlighting of the set air direction tab ta4 in the fifth area 63e may be carried out.

Also, although not illustrated in FIG. 18, in addition to display content of each display area, the information designating the display mode (size, coordinate range, and the like) is registered in the air direction switch table TB7. The content of the air direction switch table TB7 can be updated via an external device such as the administrative server 90.

Figure 19:
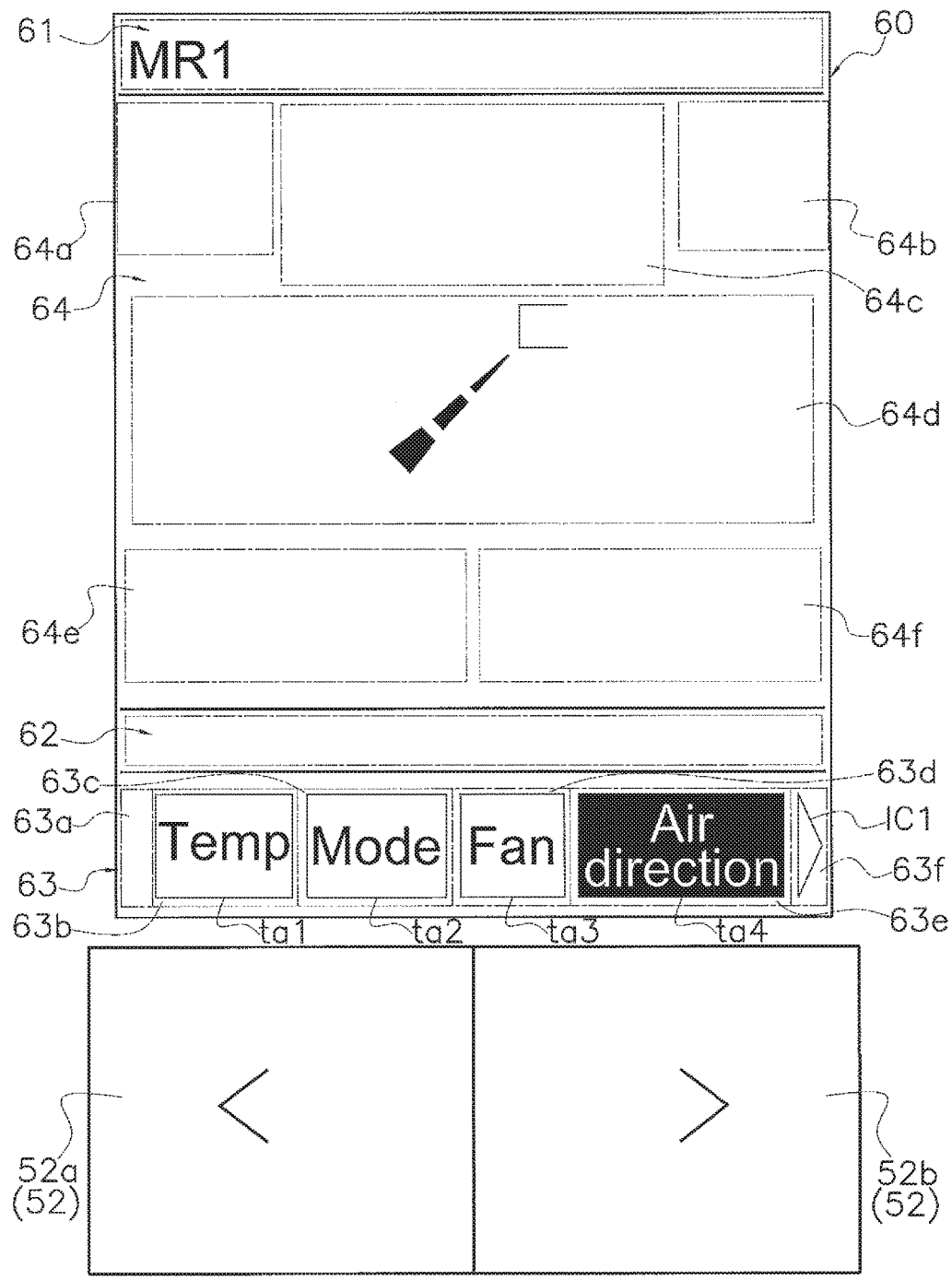
FIG. 19 is a schematic diagram that shows an example of the image displayed in the liquid crystal display unit during the air direction switch mode.

FIG. 19 is a schematic diagram that shows an example of the image displayed in the liquid crystal display unit 60 during the air direction switch mode. In accordance with the content of the air direction switch table TB7 shown in FIG. 18, FIG. 19 shows the text information "MR1" displayed as the installation location information in the first display area 61, the set temperature tab ta1 displayed in the second area 63b, the operation mode tab ta2 displayed in the third area 63c, the set fan speed tab ta3 displayed in the fourth area 63d, the set air direction tab ta4 displayed in the fifth area 63e, and the right icon IC1 displayed in the sixth area 63f, along with the set air direction information including a graph indicating the set state of the setting air direction (air direction: middle) being displayed in the 14th area 64d.

In FIG. 19, the set air direction tab ta4 displayed in the fifth area 63e, in connection with the highlighting information defined in the air direction switch table TB7 shown in FIG. 18, is highlighted by an inverted display (that is, display with the white and black inverted), in contrast to the display thereof during the standby mode. Only the set air direction information is displayed in the fourth display area 64. In this way, by highlighting the information pertaining to the setting item being set (setting air direction) in the third display area 63 (set air direction tab ta4), and displaying only the information (set air direction information) pertaining to the setting item (setting air direction) being set in the fourth display area 64, the operator is able to easily discern the fact that the setting air direction is being set in the air direction switch mode (that is, that the setting air direction has been selected as the setting item to be set).

In the air direction switch mode, the setting air direction is switched in accordance with the definition content of an air direction table TB8, on the basis of the value of the variable B of the change key flag 706c (that is, on the basis of the input via the change key 53).

FIG. 20 is a schematic diagram that shows an example of the air direction table TB8. In the air direction table TB8, the relation between the stage of the air direction and the set order is defined. In the air direction table TB8 shown in FIG. 20, as the set order "LOWEST" is assigned first, "LOW" second, "MIDDLE" third, "HIGH" fourth, and "HIGHEST" fifth.

Figure 21:
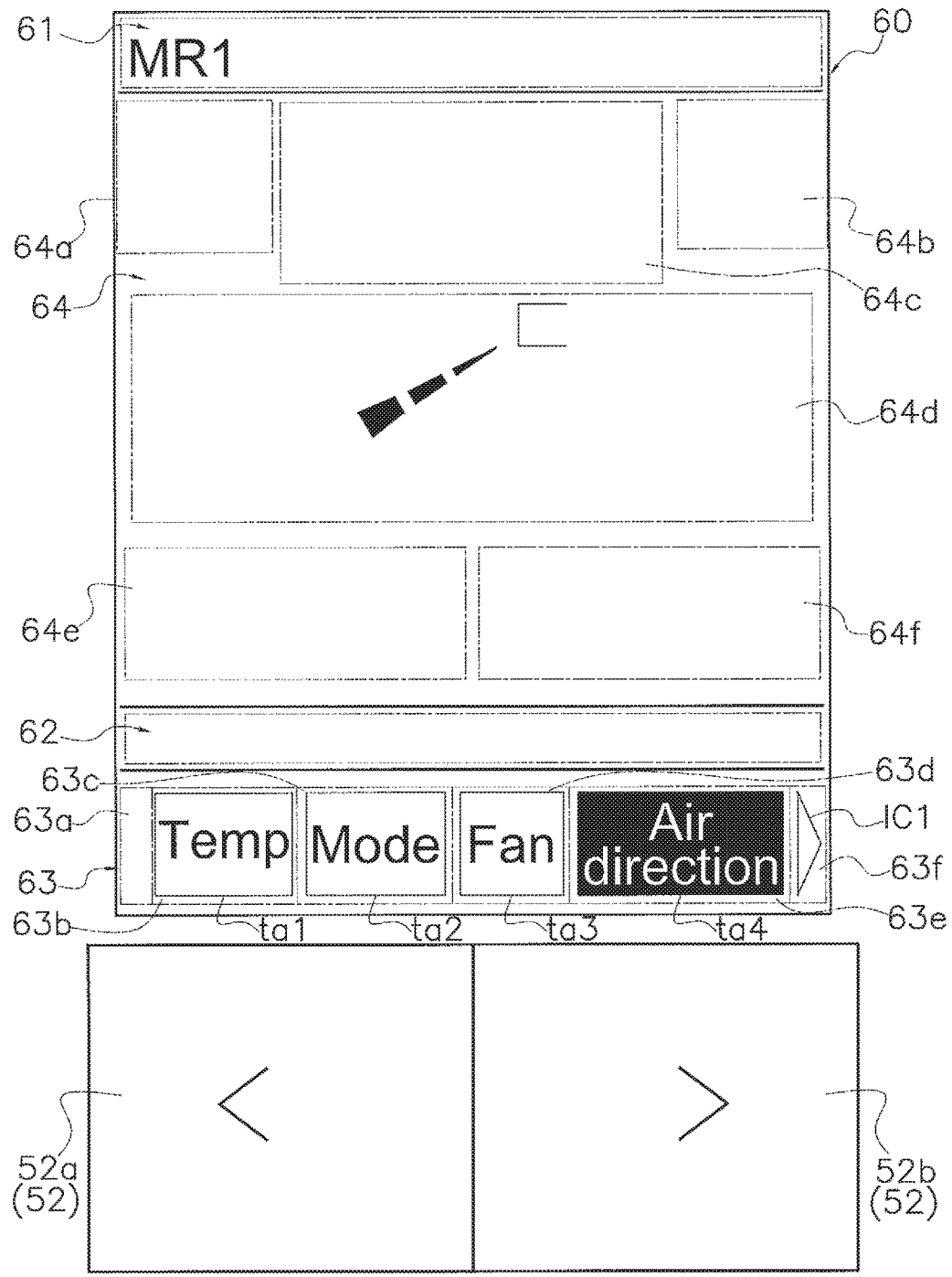
FIG. 21 is a schematic diagram that shows another example of the image displayed in the liquid crystal display unit during the air direction switch mode.

Specifically, when the value of the variable B increases by 1 in the air direction switch mode (that is, an input is made via the first change key 53a), the remote controller control unit 70 switches and updates to the stage of air direction assigned the set order obtained by adding 1 to the set order of the stage of setting air direction stored in the third storage unit 703. For example, in the state of the setting air direction being "MIDDLE" (that is, the state in which the stage of setting air direction stored in the third storage unit 703 is the air direction "MIDDLE", which is assigned the set order 3), when the air direction switch mode has been entered and the value of variable B increases by 1, the stage of the setting air direction stored in the third storage unit 703 is updated to the air direction "HIGH", which is assigned the set order 4. As a result, the stage of the setting air direction indicated in a graph included in the set air direction information displayed in the 14th area 64d is updated from "MIDDLE" to "HIGH". Thereby, the image as shown in FIG. 21 is displayed in the liquid crystal display unit 60.

When the value of the variable B decreases by 1 in the air direction switch mode (that is, an input is made via the second change key 53b), the remote controller control unit 70 switches and updates to the stage of setting air direction assigned the set order obtained by subtracting 1 from the set order of the stage of setting air direction stored in the third storage unit 703. For example, in the state of the stage of the setting air direction being "HIGHEST" (that is, the state in which the stage of setting air direction stored in the third storage unit 703 is "HIGHEST", which is assigned the set order 5), when the air direction switch mode has been entered and the value of variable B decreases by 1, the stage of the setting air direction stored in the third storage unit 703 is updated to the setting air direction "HIGH", which is assigned the set order 4. As a result, the stage of the setting air direction indicated in a graph included in the set air direction information displayed in the 14th area 64d is updated from "HIGHEST" to "HIGH". Thereby, the image as shown in FIG. 21 is displayed in the liquid crystal display unit 60.

In this way, the remote controller control unit 70 enters the air direction switch mode on the basis of input via the F1 key 52a or F2 key 52b and switches the stage of the set air direction on the basis of input via the first change key 53a or the second change key 53b. Thus, the operator can select the setting air direction as a setting item pertaining to the setting by selecting the set air direction tab ta4 by input via the F1 key 52a or F2 key 52b, and can switch the setting air direction via the first change key 53a and the second change key 53b.

(3-6) Menu Setting Switch Mode

The menu setting switch mode is a control mode that is entered during switching of a menu setting item. Menu setting items in the air conditioner 100 include, for example, the eco full-automatic setting for reducing power consumption, the language setting for setting a display language in the liquid crystal display unit 60, and the timer setting that causes operation to stop after elapse of a designated time.

Here, since menu setting items are considered as setting items that are not frequently used, the setting item tab ta (menu setting tab ta5) pertaining to menu setting items is not displayed in the third display area 63 during the standby mode. That is, in the remote controller 30, due to the relation between the size of the display area of the third display area 63 and the size of each setting item tab ta, it is difficult to display five or more setting item tabs ta in the third display area 63 in consideration of the visibility. For this reason, the menu setting tab ta5, which is not so frequently used, is not displayed in control modes other than the menu setting switch mode (that is, the menu setting tab ta5, in control modes other than the menu setting switch mode, corresponds to a "non-displayed setting item information" recited in the claims).

On the other hand, during the other control modes in which the menu setting tab ta5 is not displayed in the third display area 63, the right icon IC1 is displayed in the sixth area 63f (that is, the area in the vicinity (right side) of the set air direction tab ta4 that is displayed near the right-side end part of the third display area 63), whereby the concealed menu setting tab ta5 following the set air direction tab ta4 is indirectly indicated (refer to FIG. 5). Thereby, the viewer and operator of the liquid crystal display unit 60 easily recognizes that, besides the setting item tabs ta that are displayed in the third display area 63, a setting item tab ta (menu setting tab ta5) is concealed (that is, the existence of the menu setting tab ta5) (in other words, the right icon IC1 corresponds to a "non-displayed setting item identifying information" recited in the claims).

Specifically, when the remote controller control unit 70 is in the air direction switch mode and the value of variable A of the F key flag 706b has decreased by 1 (that is, when there has been one input via the F2 key 52b), the remote controller control unit 70 enters the menu setting switch mode. Since the remote controller control unit 70 enters the menu setting switch mode by an input made via the F2 key 52b while in the air direction switch mode, the F2 key 52b can be said to be assigned a function causing a transition to the menu setting switch mode during the air direction switch mode (that is, a setting item selection function or a setting item switch function for selecting the menu setting item as the setting item pertaining to the setting).

During the menu setting switch mode, the remote controller control unit 70 controls the operation of the liquid crystal display unit 60 so that predetermined menu setting items are displayed in accordance with a menu setting display table TB9 stored in the fifth storage unit 705.

FIG. 22 is a schematic diagram that shows an example of the menu setting display table TB9. The display content of each display area (61 to 64) of the liquid crystal display unit 60 during the menu setting switch mode is registered in the menu setting display table TB9. In the menu setting display table TB9 shown in FIG. 22, the display content is individually defined in the rows corresponding to the display areas so that the display content shown in FIG. 23 is displayed in the liquid crystal display unit 60.

Also, in the menu setting display table TB9, in addition to the display content of each display area, a highlighting information is defined in relation to each display information. For example, in the menu setting display table TB9 shown in FIG. 22, in the row corresponding to the fifth area 63e, a highlighting information is defined so that the setting item tab ta (menu setting tab ta5) including the text information "Menu" in the fifth area 63e can be highlighted.

Also, although not illustrated in FIG. 22, in addition to display content of each display area, the information designating the display mode (size, coordinate range, and the like) is registered in the menu setting display table TB9. The content of the menu setting display table TB9 can be updated via an external device such as the administrative server 90.

Figure 23:
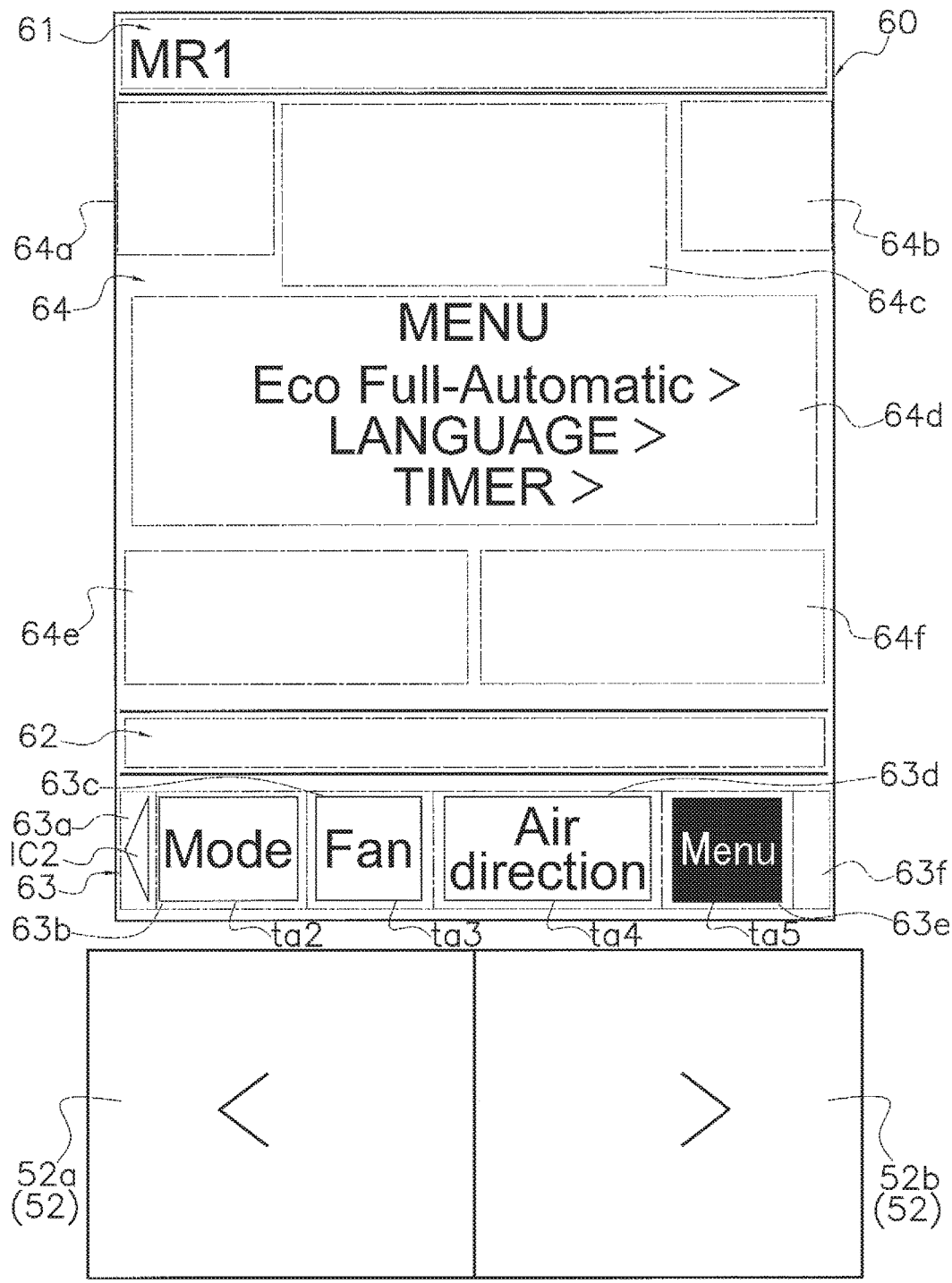
FIG. 23 is a schematic diagram that shows an example of the image displayed in the liquid crystal display unit during the menu setting switch mode.

FIG. 23 is a schematic diagram that shows an example of the image displayed in the liquid crystal display unit 60 during the menu setting switch mode. In accordance with the content of the menu setting display table TB9 shown in FIG. 22, FIG. 23 shows the text information "MR1" displayed as the installation location information in the first display area 61, an icon with a generally triangular shape (a triangle having its apices on the top, bottom and left) (left icon IC2) displayed in the first area 63a, the operation mode tab ta2 displayed in the second area 63b, the set fan speed tab ta3 displayed in the third area 63c, the set air direction tab ta4 displayed in the fourth area 63d, and the menu setting tab ta5 displayed in the fifth area 63e, with the text information "Menu" indicating that menu setting items are currently being set and information (menu setting information) including the text information "Eco full-automatic", "Language", and "Timer" pertaining to the menu setting items being displayed in the 14th area 64d.

Note that, in FIG. 23, the menu setting tab ta5 displayed in the fifth area 63e, in connection with the highlighting information defined in the menu setting display table TB9 shown in FIG. 22, is highlighted by an inverted display (that is, display with the white and black inverted). Only menu setting information is displayed in the fourth display area 64. In this way, since the information (menu setting tab ta5) pertaining to the setting item being set (menu setting item) is highlighted in the third display area 63, and only information (menu setting information) pertaining to the setting items being set (menu setting items) is displayed in the fourth display area 64, the operator is able to easily discern the fact that menu setting items are being set in the menu setting switch mode (that is, that the menu setting has been selected as the setting item to be set).

The menu setting tab ta5 described above, although being a setting item tab ta that is ordinarily not displayed (hidden), is displayed in the menu setting switch mode. In connection to this, another setting item tab ta that is normally displayed is not displayed in the menu setting switch mode. That is, in the remote controller 30, from the relation between the size of the display area of the third display area 63 and the size of each setting item tab ta, it is difficult to display five or more setting item tabs ta in the third display area 63. Therefore, one or another of the setting item tabs ta other than the menu setting tab ta5 is hidden in the third display area 63.

In FIG. 23, in connection with the menu setting tab ta5 being displayed in the fifth area 63e, the set temperature tab ta1 (that is, the set temperature tab ta1 that was displayed near the left-side end part of the third display area 63 in the control mode prior to entering the menu setting switch mode) is hidden from the third display area 63, and the other setting item tabs ta each move one area to the left from the display state during the standby mode. In addition, the left icon IC2 is displayed in the first area 63a (that is, the area in the vicinity (left side) of the operation mode tab ta2 displayed near the left-side end part of the third display area 63), whereby the concealed set temperature tab ta1 at the front (left side) of the operation mode tab ta2 is indirectly indicated. Thereby, the viewer and operator of the liquid crystal display unit 60 easily recognizes that, besides the setting item tabs ta that are displayed in the third display area 63, a setting item tab ta (set temperature tab ta1) is concealed. That is, during the menu setting switch mode, the set temperature tab ta1 corresponds to a "non-displayed setting item information" recited in the claims, and the left icon IC2 corresponds to a "non-displayed setting item identifying information" recited in the claims.

In the menu setting switch mode, the menu setting item pertaining to the setting (that is, to be selected) is switched in accordance with the definition content of a menu table TB10 on the basis of the value of the variable B of the change key flag 706c (that is, on the basis of input via the change keys 53).

FIG. 24 is a schematic diagram that shows an example of the menu table TB10. In the menu table TB10, the relation between the menu setting items that are selected and the set orders is defined. In the menu table TB10 shown in FIG. 24, as the set order "Eco Full-Automatic Setting" is assigned first, "Language Setting" second, and "Timer Setting" third.

More precisely, on the basis of a change in the value of the variable B in the menu setting switch mode, the remote controller control unit 70 enters any of the lower-level control modes provided in the menu setting switch mode (specifically, the eco full-automatic setting selection mode relating to the eco full-automatic setting, the language setting selection mode relating to language setting, and the timer setting selection mode relating to timer setting).

Hereinbelow, representative examples of lower-level control modes of the menu setting switch mode are described.
(a)

Specifically, when the value of the variable B in the menu setting switch mode increases by 1 or decreases by 1 (that is, when an input is made via either the first change key 53a or the second change key 53b), the remote controller control unit 70 enters the eco full-automatic setting selection mode.

The eco full-automatic setting selection mode is a control mode for determining whether or not to set the eco full-automatic setting. During the eco full-automatic setting selection mode, the remote controller control unit 70 controls the operation of the liquid crystal display unit 60 so that each information is displayed in accordance with an eco full-automatic setting selection table TB11 that is stored in the fifth storage unit 705.

Figure 26:
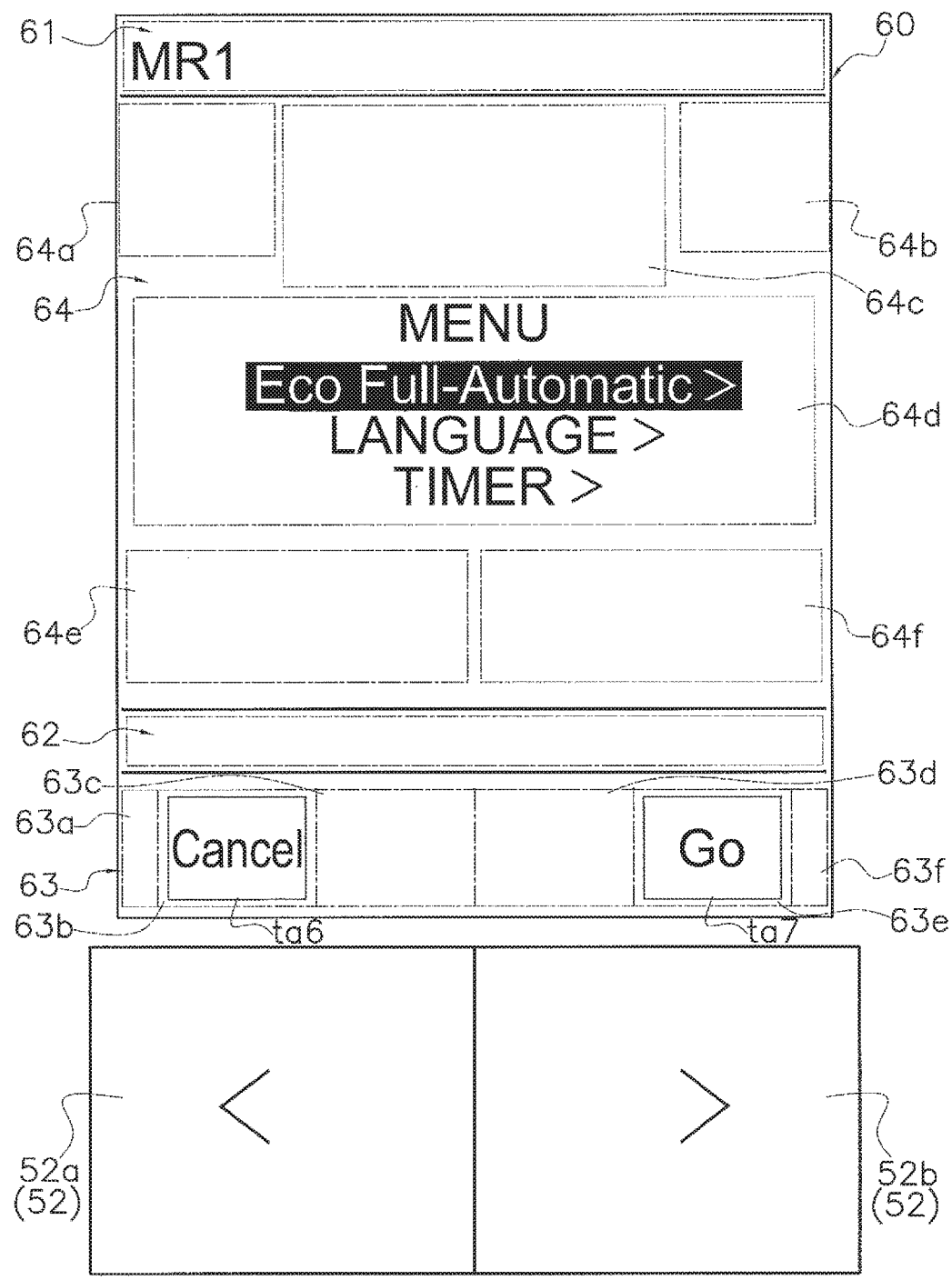
FIG. 26 is a schematic diagram that shows an example of the image displayed in the liquid crystal display unit during the eco full-automatic setting selection mode.

FIG. 25 is a schematic diagram that shows an example of the eco full-automatic setting selection table TB11. The content to be displayed in each display area (61 to 64) of the liquid crystal display unit 60 during the eco full-automatic setting selection mode is registered in the eco full-automatic setting selection table TB11. In the eco full-automatic setting selection table TB11 shown in FIG. 25, the display content is individually defined in the rows corresponding to the display areas so that the display content shown in FIG. 26 is displayed in the liquid crystal display unit 60. Also, although not illustrated in FIG. 25, in addition to display content of each display area, the information designating the display mode (size, coordinate range, and the like) is registered in the eco full-automatic setting selection table TB11. The content of the eco full-automatic setting selection table TB11 can be updated via an external device such as the administrative server 90.

FIG. 26 is a schematic diagram that shows an example of the image displayed in the liquid crystal display unit 60 during the eco full-automatic setting selection mode. In accordance with the content of the eco full-automatic setting selection table TB11 shown in FIG. 25, FIG. 26 shows the text information "MR1" displayed as the installation location information in the first display area 61, a cancellation tab ta6 including the text information "Cancel" identifying the cancelling of the setting of the eco full-automatic setting displayed in the second area 63b, and a determination tab ta7 including the text information "Go" that determines the performance of the setting of the eco full-automatic setting displayed in the fifth area 63e. Also, in FIG. 26, the information (eco full-automatic highlighting information) in which the text information "Eco full-automatic" is highlighted is displayed in the 14th area 64d so as to indicate a setting screen for determining whether or not to perform the setting of the eco full-automatic setting.

In the eco full-automatic setting selection mode, on the basis of the value of variable A of the F key flag 706b (that is, on the basis of input via the F1 key 52a or the F2 key 52b) it is determined whether to perform the setting of the eco full-automatic setting or to cancel the setting. Specifically, in the eco full-automatic setting selection mode, when the value of variable A increases by 1 (that is, when an input is made via the F1 key 52a), the remote controller control unit 70 cancels the setting of the eco full-automatic setting and enters the menu setting switch mode. On the other hand, in the eco full-automatic setting selection mode, when the value of variable A decreases by 1 (that is, when an input is made via the F2 key 52b), the remote controller control unit 70 determines to perform the setting of the eco full-automatic setting and enters a control mode (eco full-automatic setting mode) that is at a lower level than that of the eco full-automatic setting selection mode. That is, in the eco full-automatic setting selection mode, a cancellation function for cancelling the setting of the eco full-automatic setting is assigned to the F1 key 52a, and a determination function for determining the performance of the setting of the eco full-automatic setting is assigned to the F2 key 52b. The cancellation tab ta6 and the determination tab ta7 are displayed in the third display area 63 in a manner enabling discrimination of the functions assigned to the function keys 52.

The eco full-automatic setting mode is a control mode for switching the setting of the eco full-automatic setting. During the eco full-automatic setting mode, the remote controller control unit 70 controls the operation of the liquid crystal display unit 60 so that each information is displayed in accordance with an eco full-automatic setting table TB12 stored in the fifth storage unit 705.

Figure 28:
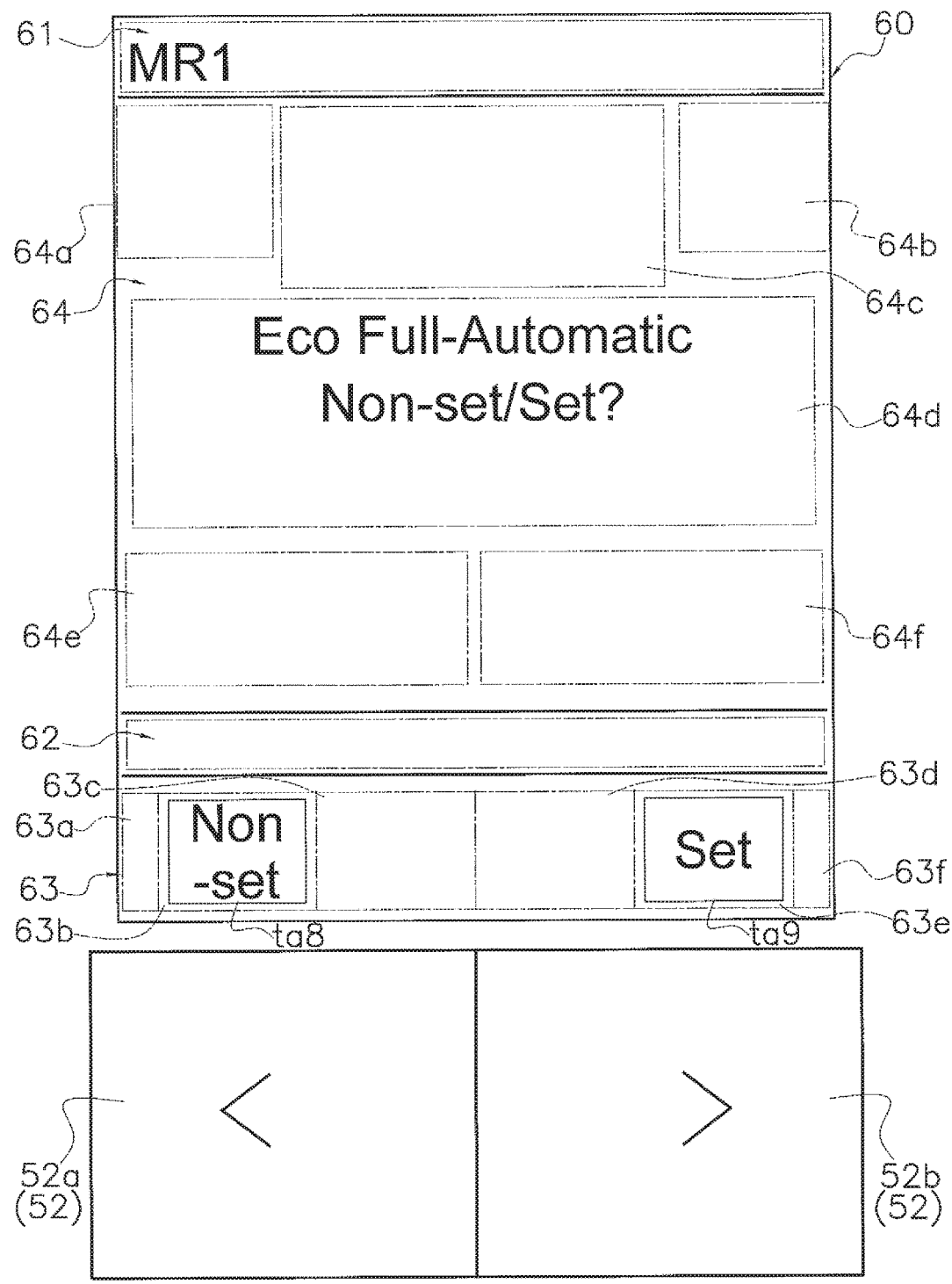
FIG. 28 is a schematic diagram that shows an example of the image displayed in the liquid crystal display unit during the eco full-automatic setting mode.

FIG. 27 is a schematic diagram that shows an example of the eco full-automatic setting table TB12. The content to be displayed in each display area (61 to 64) of the liquid crystal display unit 60 during the eco full-automatic setting mode is registered in the eco full-automatic setting table TB12. In the eco full-automatic setting table TB12 shown in FIG. 27, the display content is individually defined in the rows corresponding to the display areas so that the display content shown in FIG. 28 is displayed in the liquid crystal display unit 60. Also, although not illustrated in FIG. 27, in addition to display content of each display area, the information designating the display mode (size, coordinate range, and the like) is registered in the eco full-automatic setting table TB12. The content of the eco full-automatic setting table TB12 can be updated via an external device such as the administrative server 90.

FIG. 28 is a schematic diagram that shows an example of the image displayed in the liquid crystal display unit 60 during the eco full-automatic setting mode. In accordance with the content of the eco full-automatic setting table TB12 shown in FIG. 27, in FIG. 28 the text information "MR1" is displayed as the installation location information in the first display area 61, a non-set tab ta8 including the text information "Non-set" identifying the switching of the eco full-automatic setting to the non-set state is displayed in the second area 63b, and a set tab ta9 including the text information "Set" identifying the switching of the eco full-automatic setting to the set state is displayed in the fifth area 63e. Also, FIG. 28 shows that the 14th area 64d displays the information (eco full-automatic setting switch information) in which the text information "Eco Full-Automatic Non-set/Set?" is displayed to indicate a setting screen for determining whether to put the setting of the eco full-automatic setting into a set state (valid state), or a non-set state (invalid state).

In the eco full-automatic setting mode, switching of the state of the eco full-automatic setting is executed on the basis of the value of the variable A of the F key flag 706b (that is, on the basis of an input via the F1 key 52a or the F2 key 52b). Specifically, when the value of the variable A increases by 1 in the eco full-automatic setting mode (that is, when an input is made via the F1 key 52a), the remote controller control unit 70 puts the state of the eco full-automatic setting into the non-set state and then enters the menu setting switch mode. On the other hand, when the value of the variable A decreases by 1 in the eco full-automatic setting mode (that is, when an input is made via the F2 key 52b), the remote controller control unit 70 puts the state of the eco full-automatic setting into the set state and then enters the menu setting switch mode. In other words, a non-set switch function that puts the state of the eco full-automatic setting into the non-set state is assigned to the F1 key 52a, and a set switch function that puts the state of the eco full-automatic setting into the set state is assigned to the F2 key 52b. The non-set tab ta8 and the set tab ta9 are displayed in the third display area 63 in a manner enabling discrimination of the functions assigned to the function keys 52.

In this way, in the eco full-automatic setting selection mode that is at a lower level than that of the menu setting switch mode, the eco full-automatic setting mode is provided at a further lower level. That is, hierarchized control modes are provided in the remote controller 30. In relation to this, the images that are displayed in the liquid crystal display unit 60 switch in a hierarchical manner.

(b)

When the value of the variable B decreases by 1 in the eco full-automatic setting selection mode (that is, when an input is made via second change key 53b), the remote controller control unit 70 enters the language setting selection mode.

The language setting selection mode is a control mode for determining whether or not to perform the display language setting (language setting) in the remote controller 30. During the language setting selection mode, the remote controller control unit 70 controls the operation of the liquid crystal display unit 60 so that each information is displayed in accordance with a language setting selection table TB13 that is stored in the fifth storage unit 705.

Figure 30:
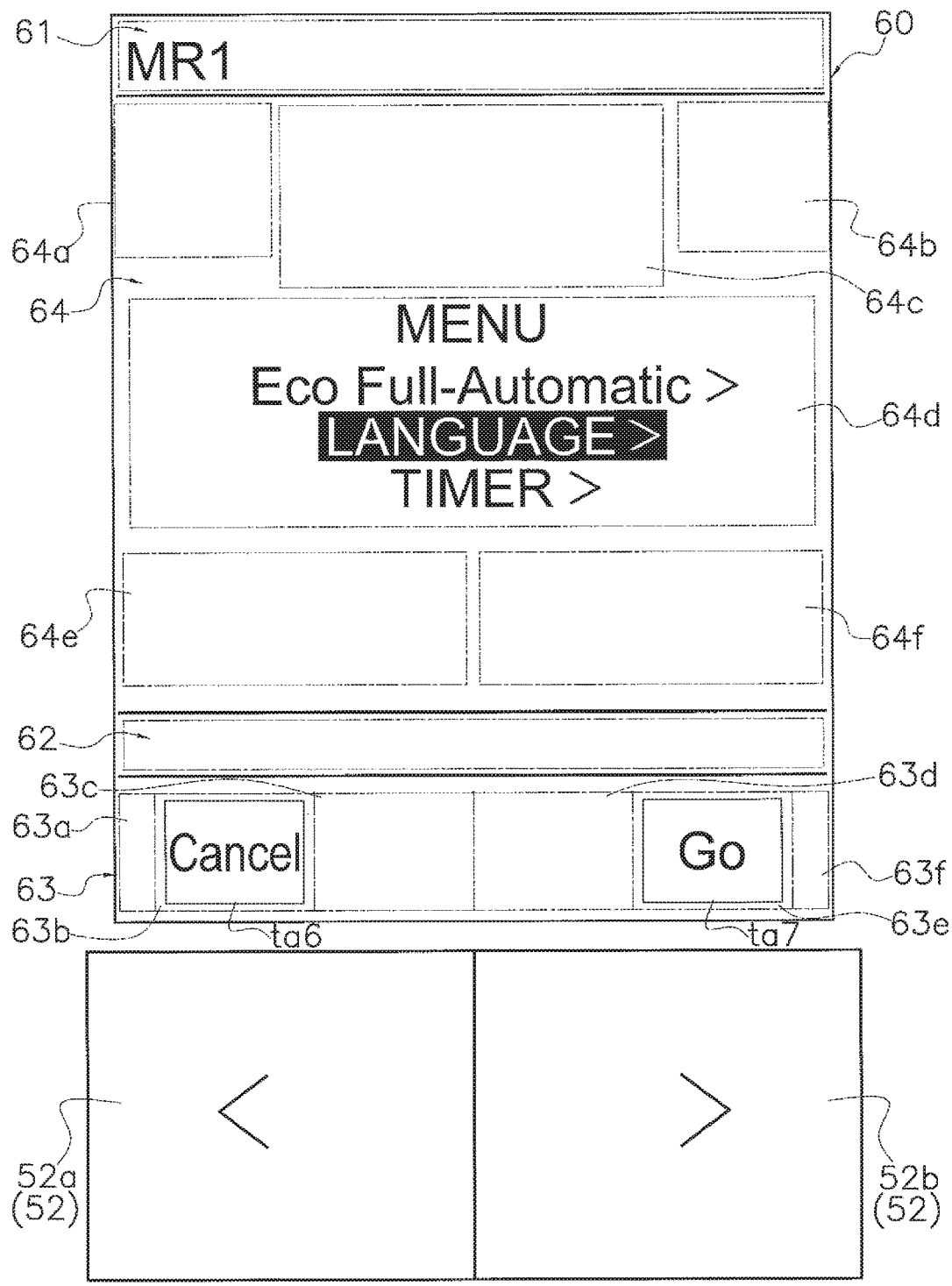
FIG. 30 is a schematic diagram that shows an example of the image displayed in the liquid crystal display unit during a language setting selection mode.

FIG. 29 is a schematic diagram that shows an example of the language setting selection table TB13. The content to be displayed in each display area (61 to 64) of the liquid crystal display unit 60 during the language setting selection mode is registered in the language setting selection table TB13. In the language setting selection table TB13 shown in FIG. 29, the display content is individually defined in the rows corresponding to the display areas so that the display content shown in FIG. 30 is displayed in the liquid crystal display unit 60. Also, although not illustrated in FIG. 29, in addition to display content of each display area, the information designating the display mode (size, coordinate range, and the like) is registered in the language setting selection table TB13. The content of the language setting selection table TB13 can be updated via an external device such as the administrative server 90.

FIG. 30 is a schematic diagram that shows an example of the image displayed in the liquid crystal display unit 60 during the language setting selection mode. In accordance with the content of the language setting selection table TB13 shown in FIG. 29, FIG. 30 shows the text information "MR1" displayed as the installation location information in the first display area 61, a cancellation tab ta6 including the text information "Cancel" identifying the cancelling of the setting of the language setting displayed in the second area 63b, and a determination tab ta7 including the text information "Go" that determines the performance of the setting of the language setting displayed in the fifth area 63e. Also, in FIG. 30, an information (language setting highlighting information) in which the text information "Language" is highlighted is displayed in the 14th area 64d so as to indicate a setting screen for determining whether or not to perform the language setting.

In the language setting selection mode, on the basis of the value of variable A of the F key flag 706b (that is, on the basis of input via the F1 key 52a or the F2 key 52b) it is determined whether to perform the setting of the eco full-automatic setting or to cancel the setting. Specifically, in the language setting selection mode, when the value of variable A increases by 1 (that is, when an input is made via the F1 key 52a), the remote controller control unit 70 cancels the language setting and enters the menu setting switch mode. On the other hand, in the language setting selection mode, when the value of variable A decreases by 1 (that is, when an input is made via the F2 key 52b), the remote controller control unit 70 determines to perform the setting of the language setting and enters a control mode (language setting mode), which is at a lower level than that of the language setting selection mode. That is, in the language setting selection mode, a cancellation function for cancelling the language setting is assigned to the F1 key 52a, and a determination function for determining the performance of the language setting is assigned to the F2 key 52b.

The language setting mode is a control mode for switching the setting of the language setting. During the language setting mode, the remote controller control unit 70 controls the operation of the liquid crystal display unit 60 so that each information is displayed in accordance with a language setting table TB14 stored in the fifth storage unit 705.

Figure 32:
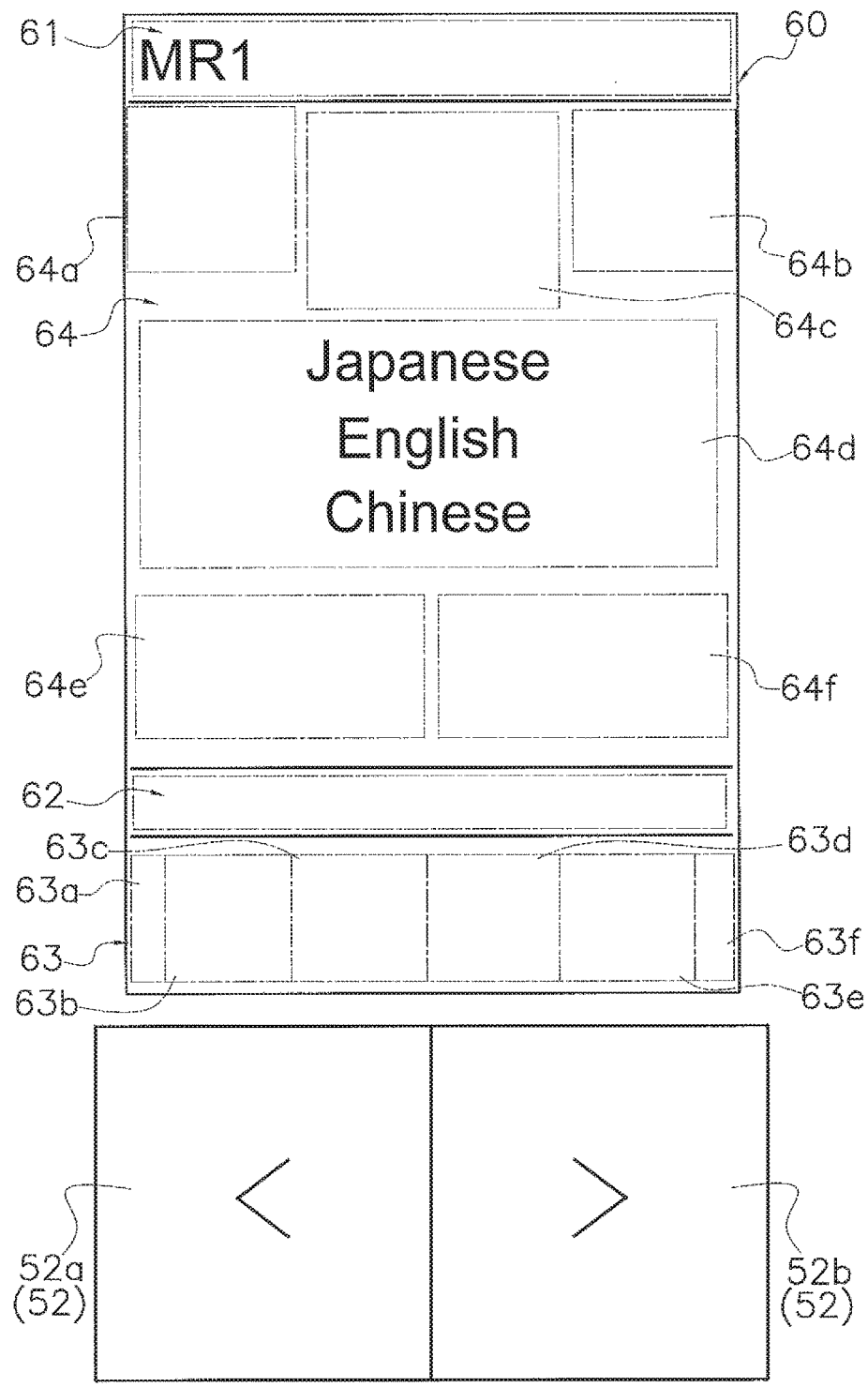
FIG. 32 is a schematic diagram that shows an example of the image displayed in the liquid crystal display unit during the language setting mode.

FIG. 31 is a schematic diagram that shows an example of the language setting table TB14. The content to be displayed in each display area (61 to 64) of the liquid crystal display unit 60 during the language setting mode is registered in the language setting table TB14. In the language setting table TB14 shown in FIG. 31, the display content is individually defined in the rows corresponding to the display areas so that the display content shown in FIG. 32 is displayed in the liquid crystal display unit 60. Also, although not illustrated in FIG. 32, in addition to display content of each display area, the information designating the display mode (size, coordinate range, and the like) is registered in the language setting table TB14. The content of the language setting table TB14 can be updated via an external device such as the administrative server 90.

FIG. 32 is a schematic diagram that shows an example of the image displayed in the liquid crystal display unit 60 during the language setting mode. In accordance with the content of the language setting table TB14 shown in FIG. 31, in FIG. 32 the text information "MR1" is displayed as the installation location information in the first display area 61, and the information (language setting list information) including the text information "Japanese", "English", "Chinese" showing a list of the settable languages (here, Japanese, English and Chinese) is displayed in the 14th area 64d.

In the language setting mode, a transition is made to the Japanese setting mode, which is at a further lower level, on the basis of the value of the variable B of the change key flag 706c (that is, on the basis of input made via the first change key 53a or the second change key 53b). Specifically, when the value of the variable B increases by 1 or decreases by 1 in the language setting mode (that is, when an input is made via the first change key 53a or the second change key 53b), the remote controller control unit 70 enters the Japanese setting mode for determining whether or not to select Japanese for the set language.

In the Japanese setting mode, when the value of the variable B decreases by 1 (that is, when an input is made via the second change key 53b), a transition is made to the English setting mode for determining whether or not to select English for the set language.

In the English setting mode, when the value of the variable B decreases by 1 (that is, when an input is made via the second change key 53b), a transition is made to the Chinese setting mode for determining whether or not to select Chinese for the set language. Also, in the English setting mode, when the value of the variable B increases by 1 (that is, when an input is made via the first change key 53a), a transition is made to the Japanese setting mode for the set language.

That is, in the language setting mode, the Japanese setting mode, English setting mode and Chinese setting mode are provided as further lower level control modes. As lower level control modes in the language setting mode, it is also possible to provide other modes in accordance with variations in the display language (for example, a Spanish setting mode that determines whether or not to select Spanish as the set language, a Korean setting mode that determines whether or not to select Korean as the set language, and the like).

Here, a description will be given for the Japanese setting mode as a representative example of a lower level control mode in the language setting mode.

During the Japanese setting mode, the remote controller control unit 70 controls the operation of the liquid crystal display unit 60 so that each information is displayed in accordance with a Japanese setting table TB15 stored in the fifth storage unit 705.

Figure 34:
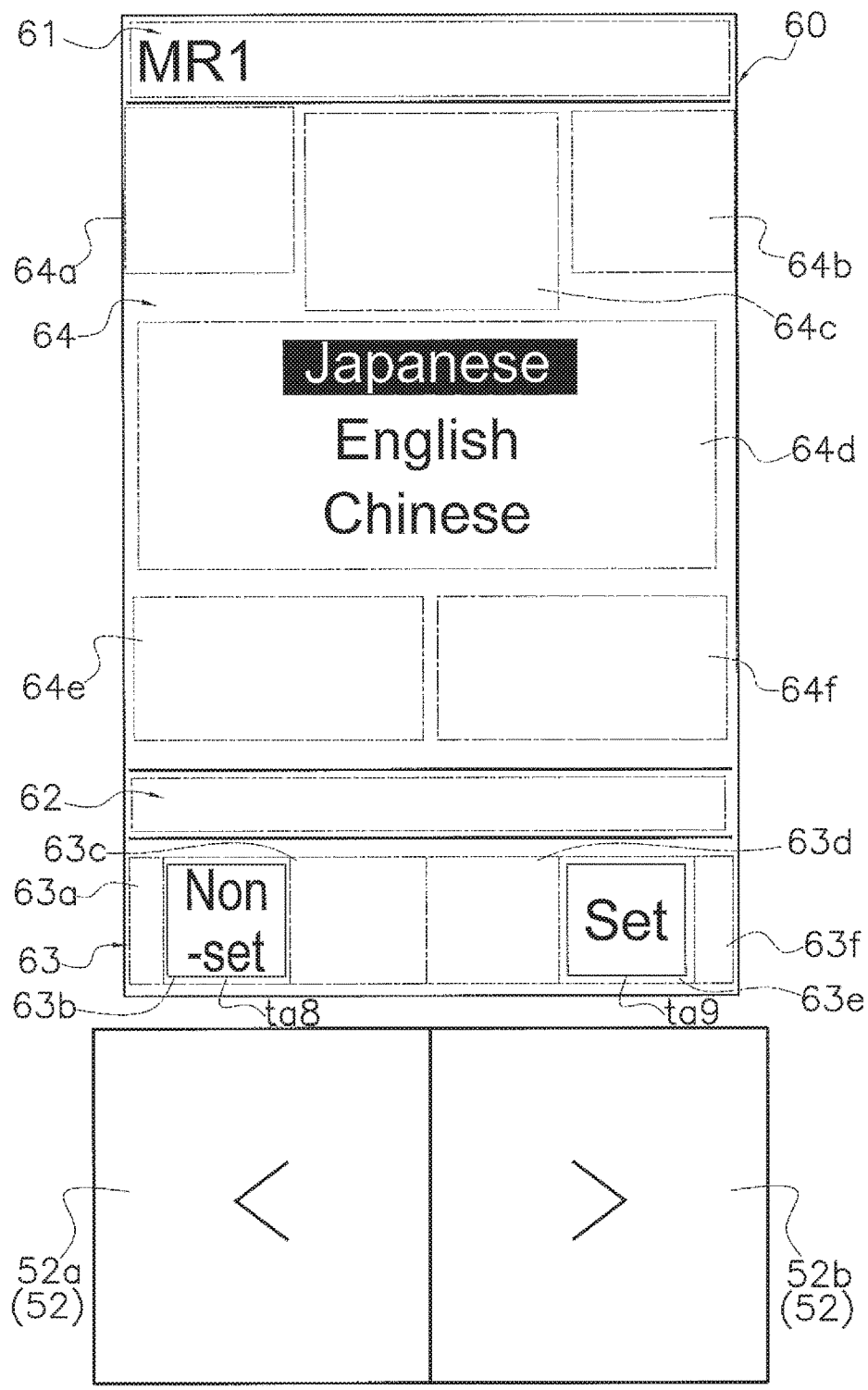
FIG. 34 is a schematic diagram that shows an example of the image displayed in the liquid crystal display unit during the Japanese setting mode.

FIG. 33 is a schematic diagram that shows an example of the Japanese setting table TB15. The content to be displayed in each of the display areas (61 to 64) of the liquid crystal display unit 60 during the Japanese setting mode is registered in the Japanese setting table TB15. In the Japanese setting table TB15 shown in FIG. 33, the display content is individually defined in the rows corresponding to the display areas so that the display content shown in FIG. 34 is displayed in the liquid crystal display unit 60. Although not illustrated in FIG. 34, the information designating the display mode (size, coordinate range, and the like) is registered in the Japanese setting table TB15 in addition to the display content in each display area. The content of the Japanese setting table TB15 can be updated via an external device such as the administrative server 90.

FIG. 34 is a schematic diagram that shows an example of the image displayed in the liquid crystal display unit 60 during the Japanese setting mode. In accordance with the content of the Japanese setting table TB15 shown in FIG. 33, in FIG. 34 the text information "MR1" is displayed as the installation location information in the first display area 61, a non-set tab ta8 including the text information "Non-set" that cancels the switching of the set language to Japanese is displayed in the second area 63*b*, and a set tab ta9 including the text information "Set" that specifies the switching of the set language to Japanese is displayed in the fifth area 63*e*. Also, FIG. 34 shows that the 14th area 64*d* displays the information (Japanese selection information) in which the text information "Japanese" is highlighted in the set language list information, to indicate a setting screen for determining whether to select Japanese as the set language.

In the Japanese setting mode, on the basis of the value of variable A of the F key flag 706*b* (that is, on the basis of input via the F1 key 52*a* or the F2 key 52*b*) it is determined whether or not Japanese is decided to be the set language or cancelled. Specifically, in the Japanese setting mode, when the value of variable A increases by 1 (that is, when an input is made via the F1 key 52*a*), the remote controller control unit 70 cancels the setting of Japanese as the set language and enters the language setting mode. On the other hand, in the Japanese setting mode, when the value of variable A decreases by 1 (that is, when an input is made via the F2 key 52*b*), the remote controller control unit 70 determines to set Japanese as the set language and enters the menu setting switch mode. In other words, in the Japanese setting mode, a non-set switch function that does not set Japanese as the set language is assigned to the F1 key 52*a*, and a set switch function that sets Japanese as the set language is assigned to the F2 key 52*b*. The non-set tab ta8 and the set tab ta9 are displayed in the third display area 63 in a manner enabling discrimination of the functions assigned to the function keys 52.

In the other modes (the English setting mode, the Chinese setting mode and the like), similarly to the Japanese setting mode, the display is performed in accordance with a table that specifies the display content in the liquid crystal display unit 60, and the setting of the set language is performed on the basis of the function keys 52.

In this way, in the language setting selection mode that is at a lower level than that of the menu setting switch mode, the language setting mode is provided at a further lower level, with the Japanese setting mode, the English setting mode, and the Chinese setting mode provided at a further lower level. That is, hierarchized control modes are provided in the remote controller 30. In relation to this, the images that are displayed in the liquid crystal display unit 60 switch in a hierarchical manner.

(4) Control Mode Transition Flow in Remote Controller Control Unit 70

Figure 35:
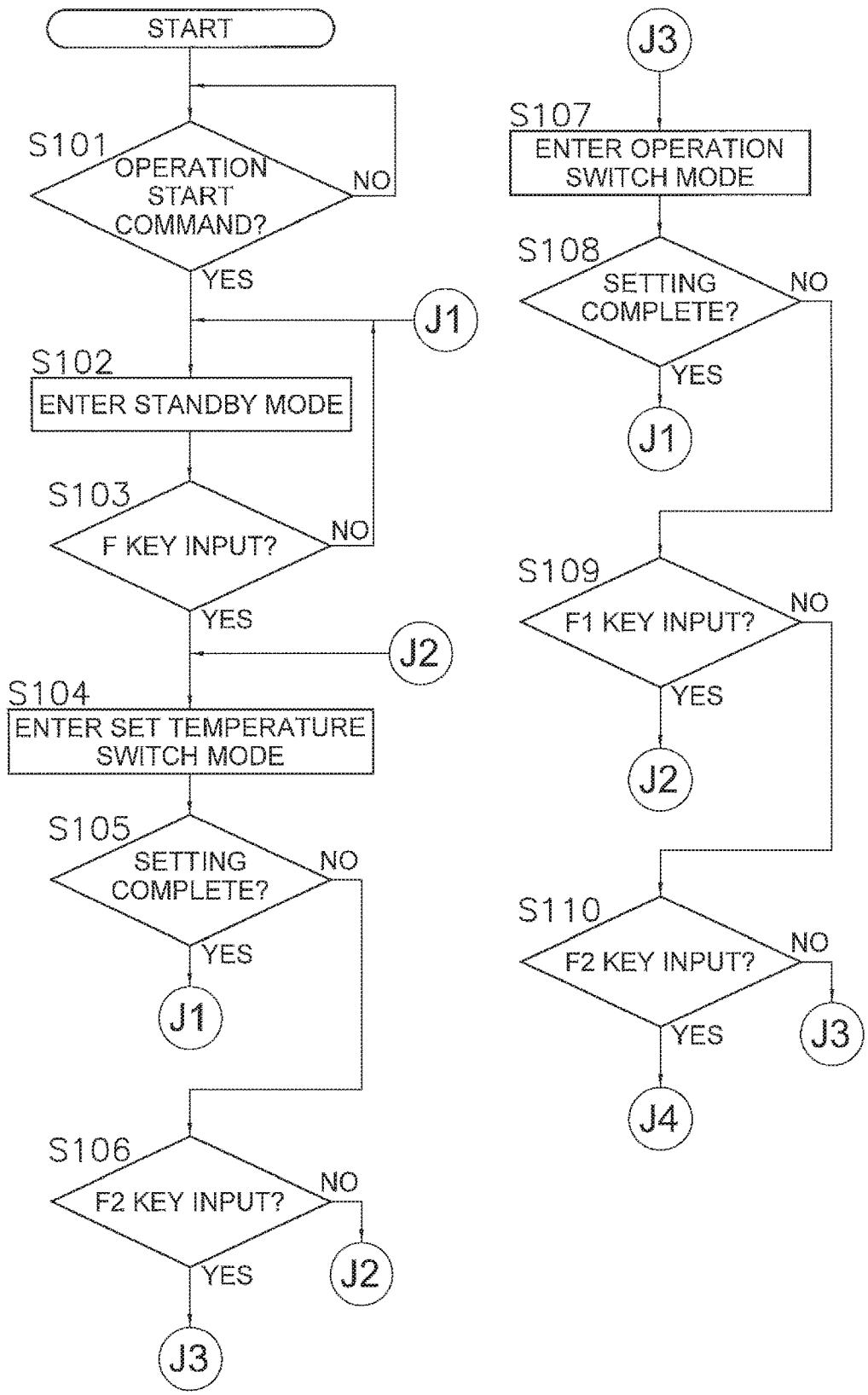
FIG. 35 is a flowchart that shows an example of a control mode transition flow in a remote controller control unit.
Figure 36:
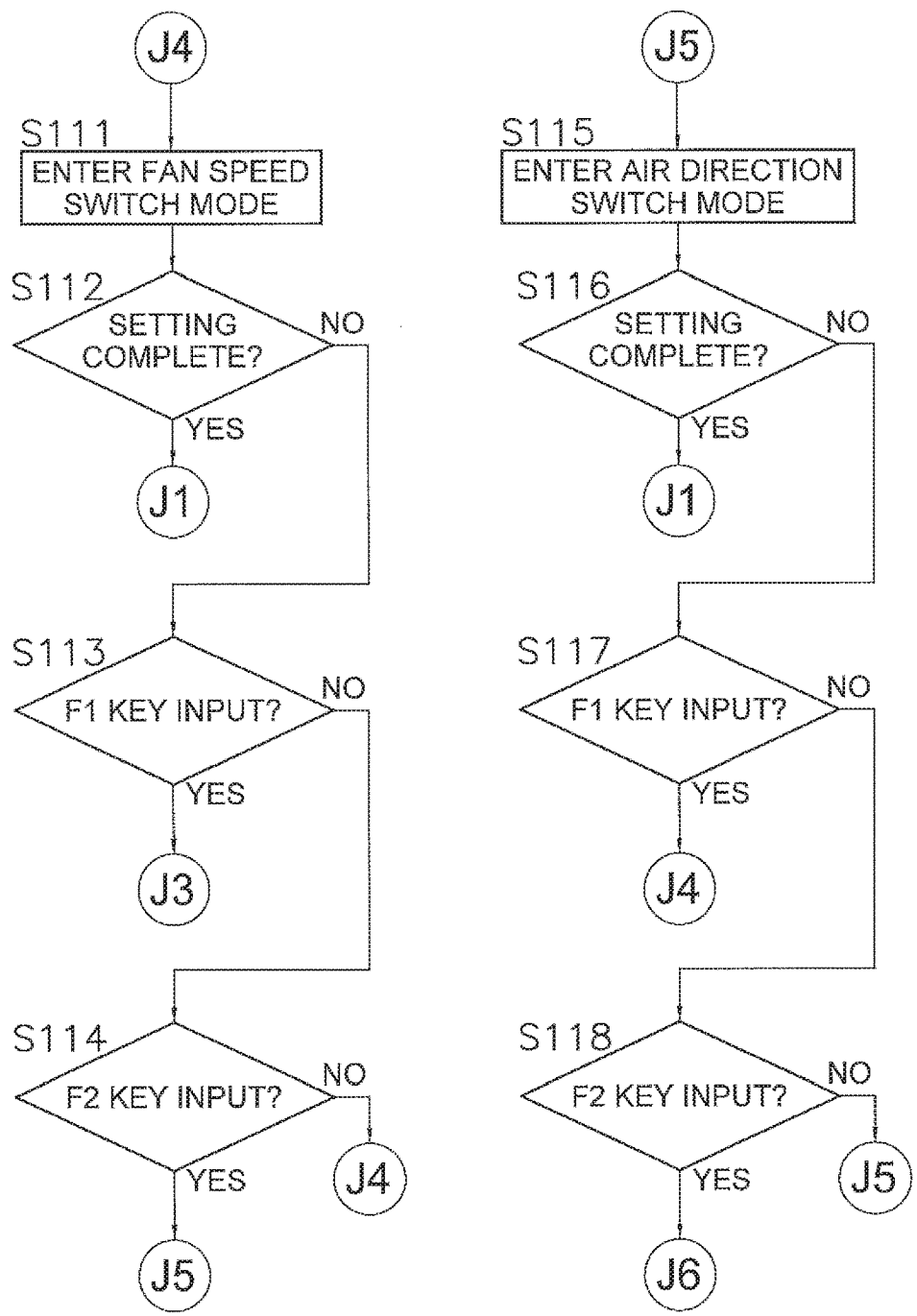
FIG. 36 is a flowchart that shows an example of the control mode transition flow in the remote controller control unit.
Figure 37:
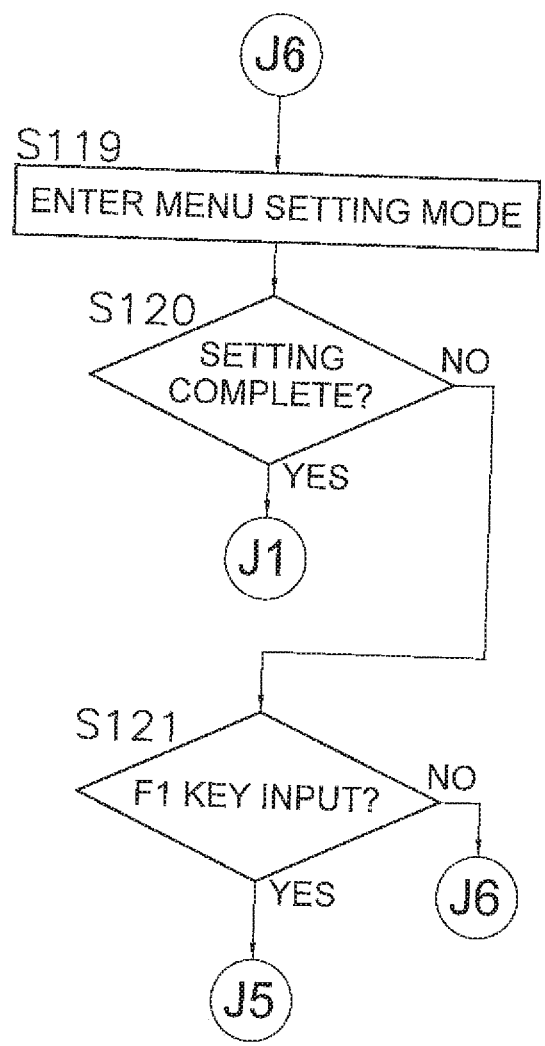
FIG. 37 is a flowchart that shows an example of the control mode transition flow in the remote controller control unit.
Figure 38:
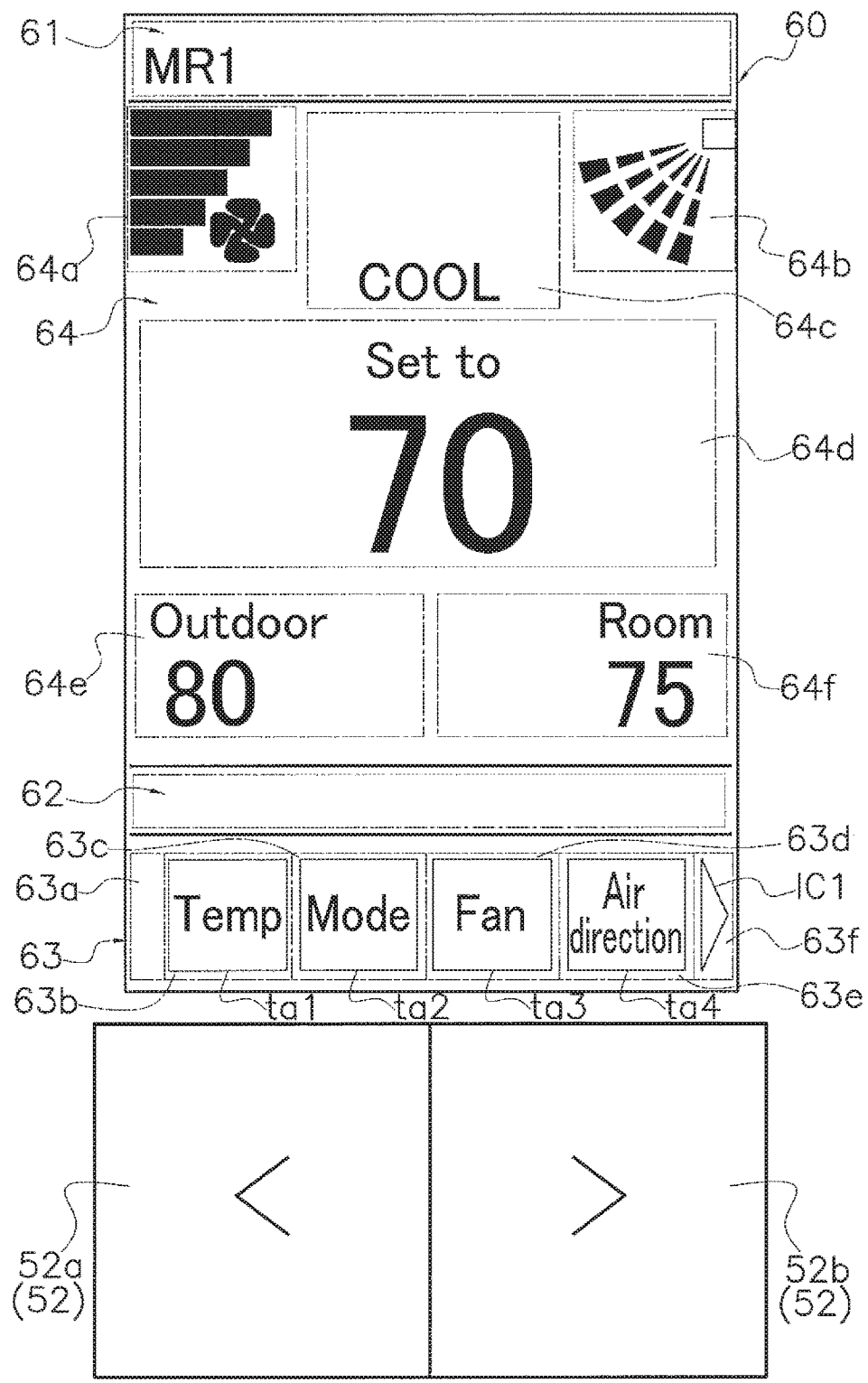
FIG. 38 is a schematic diagram that shows an example of the image displayed in the liquid crystal display unit during a standby mode.
Figure 39:
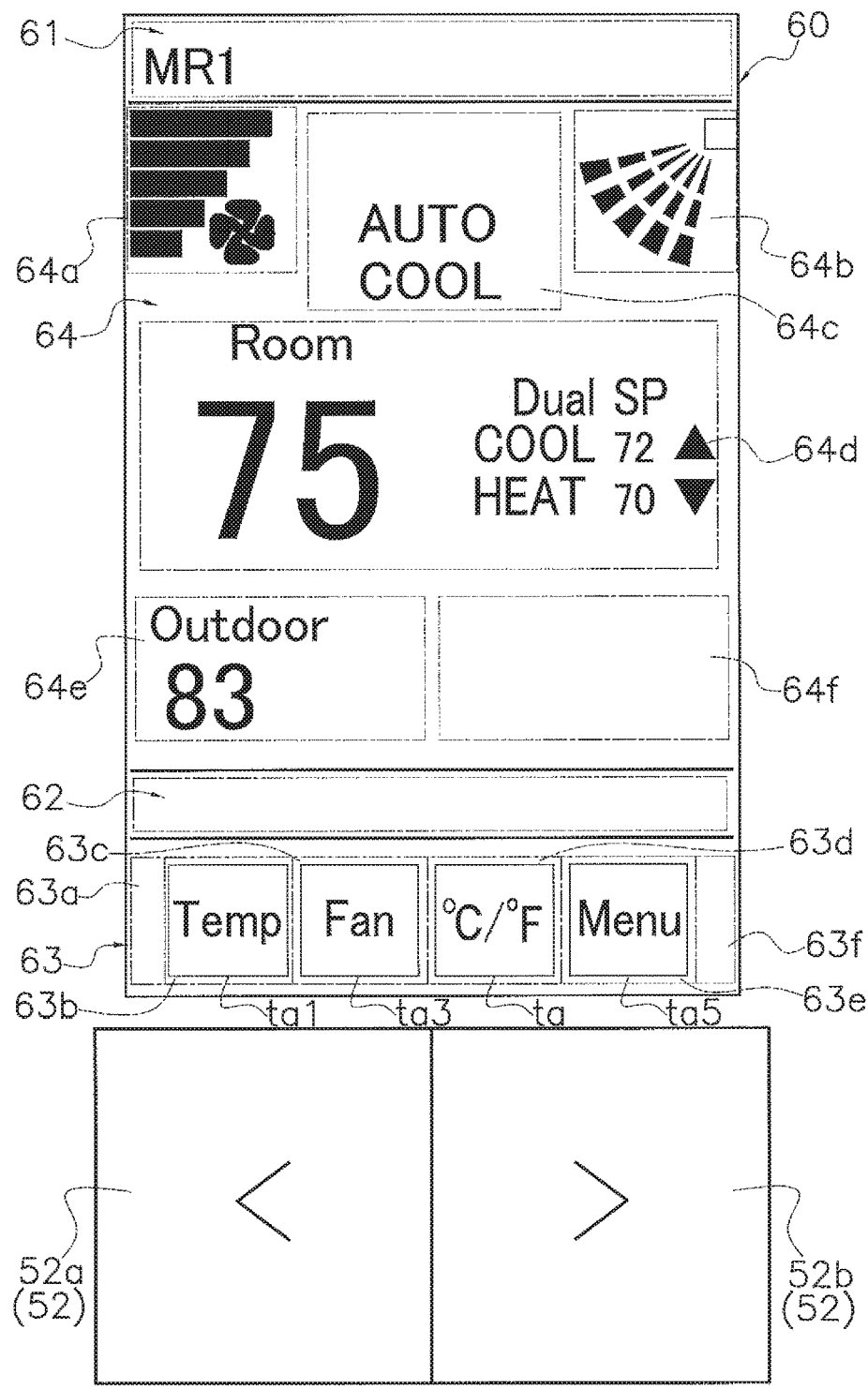
FIG. 39 is a schematic diagram that shows another example of the image displayed in the liquid crystal display unit during the standby mode.

FIG. 35. FIG. 36, and FIG. 37 are flowcharts that each show an example of the control mode transition flow in the remote controller control unit 70 (in FIG. 35, FIG. 36, and FIG. 37, the control mode that is at a lower level than that of the menu setting switch mode is omitted). When drive power is supplied, the remote controller control unit 70 changes the control mode by the flow of Steps S101 to S121 shown in FIG. 35, FIG. 36, and FIG. 37. The Steps S101 to S121 are only examples and may be suitably changed in accordance with design specifications.

In Step S101, the remote controller control unit 70 stays at Step S101 when an operation start command is not input via the start/stop switch key 51 (namely, the case of NO). On the other hand, the remote controller control unit 70 advances to Step S102 when an operation start command is input via the start/stop switch key 51 (namely, the case of YES).

In Step S102, the remote controller control unit 70 enters the standby mode (or maintains the standby mode). Then, the process advances to Step S103.

In Step S103, the remote controller control unit 70 returns to Step S102 when there is no input via the F1 key 52*a* or the F2 key 52*b* (namely, the case of NO). On the other hand, the remote controller control unit 70 advances to Step S104 when there is an input via the F1 key 52*a* or the F2 key 52*b* (namely, the case of YES).

In Step S104, the remote controller control unit 70 enters the set temperature switch mode (or maintains the set temperature switch mode). Then, the process advances to Step S105.

In Step S105, the remote controller control unit 70 advances to Step S106 when the setting of the set temperature is not completed (namely, the case of NO). On the other hand, the remote controller control unit 70 returns to Step S102 when the setting of the set temperature is completed (namely, the case of YES).

In Step S106, the remote controller control unit 70 returns to Step S104 when there is no input via the F2 key 52*b* (namely, the case of NO). On the other hand, the remote controller control unit 70 advances to Step S107 when there is an input via the F2 key 52*b* (namely, the case of YES).

In Step S107, the remote controller control unit 70 enters the operation switch mode (or maintains the operation switch mode). Then, the process advances to Step S108.

In Step S108, the remote controller control unit 70 advances to Step S109 when the setting of the operation mode is not completed (namely, the case of NO). On the other hand, the remote controller control unit 70 returns to Step S102 when the setting of the operation mode is completed (namely, the case of YES).

In Step S109, the remote controller control unit 70 advances to Step S110 when there is no input via the F1 key 52*a* (namely, the case of NO). On the other hand, the remote controller control unit 70 returns to Step S104 when there is an input via the F1 key 52*a* (namely, the case of YES).

In Step S110, the remote controller control unit 70 returns to Step S107 when there is no input via the F2 key 52*b* (namely, the case of NO). On the other hand, the remote controller control unit 70 advances to Step S111 when there is an input via the F2 key 52*b* (namely, the case of YES).

In Step S111, the remote controller control unit 70 enters the fan speed switch mode (or maintains the fan speed switch mode). Then, the process advances to Step S112.

In Step S112, the remote controller control unit 70 advances to Step S113 when the setting of the set fan speed is not completed (namely, the case of NO). On the other hand, the remote controller control unit 70 returns to Step S102 when the setting of the set fan speed is completed (namely, the case of YES).

In Step S113, the remote controller control unit 70 advances to Step S114 when there is no input via the F1 key 52a (namely, the case of NO). On the other hand, the remote controller control unit 70 returns to Step S107 when there is an input via the F1 key 52a (namely, the case of YES).

In Step S114, the remote controller control unit 70 returns to Step S111 when there is no input via the F2 key 52b (namely, the case of NO). On the other hand, the remote controller control unit 70 advances to Step S115 when there is an input via the F2 key 52b (namely, the case of YES).

In Step S115, the remote controller control unit 70 enters the air direction switch mode (or maintains the air direction switch mode). Then, the process advances to Step S116.

In Step S116, the remote controller control unit 70 advances to Step S117 when the setting of the air direction is not completed (namely, the case of NO). On the other hand, the remote controller control unit 70 returns to Step S102 when the setting of the air direction is completed (namely, the case of YES).

In Step S117, the remote controller control unit 70 advances to Step S118 when there is no input via the F1 key 52a (namely, the case of NO). On the other hand, the remote controller control unit 70 returns to Step S111 when there is an input via the F1 key 52a (namely, the case of YES).

In Step S118, the remote controller control unit 70 returns to Step S115 when there is no input via the F2 key 52b (namely, the case of NO). On the other hand, the remote controller control unit 70 advances to Step S119 when there is an input via the F2 key 52b (namely, the case of YES).

In Step S119, the remote controller control unit 70 enters the menu setting switch mode (or maintains the menu setting switch mode). Then, the process advances to Step S120.

In Step S120, the remote controller control unit 70 advances to Step S121 when the setting of a menu setting item is not completed (namely, the case of NO). On the other hand, the remote controller control unit 70 returns to Step S102 when the setting of the menu setting item is completed (namely, the case of YES).

In Step S121, the remote controller control unit 70 returns to Step S119 when there is no input via the F1 key 52a (namely, the case of NO). On the other hand, the remote controller control unit 70 returns to Step S115 when there is an input via the F1 key 52a (namely, the case of YES).

(5) Various Functions of the Remote Controller 30

(5-1) Usability Improvement Function

In the remote controller 30, the number of physical keys 50 (specifically, the start/stop switch key 51, the F1 key 52a, the F2 key 52b, the first change key 53a, and the second change key 53b) is five in total, which is fewer than before. In particular, the number of the function keys 52 is two, namely the number of the F1 key 52a and the F2 key 52b, which is fewer than the number (here, four) of setting items (setting item tabs ta) displayed in the third display area 63.

Thereby, the operation method is made simple, and an operation method that is intuitive and easy for the user can be provided. On the other hand, it is possible to fulfill the functions required for the remote controller 30 to realize the various functions of the air conditioner 100, despite only fewer physical keys are provided to the remote controller 30 than before. That is, compared to before, superior operability is achieved without degrading the functions, and the usability is excellent.

Due to being constituted of fewer physical keys 50, the sizes of the physical keys 50 in the remote controller 30 are made larger than conventional ones. Specifically, the dimension in the width direction of each physical key 50 (length in the horizontal direction) is configured to be not less than one-third of the width-direction dimension of the liquid crystal display unit 60. The height-direction dimension (vertical dimension) of each physical key 50 is configured to be not less than one-fourth of the height-direction dimension of the liquid crystal display unit 60. Thereby, the operator in particular easily recognizes the physical keys 50 and so easily performs input. That is, the physical keys 50 excel in usability.

(5-2) Functions that Improve Designability/Compactness

In the remote controller 30, since the number of physical keys 50 is configured to be few, the degree of freedom in design selection is improved. That is, the remote controller 30 also has a function that improves designability.

In the remote controller 30, since the number of physical keys 50 is reduced than before, it is also possible to make the casing 40 more compact. That is, the remote controller 30 also has a function that improves compactness.

(5-3) Functions that Improve Versatility/Manageability/Security

The remote controller 30 is configured so that, in each control mode, an image is displayed in the liquid crystal display unit 60 on the basis of various tables stored in the fifth storage unit 705. That is, by changing the definition content of each table, the image displayed in each control mode of the remote controller 30 can be arbitrarily changed. Also, each table can be updated by an administrator inputting update commands via the administrative server 90.

In other words, the remote controller 30 is configured so that an administrator can arbitrarily update the display content and display mode in accordance with the installation environment. As a result, the display in a real time and arbitrary manner is achievable in consideration of visibility and operability for the operator, and so the versatility is excellent.

For example, in relation to the display content of each table stored in the fifth storage unit 705, by defining the text information in a language other than Japanese, an image using the language information other than Japanese can be displayed. For example, in FIG. 38 to FIG. 41, as the image displayed during the standby mode, examples of images including English text information are displayed. In FIG. 38 to FIG. 41, temperatures are expressed in Fahrenheit instead of Celsius.

Figure 40:
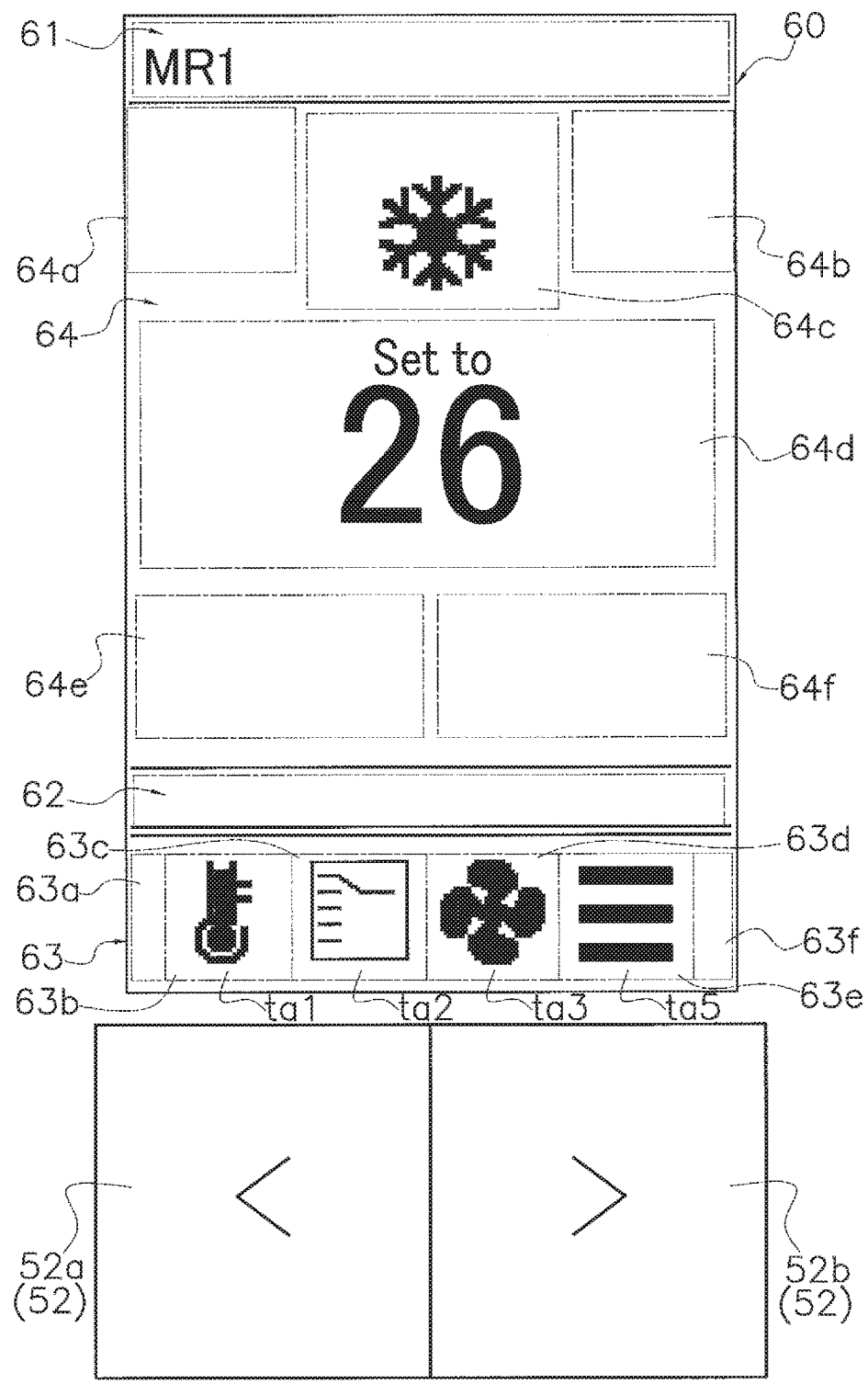
FIG. 40 is a schematic diagram that shows another example of the image displayed in the liquid crystal display unit during the standby mode.
Figure 41:
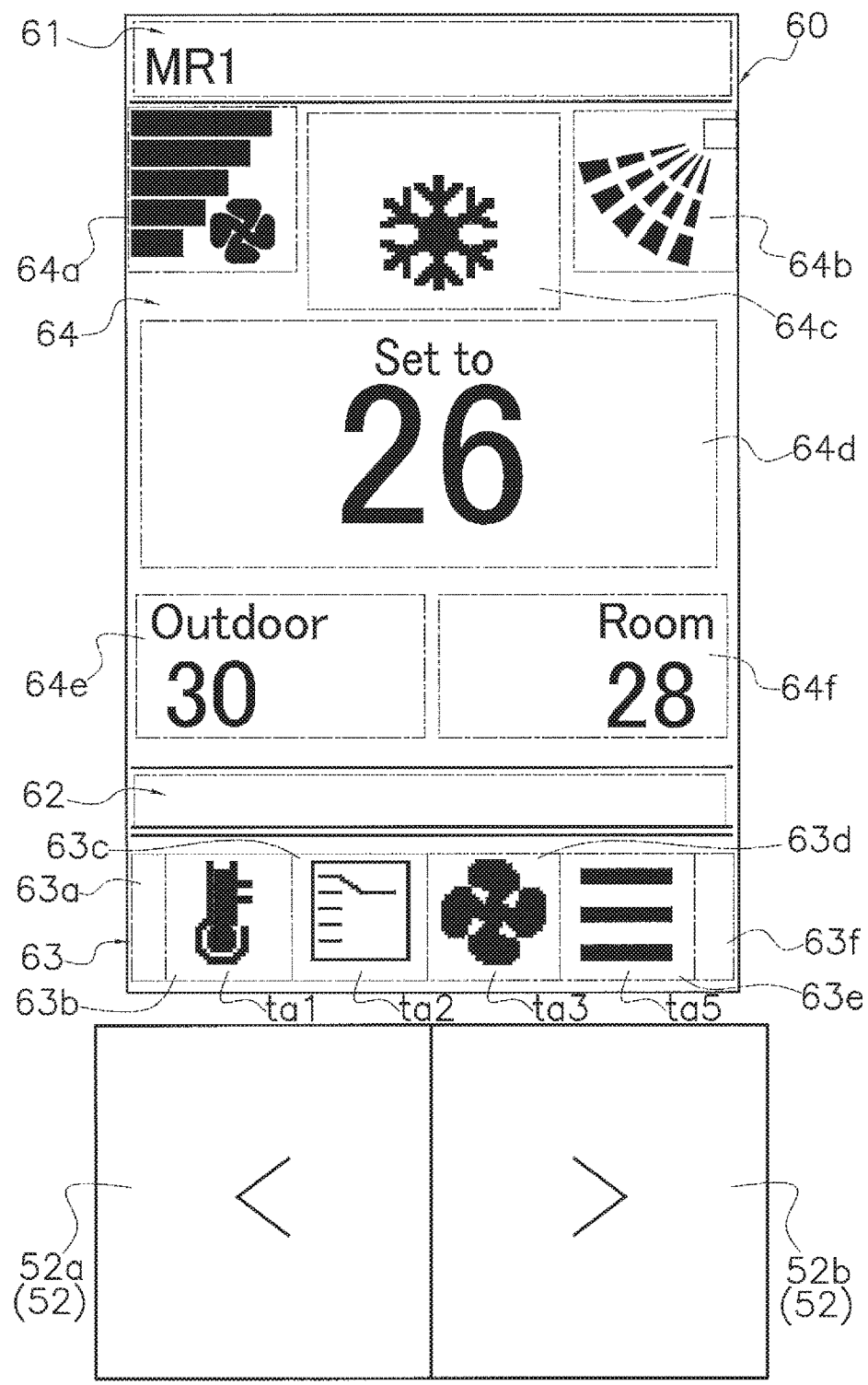
FIG. 41 is a schematic diagram that shows another example of the image displayed in the liquid crystal display unit during the standby mode.

Also, for example, in relation to the definition content of each table stored in the fifth storage unit 705, by defining text information with graphic information, an image can be displayed in which the text information is replaced with the graphic information. For example, FIG. 40 and FIG. 41 show that in the image displayed during the standby mode, setting item tabs ta including graphic information instead of text information are displayed. In this manner, by extensive graphic information being displayed in place of text information, intuitive operation becomes possible regardless of the operator's language of use, leading to enhancement of the versatility and usability.

In this way, the remote controller 30 is configured such that, by changing the content of each table stored in the fifth storage unit 705, a desired image can be displayed in a predetermined situation.

Also, when the remote controller 30 is installed in a target space that is temporarily used by an unspecified large number of users (for example, a hotel guest room or rental room), the users can perform operation based on the images such as those shown in FIG. 32 by the administrator transitioning the control mode to the language setting mode prior to use by the users. Thereby, the operation can be simplified, and the versatility and usability are improved regardless of the operator's language of use.

The remote controller 30 is configured such that, for setting items that the administrator does not want to be set by the operator, limiting of configurable setting items depending on the operator is possible so as not to be set by the operator. For example, in relation to display content of each table stored in the fifth storage unit 705, by defining so as not to include any information whose setting is not desired, it is possible to display an image in a manner such that no information whose setting is not desired is displayed. As a result, the administrator can restrict the operation contents with respect to the operator, whereby the manageability and security are improved.

Figure 42:
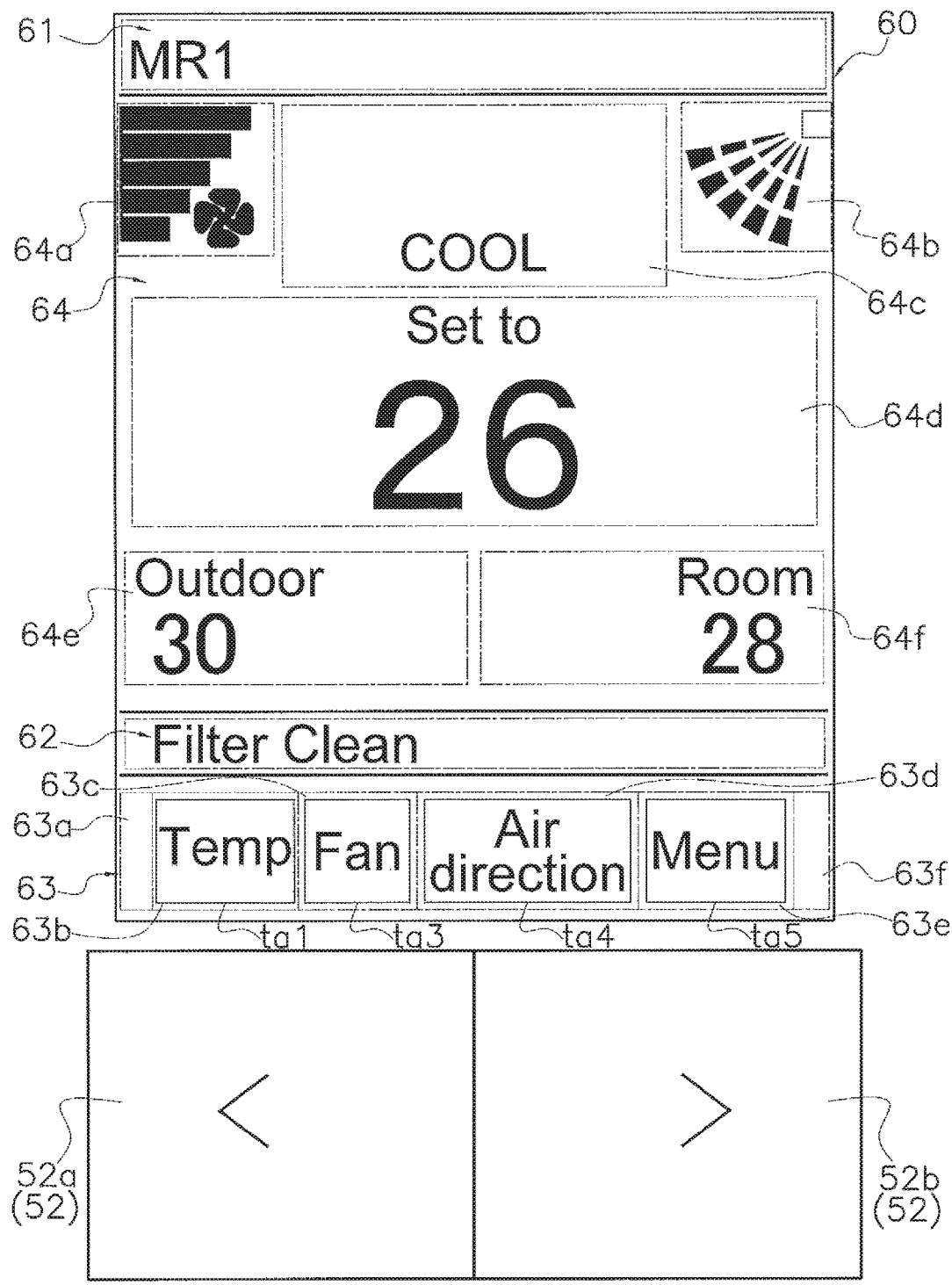
FIG. 42 is a schematic diagram that shows an example of the image displayed in the liquid crystal display unit when configurable setting item is limited.

For example, in FIG. 42, as the image during the standby mode, the operation mode tab ta2 is not displayed in the third display area 63. Thereby, it can be ensured that the operator cannot perform an operation mode setting change.

Figure 43:
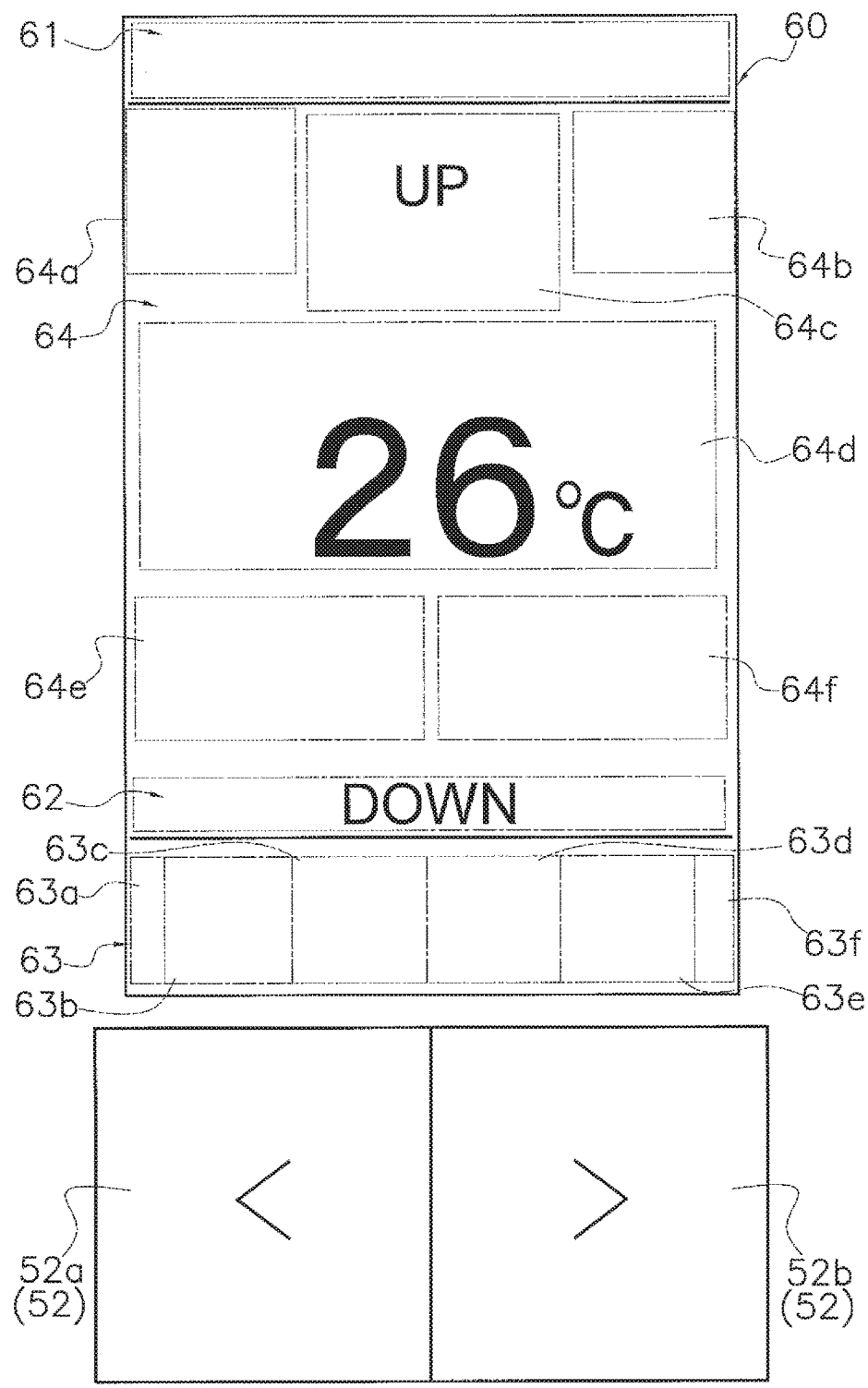
FIG. 43 is a schematic diagram that shows another example of the image displayed in the liquid crystal display unit when the configurable setting item is limited.

In addition, for example in FIG. 43, display of the setting item tabs ta displayed in the third display area 63 is not performed in the state of having entered the set temperature control mode in which only the set temperature should be settable. Thereby, the operator can set only the set temperature, and switching of setting items is restricted. In FIG. 43, a numerical value of the set temperature is displayed in the 14th area 64d, with the text information "UP" displayed in the 13th area 64c to indicate that the set temperature becomes higher by performing input via the first change key 53a, and the text information "DOWN" displayed in the second display area 62 to indicate that the set temperature becomes lower by performing input via the second change key 53b.

In the case of displaying in such a format, a new control mode may be established and a process may be defined so that a process is executed in a format conforming to the display screen on the basis of inputs via the function keys 52 or the change keys 53.

(6) Characteristics
(6-1)

In the remote controller 30 according to the above-mentioned embodiment, usability, designability, and compactness are improved.

That is, in remote control devices of, for example, air-conditioning apparatuses and heat-pump apparatuses that are widely used regardless of age or nationality, it is desirable that the operation method be made as concise as possible in order to raise usability. However, in a conventional remote control device, the number of physical keys including function keys is large, and so the possible of operation by the operator being complicated is not small.

In the remote control device of an air-conditioning apparatus or a heat-pump apparatus, from the standpoint of improving designability and compactness, it is preferable for the number of physical keys including function keys to be few. However, in a conventional remote control device, the number of the physical keys including function keys are large, and the degree of design freedom is restricted, leading to an increase in the size of the remote control device and compactness being constrained.

On this point, in the remote controller 30 according to the embodiment, the remote controller control unit 70 successively selects setting items to be set in accordance with input via function key 52, and the number of function keys 52 is smaller than the number of setting items (setting item tabs ta) that are displayed in the third display area 63 displaying information pertaining to configurable setting items. Thereby, on the basis of input via the function key 52 that are fewer in number than the setting items (setting item tabs ta) displayed, setting items pertaining to settings are successively selected and a setting item under selection is displayed as the setting item tab ta in the liquid crystal display unit 60. From this, the operator can perform various settings with the function key 52, which are fewer in number than the displayed setting items (setting item tabs ta). That is, the operator can perform the same settings as before with the physical keys 50, which are fewer in number than before. For this reason, the number of physical keys 50 constituting the remote controller 30 can be reduced as compared to before. As a result, a concise operation method can be provided to the operator. In addition, a narrowing of the degree of freedom in design of the remote controller 30 and an increase in size of the remote controller 30 are restrained. Accordingly, the usability, designability, and compactness are excellent.

Furthermore, since the number of physical keys 50 is restrained in the remote controller 30 without using software keys constituted by a touch screen or the like, a cost-decreasing effect is also obtained.

(6-2)

In the remote controller 30 according to the embodiment, the remote controller control unit 70 switches the selection of the setting item each time an input is made via the function key 52. Thereby, the setting item under selection is switched at every input via the function key 52. That is, each time the operator performs input via the function key 52, the setting item pertaining to the setting and the setting item tab ta that is displayed successively change. From this, the same settings can be performed as before with the minimum required physical keys 50. Therefore, the number of physical keys 50 constituting the remote controller 30 can be particularly reduced as compared to before.

(6-3)

In the remote controller 30 according to the embodiment, in the third display area 63, the information pertaining to the setting item under selection (setting item tab ta) is highlighted by an inversion of colors. In particular, even when a plurality of the setting item tabs ta are displayed in the third display area 63, the setting item tab ta pertaining to the setting item under selection is highlighted in the third display area 63. As a result, even when a plurality of setting items is displayed in the third display area 63, the operator can easily discern the setting item under selection. In particular, even when a plurality of setting items is displayed in the third display area 63, the operator can easily discern the setting item under selection.

(6-4)

In the remote controller 30 according to the embodiment, the function key 52 is positioned near (directly below) the third display area 63. More precisely, the function key 52 is arranged at a position closer to the third display area 63 than the fourth display area 64. Also, the function key 52 is arranged at a position closer to the third display area 63 than the other physical keys 50. Thereby, the operator, while operating the function key 52, can easily visually recognize the third display area 63. From this, the operator can easily discern the setting item (setting item tab ta) under selection while performing operations on the function key 52.

(6-5)

In the remote controller 30 according to the embodiment, the change keys 53 that are disposed separately from the function key 52 are included among the physical keys 50, and the remote controller control unit 70 performs an increase or decrease to a numerical value relating to a setting item under selection, a stage change, or a mode change in accordance with input via the change keys 53. Thereby, the set state of the setting item under selection can be easily changed with the minimum required fixed keys. That is, the same settings can be performed as before with the minimum required physical keys 50. As a result, it becomes possible to particularly reduce the number of physical keys 50 constituting the remote controller 30 compared to before.

(6-6)

In the remote controller 30 according to the embodiment, the remote controller control unit 70 changes the information pertaining to the set state of a setting item displayed in the fourth display area 64 on the basis of input via the function key 52. Thereby, the set state of the setting item can be easily changed with the minimum required fixed keys. That is, the same settings can be performed as before with the minimum required physical keys 50. As a result, it becomes possible to particularly reduce the number of physical keys 50 constituting the remote controller 30 compared to before.

(6-7)

In the remote controller 30 according to the embodiment, the setting item tabs ta of which the number is smaller than the number of configurable setting items are displayed in the third display area 63, and the right icon IC1 or the left icon IC2, which is information (non-display setting item identifying information) indicating the existence of non-displayed setting item tabs ta, is displayed in the liquid crystal display unit 60. Thereby, the operator easily recognizes the existence of non-displayed setting item tabs ta even when the number of displayed setting item tabs ta is fewer than the number of configurable setting items. As a result, the operability particularly excels.

(6-8)

In the remote controller 30 according to the embodiment, when a plurality of the setting item tabs ta are displayed in the third display area 63, the right icon IC1 or the left icon IC2 (non-displayed setting item identifying information) is displayed in the vicinity of the setting item tab ta displayed near one end in the lengthwise direction (horizontal direction) of the third display area 63, and a setting item tab ta that is not displayed in the third display area 63 (non-displayed setting item information) is displayed, the setting item tab ta displayed near the other end in the lengthwise direction of the third display area 63 is not be displayed. Thereby, even when the number of displayed setting item tabs ta is fewer than the number of configurable setting items, it is easy for the operator to identify a setting item tab ta that is not displayed. As a result, operability in particular excels.

(6-9)

In the remote controller 30 according to the embodiment, the remote controller control unit 70 is configured to be capable of switching the display mode of various information displayed in the liquid crystal display unit 60 by receiving an update command transmitted from the administrative server 90. Thereby, it is possible to display information in the liquid crystal display unit 60 in a display mode corresponding to the operator's characteristics. As a result, the display in a real time and arbitrary manner is achievable in consideration of visibility and operability for the operator, and so usability and versatility are improved. For example, when the remote controller 30 is installed in a space where the user stays temporarily such as lodging facilities like a hotel, or a rental room (that is, a space where the user and administrator are not identical), the display mode is changeable in accordance with the attributes of the user. In addition, in terms of the applications in a number of countries, the display language can be easily and flexibly switched.

(6-10)

In the remote controller 30 according to the embodiment, the remote controller control unit 70 is configured to be capable of limiting the configurable setting items via the function key 52 by receiving an update command that is transmitted from the administrative server 90. Thereby, the administrator is able to limit the configurable setting items in accordance with the operator to prevent the operator from setting those setting items that are not desired to be set by the operator. That is, the administrator can limit the operation contents with respect to the operator. For example, when the remote controller 30 is installed in a space where the user stays temporarily such as lodging facilities like a hotel, or a rental room (that is, a space where the user and administrator are not identical), it becomes possible to arbitrarily restrict the operations of the user.

(7) Modifications

The abovementioned embodiment can be suitably modified, as shown by the following modifications. Each modification may be applied in combination with another modification within a scope in which contradictions do not arise.

(7-1) Modification A

In the above embodiment, the remote controller 30 is applied to the air conditioner 100 such as an air-conditioning apparatus or a heat pump system, but the present invention is not limited thereto. For example, the remote controller 30 may be applied to water heaters, water coolers, and dehumidifiers as heat pump systems including a refrigerant circuit. Also, the remote controller 30 may be applied to an air-conditioning apparatus such as a ventilator or air cleaner that does not include a refrigerant circuit.

(7-2) Modification B

In the above embodiment, the liquid crystal display unit 60 includes the first display area 61, the second display area 62, the third display area 63, and the fourth display area 64. However, the display areas included in the liquid crystal display unit 60 may include other display areas in place of any of those display areas or in addition to those display areas.

The third display area 63 includes the first area 63a to the sixth area 63f, and the fourth display area 64 includes the 11th area 64a to the 16th area 64f. However, the third display area 63 and the fourth display area 64 may include other areas in place of any of those display areas or in addition to those display areas. Any of these areas may be suitably omitted in accordance with the design specifications.

(7-3) Modification C

In the above embodiment, in relation to the highlighting information being defined in each table stored in the fifth storage unit 705, a predetermined information displayed in the liquid crystal display unit 60 is highlighted by being inverted in color. However, the present invention is not limited thereto, and the highlighting may be configured by the information being displayed in another display mode. For example, highlighting may be performed by enlarging the information that is defined as a highlighting information.

Also, the highlighting of highlighting information may be performed by flashing the information, for example. In addition, when the liquid crystal display unit 60 is configured to be capable of color display, the highlighting may be performed by changing the display color of the information that is defined as a highlighting information.

(7-4) Modification D

In the above embodiment, the change keys 53 are configured as fixed keys whose functions are fixed. However, if the total number of function keys 52 and change keys 53 is a number less than the number of setting item tabs ta that are displayed in the third display area 63, the change keys 53 may be constituted as function keys whose function switches depending on the circumstances, instead of fixed keys.

(7-5) Modification E

In the above embodiment, the function keys 52 are arranged directly below the third display area 63. However, the arrangement location of the function keys 52 is not necessarily limited thereto, and suitable modification is possible in accordance with the design specification. For example, if the third display area 63 is provided at the topmost part of the liquid crystal display unit 60, the function keys 52 may be provided directly above the third display area 63. If the third display area 63 is provided at the leftmost part or rightmost part of the liquid crystal display unit 60, the function keys 52 may be provided directly to the left or right of the third display area 63.

(7-6) Modification F

Each control mode for setting a setting item may be configured so as to perform the setting of each setting item by listing a numerical range, types or stages, and the like that can be set in the liquid crystal display unit 60, and making a selection of the desired numerical range, type or stage from the list that is displayed, by input via the change keys 53.

Figure 44:
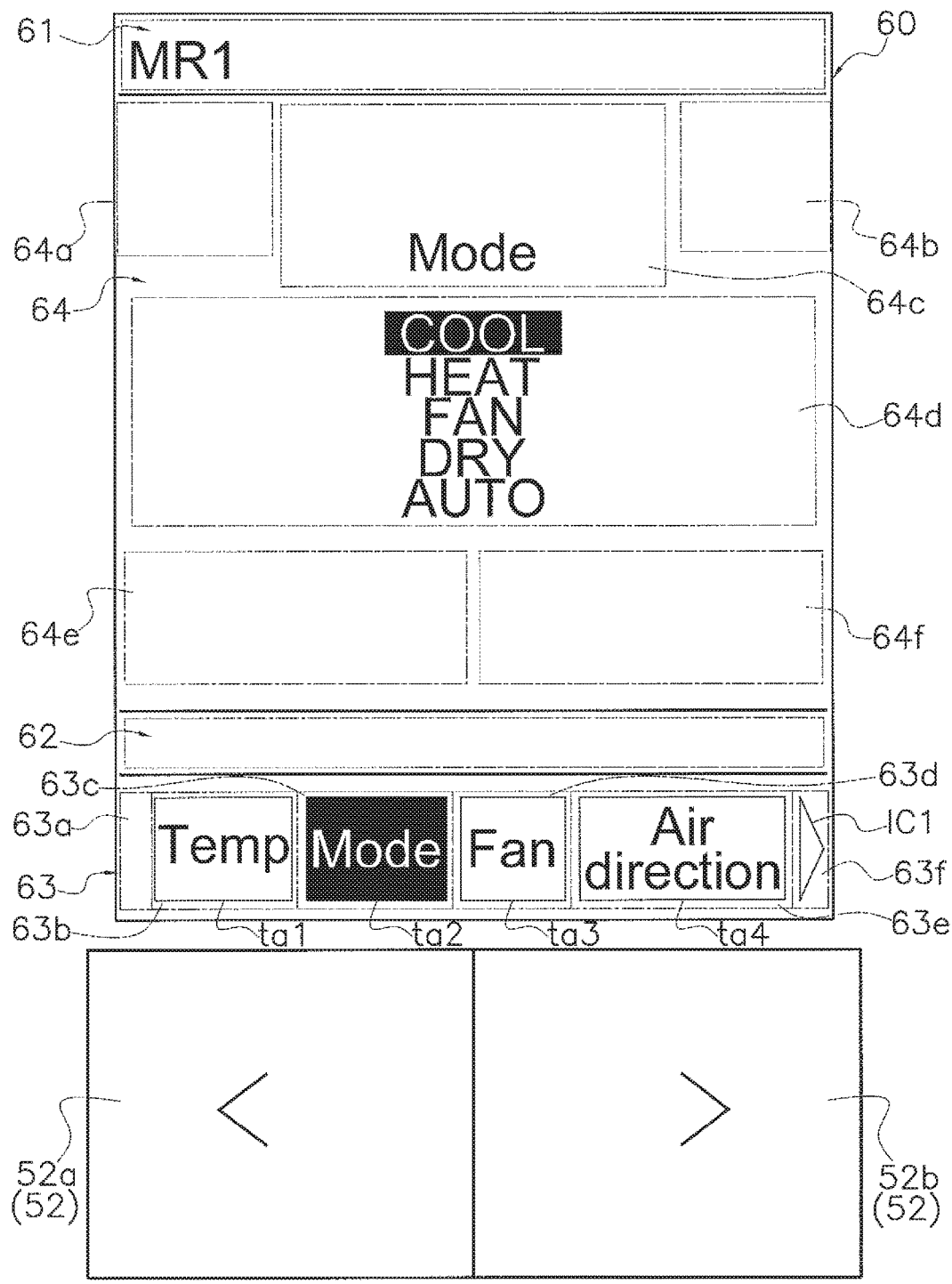
FIG. 44 is schematic diagram that shows an example of the case of listing, in the liquid crystal display, the types of operation modes that can be selected during the operation switch mode.

For example, in the operation switch control mode, types of operation modes that can be selected may be listed as shown in FIG. 44 instead of the display modes shown in FIG. 11 and FIG. 13 (that is, the display mode that displays only the selected type). On the basis of the input via the change keys 53, any of the types may then be determined. In FIG. 44, the text information "COOL", "HEAT", "Fan", "Dry" and "Auto" are displayed in the 14th area 64*d* as a list of the types of operation modes that can be selected. With the selection of the cooling mode on the basis of input via the change keys 53, the text information "COOL" is highlighted.

(7-7) Modification G

In the above embodiment, the number of setting item tabs ta (setting items) displayed in the third display area 63 is four or less. However, the number is not necessarily limited thereto, and the number of setting item tabs ta displayed in the third display area 63 may be five or more provided that the setting item tabs ta are displayed in the third display area 63 in a mode that is easy to visually recognize. Provided that the number of setting item tabs ta displayed in the third display area 63 is greater than the number of function keys 52, the number of setting item tabs ta may also be less than four.

(7-8) Modification H

The images displayed in the remote controller 30 are not limited to the ones described in the above embodiment, and other images may also be displayed. In this case, control modes and tables are provided in accordance with the content to be displayed, and processes are executed on the basis of input via the function keys 52 and the change keys 53.

(7-9) Modification I

In the above embodiment, the content to be displayed in the liquid crystal display unit 60 in each control mode is determined by a table stored in the fifth storage unit 705. However, the content to be displayed in the liquid crystal display unit 60 is not limited thereto, and may be defined by a control program that is stored in the first storage unit 701. In such a case, a change to the display content in the liquid crystal display unit 60 in each control mode is performed by updating the control program.

(7-10) Modification J

In the above embodiment, the remote controller 30 has the start/stop switch key 51 as a physical key 50. However, the start/stop switch key 51 is not always necessary and can be suitably omitted by substitution with another physical key 50. For example, when operation is stopped or during the standby mode, the function of the start/stop switch key 51 may be undertaken by the function keys 52.

(7-11) Modification K

In the above embodiment, the remote controller 30 is a so-called wired remote control device, and is connected to the indoor unit control unit 22 via the cable cb2. However, the remote controller 30 is not limited thereto, and may also be a wireless-type remote control device that performs communication with the indoor unit control unit 22 by wireless communication using radio waves or infrared light.

(7-12) Modification L

In the above embodiment, the eco full-automatic setting, the language setting, and the timer setting are provided as menu setting items. However, the menu setting items are not limited thereto, and other menu setting items may of course be provided. In such a case, control modes and tables corresponding to the menu setting items may be provided, and processes may be specified corresponding to the input via the function keys 52 or change keys 53.

(7-13) Modification M

In the above embodiment, the remote controller 30 is configured to be capable of communicating with the administrative server 90 by being connected to the communication network NW1 via the cable cb3. However, the remote controller 30 may be configured to be capable of communicating with the administrative server 90 by being connected to the communication network NW1 via wireless communication using radio waves or infrared light. Alternatively, when the outdoor unit 10 or the indoor unit 20 is configured to be capable of communicating with the administrative server 90 by being connected to the communication network NW1, the remote controller 30 may be configured to be capable of communicating with the administrative server 90 via the outdoor unit 10 or the indoor unit 20.

(7-14) Modification N

In the remote controller 30 of the embodiment, the F1 key 52*a* and the F2 key 52*b* are provided as the function keys 52, and so the number of function keys 52 totaled two. However, the number of function keys 52 may be suitably changed in accordance with the design specification. For example, provided the number of function keys 52 is less than the number of setting item tabs ta displayed in the third display area 63, the number of function keys 52 may be three or more, and may even be one.

(7-15) Modification O

In the remote controller 30 of the above embodiment, the right icon IC1 or the left icon IC2, which are information (non-displayed setting item identifying information) indicating the existence of setting item tabs ta that are not displayed, is displayed as approximate triangle-shaped figure. However, the right icon IC1 or the left icon IC2 is not necessarily displayed in this mode, and provided that the display mode of the right icon IC1 or the left icon IC2 is capable of indicating the presence of setting item tabs ta that are not displayed, the display mode can be suitably changed. For example, the right icon IC1 or the left icon IC2 may be displayed so as to assume an arrow shape instead of a triangular shape. Also, the right icon IC1 or the left icon IC2 is not necessarily need to be displayed as a figure or a symbol and may also be displayed in a mode including text information.

(7-16) Modification P

In the remote controller 30 of the above embodiment, the right icon IC1 or the left icon IC2 is displayed in the third display area 63 as information indicating the existence of setting item tabs ta that are not displayed (non-displayed setting item identifying information). However, the right icon IC1 or the left icon IC2 is not necessarily displayed in the third display area 63 and may be displayed in another display area. For example, the right icon IC1 or the left icon IC2 as non-displayed setting item identifying information may be displayed in the second display area or the fourth display area 64. Moreover, the right icon IC1 or the left icon IC2 is not necessarily displayed and may be suitably omitted depending on the circumstances.

(7-17) Modification Q

In the remote controller 30 of the above embodiment, the third display area 63 is configured so as to extend in the left-right direction (that is, so that the lengthwise direction of the third display area 63 becomes the left-right direction). However, the configuration mode of the third display area 63 is not limited thereto, and can be suitably changed in accordance with the design specification. For example, the third display area 63 may be configured so as to extend along the up-down direction (that is, so that the lengthwise direction of the third display area 63 becomes the up-down direction).

INDUSTRIAL APPLICABILITY

The present invention can be used for a remote control device of an air-conditioning apparatus or a heat-pump apparatus.

What is claimed is:

1. A remote control device of an air-conditioning apparatus or a heat-pump apparatus, the remote control device comprising:
   a display unit configured and arranged to display various information;
   a plurality of physical keys via which commands pertaining to various settings are input; and
   a control unit configured and arranged to control operations of the display unit and to execute various processes in accordance with the commands input via the physical keys,
   the display unit including a setting item display area configured and arranged to display setting item information pertaining to configurable setting items, and a set state display area configured and arranged to display information pertaining to set state of the setting items, the setting item display area being disposed below the set state display area in an up-down direction of the remote control device,
   the physical keys including at least one function key to which a function assigned is switched depending on circumstances and at least one set state change key configured and arranged separately from the function key, the at least one function key being arranged below the display unit in the up-down direction of the remote control device and the at least one set state change key being arranged to one side of the display unit in a left-right direction of the remote control device and higher than the setting item display area in the up-down direction,
   the control unit
      successively selecting the setting items to be set in accordance with input via the function key,
      causing the display unit to display the setting item information pertaining to the selected setting item, and
      performing an increase or decrease of a numerical value, a state change, or a mode change relating to the setting item under selection in accordance with an input via the set state change key, and
   the number of function keys being smaller than the number of the setting item information displayed in the setting item display area.

2. The remote control device according to claim 1, wherein
   the control unit is configured and arranged to switch the selection of the setting items each time an input is made via the function key.

3. The remote control device according to claim 2, wherein
   in the setting item display area, the setting item information pertaining to the setting item under selection is highlighted by at least one of an inversion or change in color, enlarged display, and flashing display.

4. The remote control device according to claim 2, wherein
   the function key is positioned in a vicinity of the setting item display area.

5. The remote control device according to claim 2, wherein
   the control unit changes information pertaining to the set state of the setting item displayed in the set state display area based on input via the function key.

6. The remote control device according to claim 2, wherein
   the setting item information, which the number is smaller than the number of configurable setting items, are displayed in the setting item display area, and
   a non-displayed setting item identifying information indicating existence of non-displayed setting item information is displayed on the display unit, the non-displayed setting item information being the setting item information that is not displayed in the setting item display area.

7. The remote control device according to claim 2, wherein
   the control unit switches display modes of the various information displayed in the display unit upon receiving a predetermined signal transmitted from an administrative device connected by a communication network.

8. The remote control device according to claim 2, wherein
   the control unit limits the setting items that can be selected via the function key by receiving a predetermined signal transmitted from an administrative device connected by a communication network.

9. The remote control device according to claim 1, wherein
   in the setting item display area, the setting item information pertaining to the setting item under selection is highlighted by at least one of an inversion or change in color, enlarged display, and flashing display.

10. The remote control device according to claim 9, wherein
the function key is positioned in a vicinity of the setting item display area.

11. The remote control device according to claim 9, wherein
the control unit changes information pertaining to the set state of the setting item displayed in the set state display area based on input via the function key.

12. The remote control device according to claim 9, wherein
the setting item information, which the number is smaller than the number of configurable setting items, are displayed in the setting item display area, and
a non-displayed setting item identifying information indicating existence of non-displayed setting item information is displayed on the display unit, the non-displayed setting item information being the setting item information that is not displayed in the setting item display area.

13. The remote control device according to claim 9, wherein
the control unit switches display modes of the various information displayed in the display unit upon receiving a predetermined signal transmitted from an administrative device connected by a communication network.

14. The remote control device according to claim 9, wherein
the control unit limits the setting items that can be selected via the function key by receiving a predetermined signal transmitted from an administrative device connected by a communication network.

15. The remote control device according to claim 1, wherein
the function key is positioned in a vicinity of the setting item display area.

16. The remote control device according to claim 1, wherein
the control unit changes information pertaining to the set state of the setting item displayed in the set state display area based on input via the function key.

17. The remote control device according to claim 1, wherein
the setting item information, which the number is smaller than the number of configurable setting items, are displayed in the setting item display area, and
a non-displayed setting item identifying information indicating existence of non-displayed setting item information is displayed on the display unit, the non-displayed setting item information being the setting item information that is not displayed in the setting item display area.

18. The remote control device according to claim 17, wherein
a plurality of the setting item information is displayed in the setting item display area,
the non-displayed setting item identifying information is displayed in the vicinity of the setting item information displayed near one end of the setting item display area in a lengthwise direction, and
when the non-displayed setting item information is displayed in the setting item display area, the setting item information that was displayed near the other end of the setting item display area in the lengthwise direction is no longer displayed.

19. The remote control device according to claim 1, wherein
the control unit switches display modes of the various information displayed in the display unit upon receiving a predetermined signal transmitted from an administrative device connected by a communication network.

20. The remote control device according to claim 1, wherein
the control unit limits the setting items that can be selected via the function key by receiving a predetermined signal transmitted from an administrative device connected by a communication network.

21. The remote control device according to claim 1, wherein
the at least one set state change key does not overlap the at least one function key in the up-down direction.

22. The remote control device according to claim 21, wherein
at least one function key consists of two of the function keys, and the at least one set state change key consists of two of the set state change keys.

23. The remote control device according to claim 1, wherein
at least one function key consists of two of the function keys, and the at least one set state change key consists of two of the set state change keys.

* * * * *